INVENTORS
PAUL E. FISCHER
ROBERT S. HEDIN
CHARLES H. SWANSON
HENRY E. WISSMAN
BY
William C. Strueber ATTORNEY

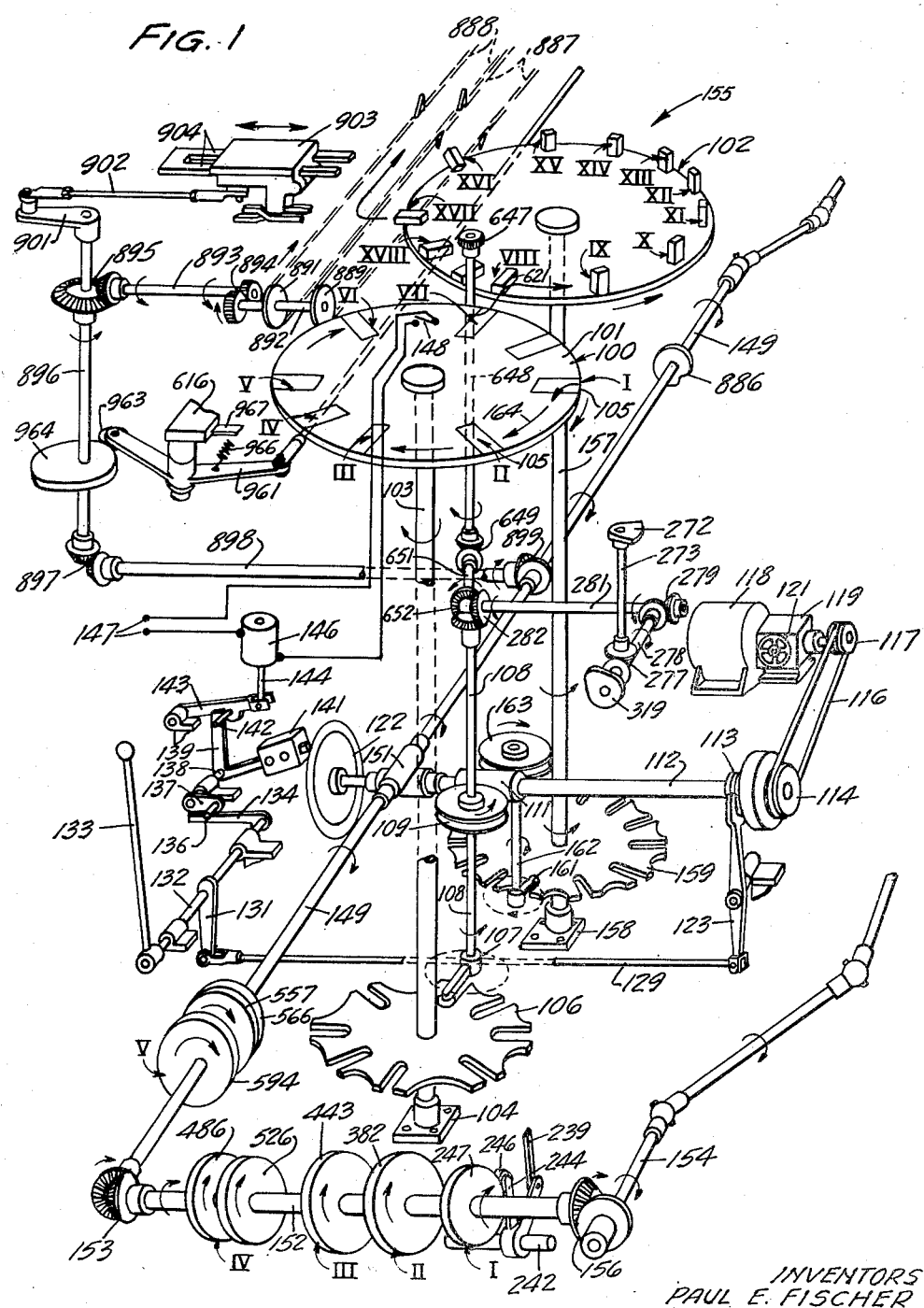

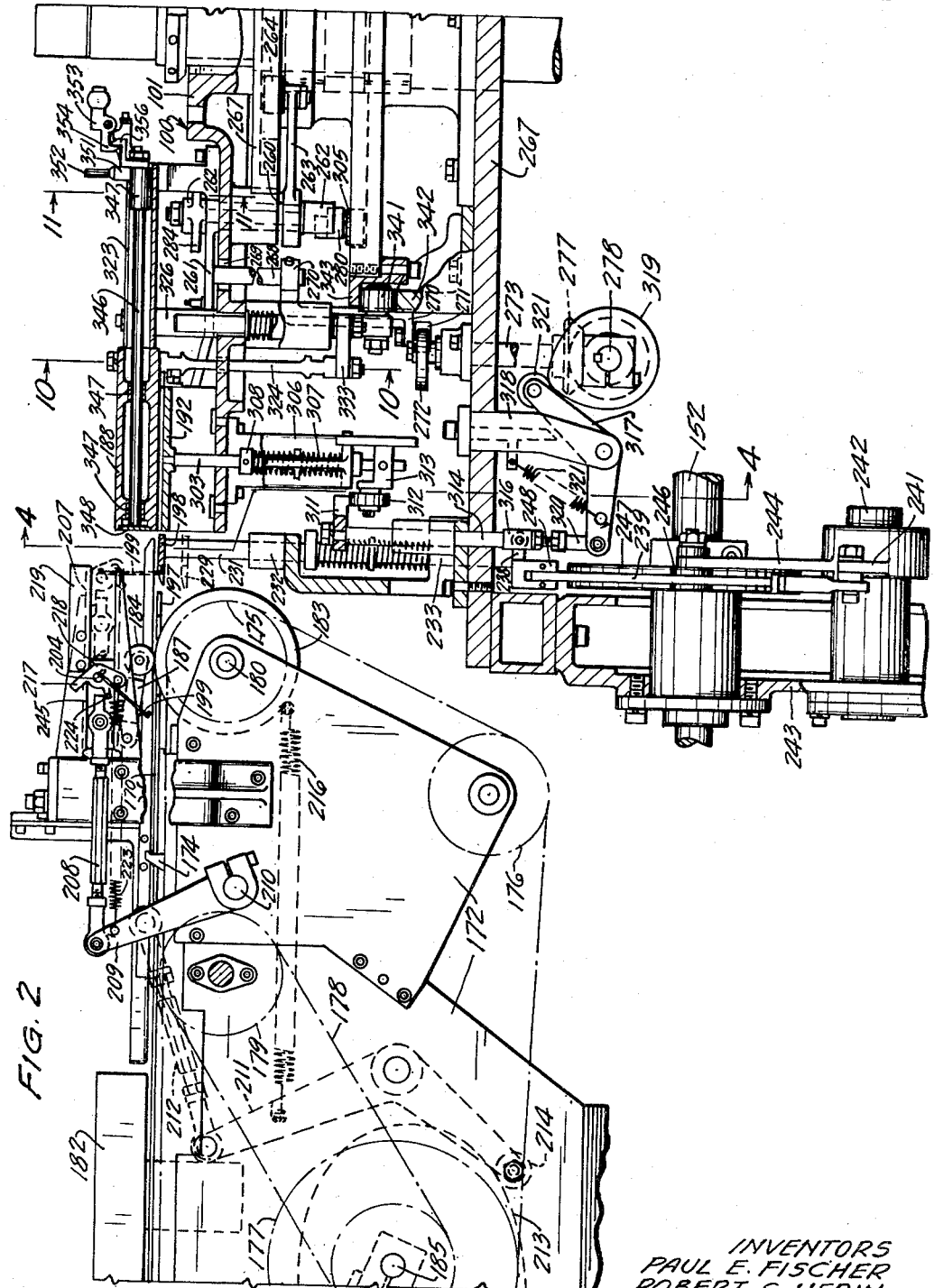

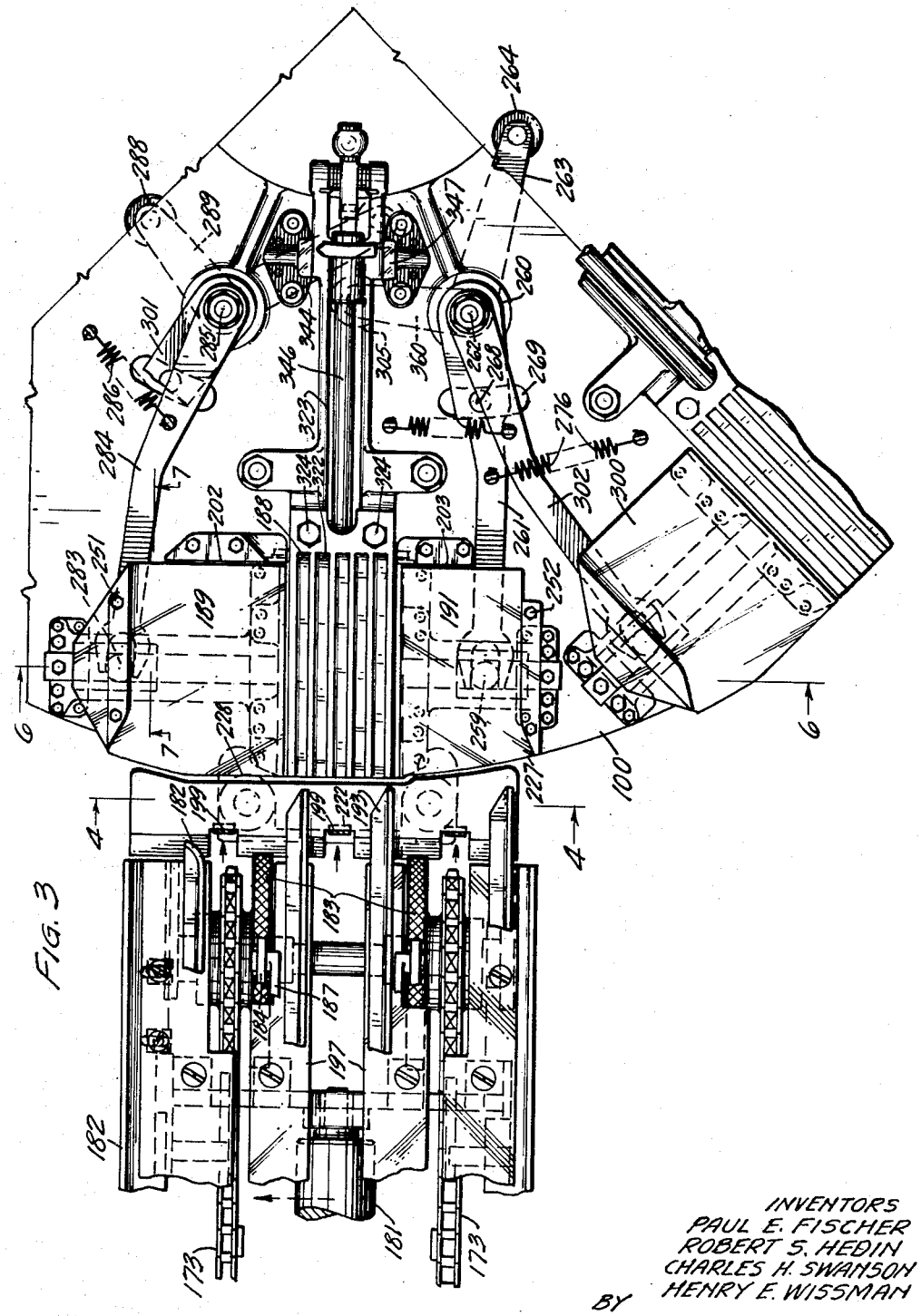

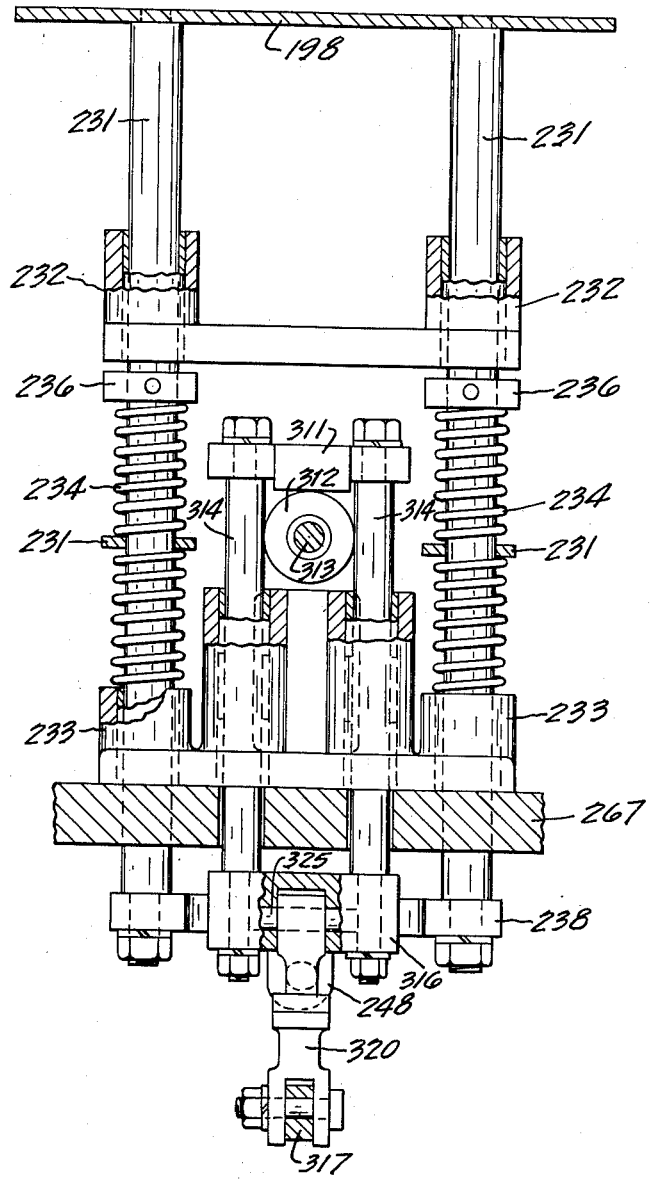

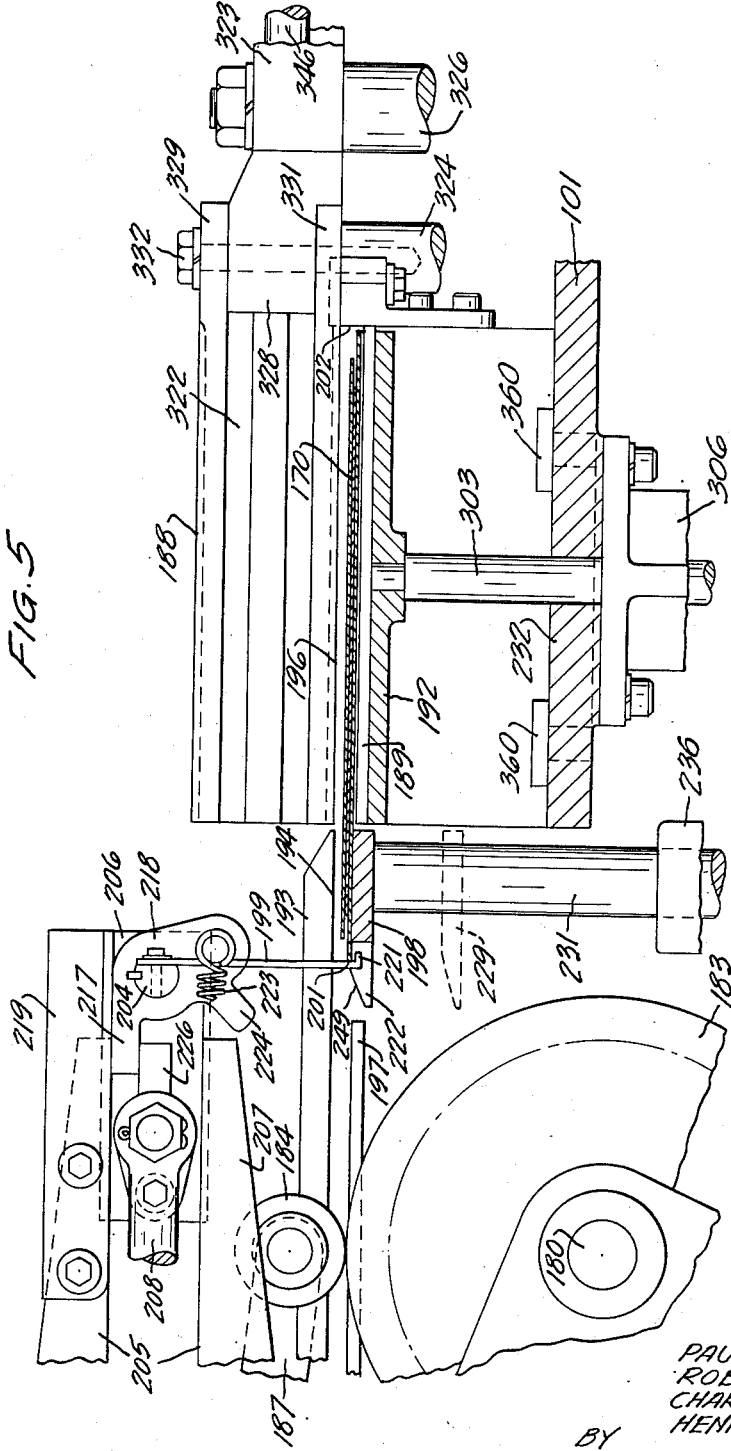

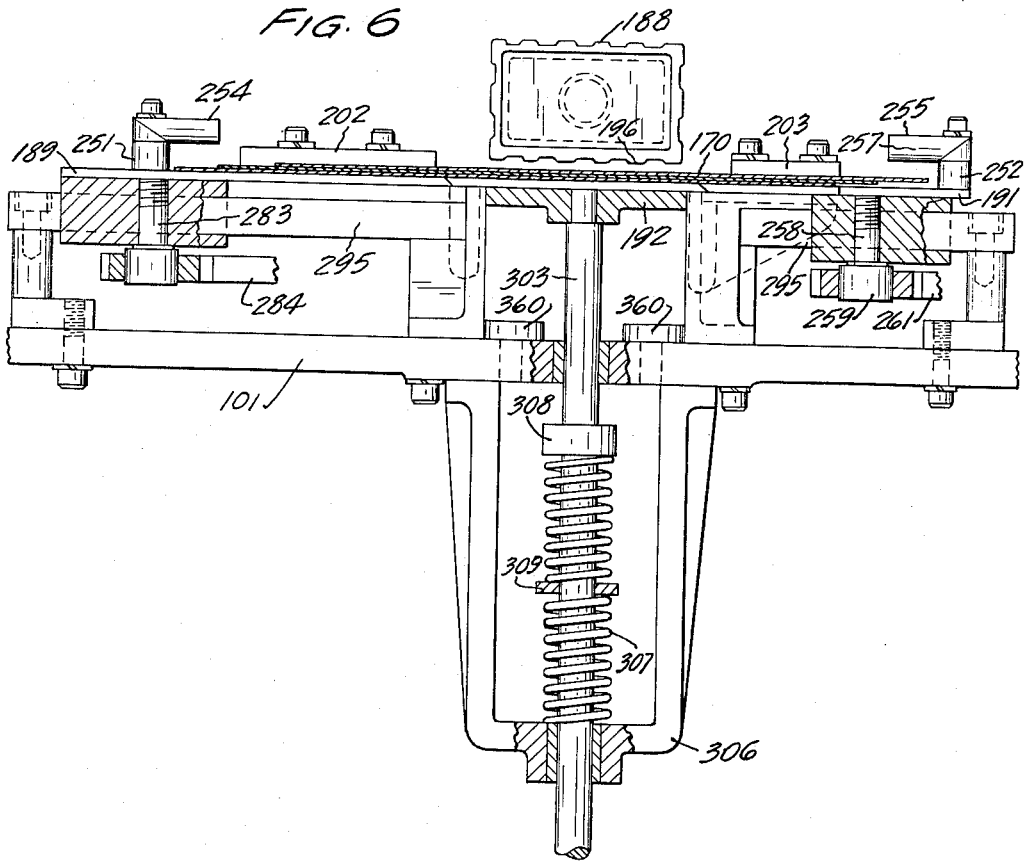
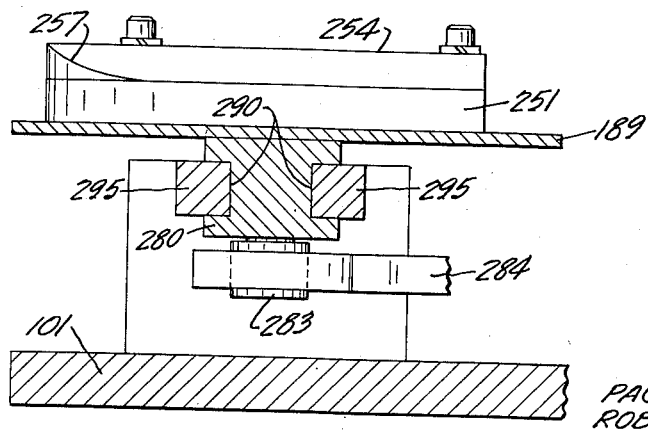

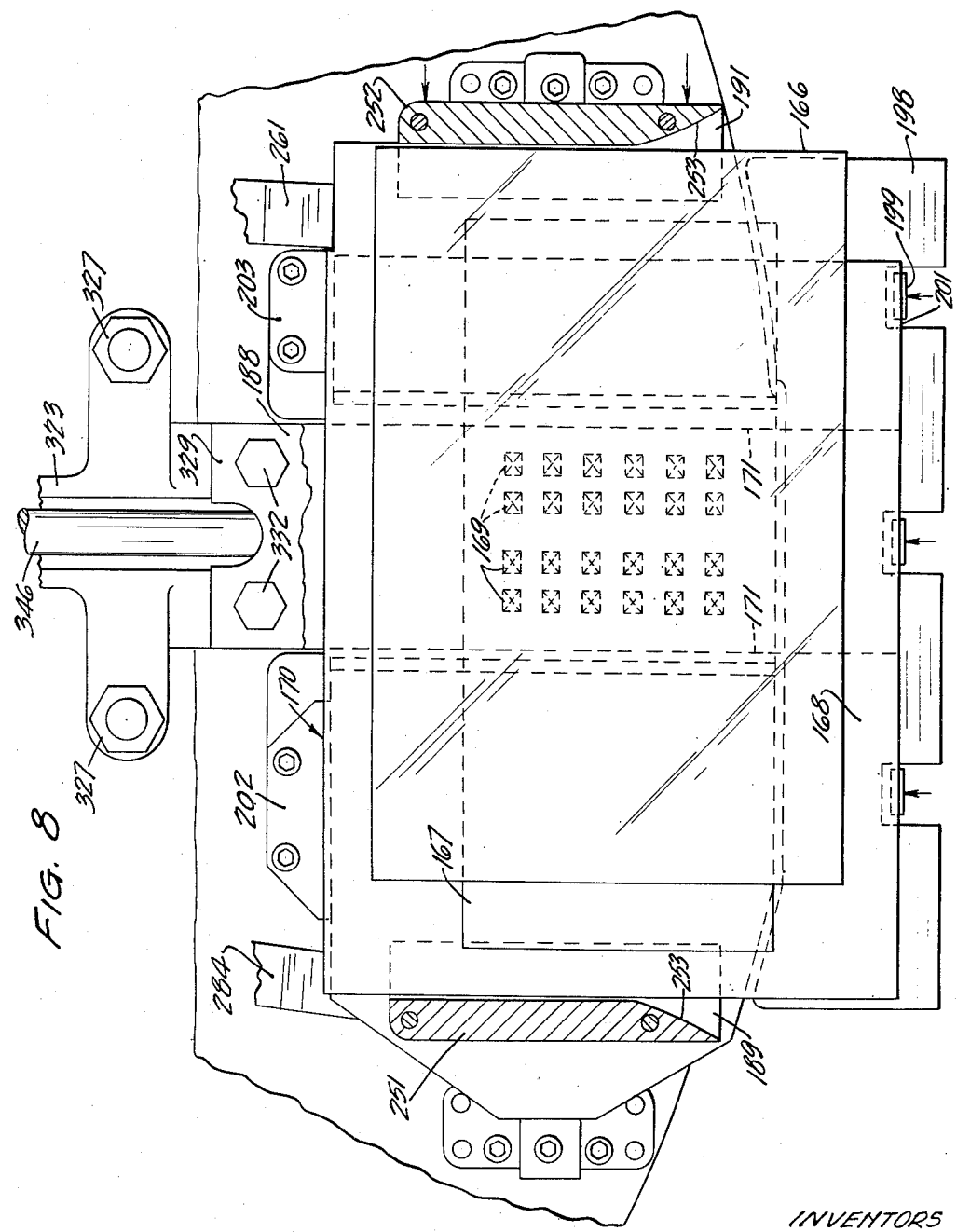

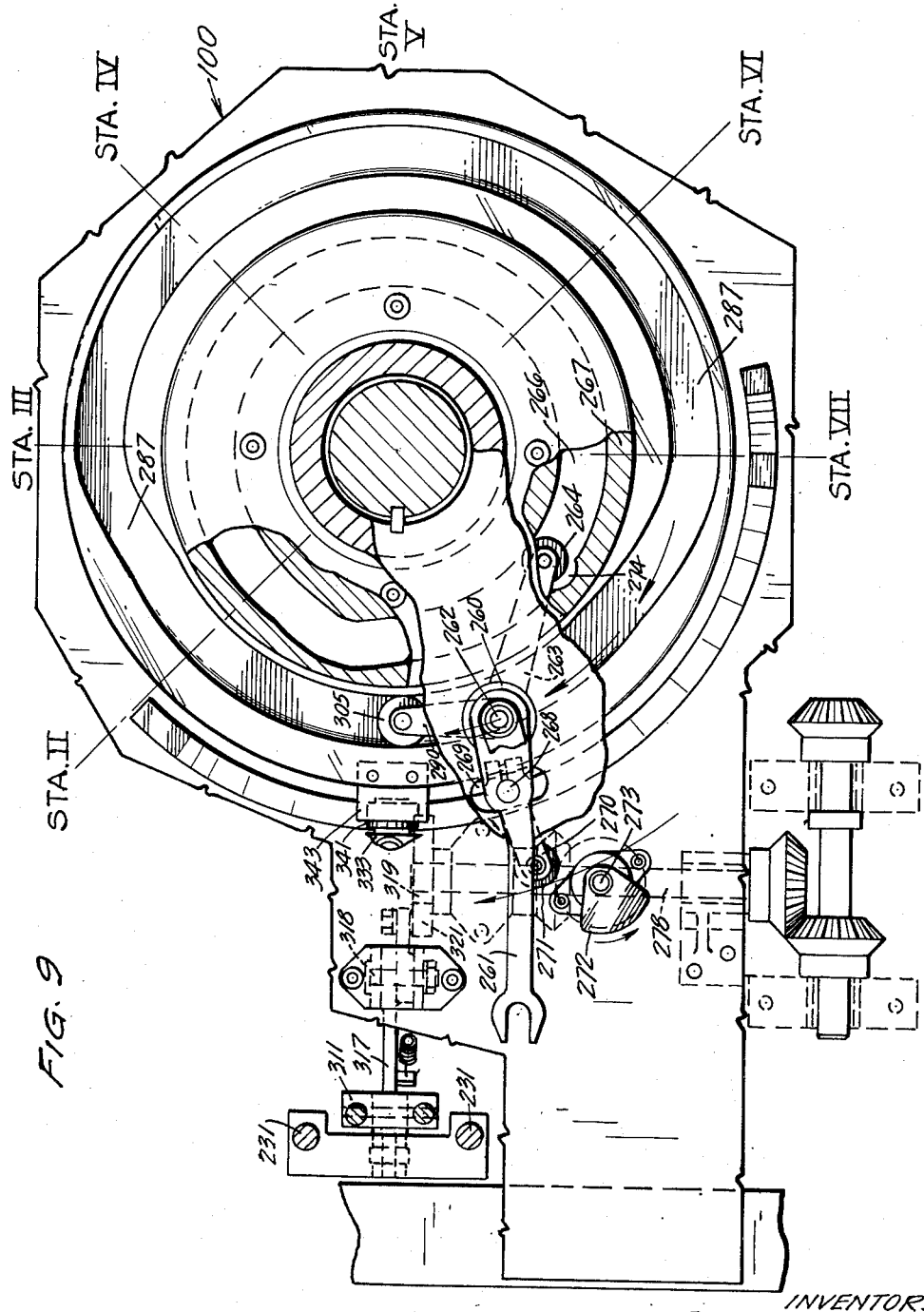

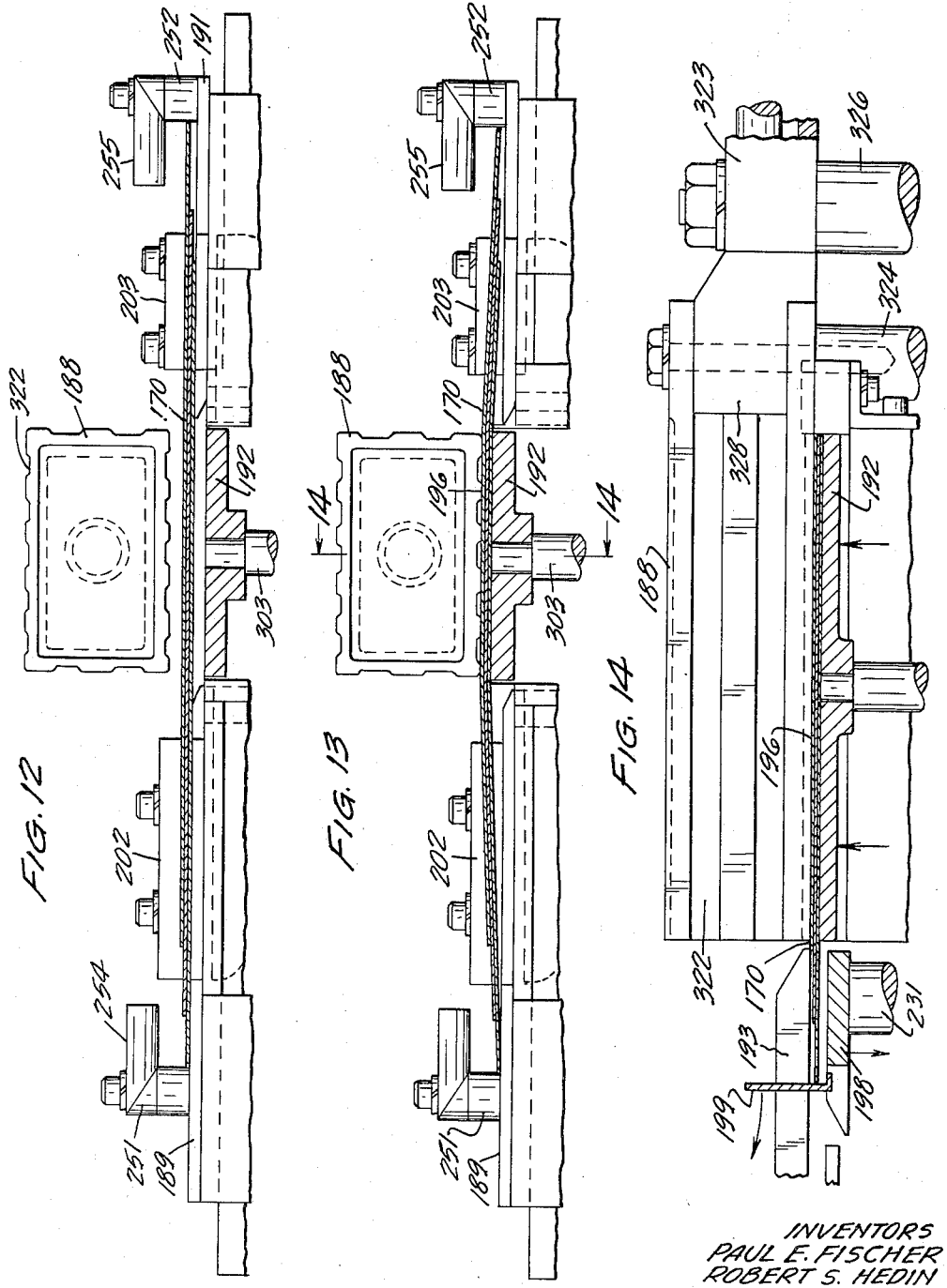

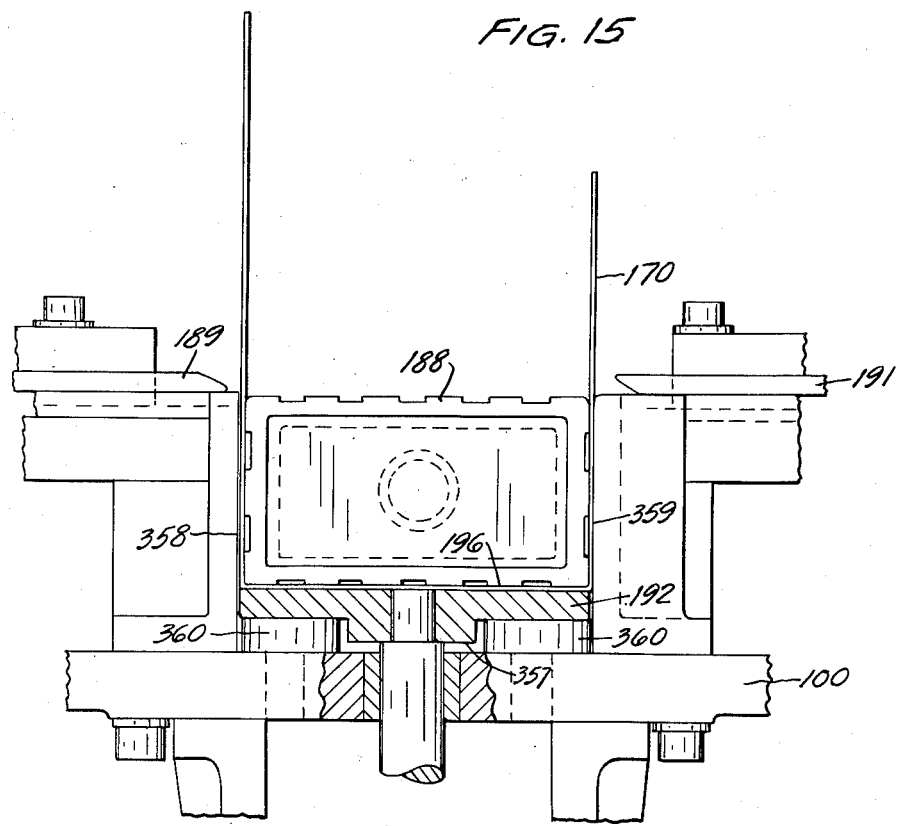
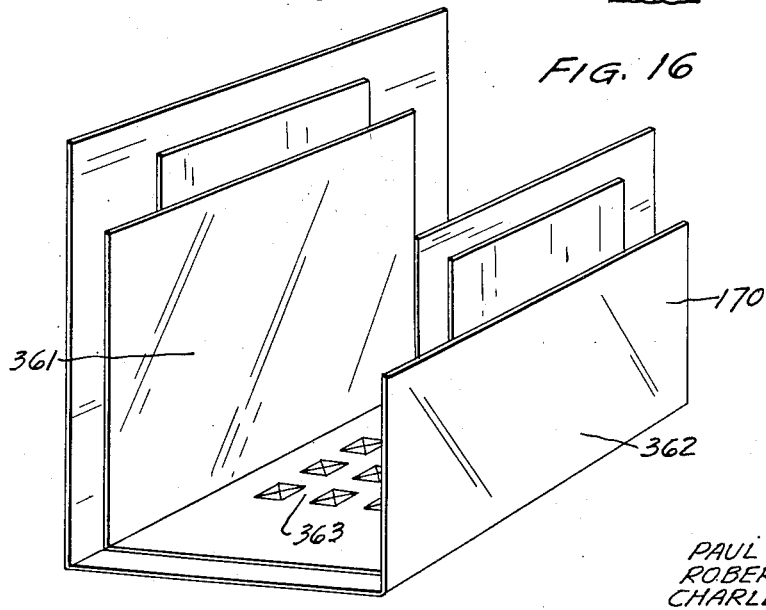

INVENTORS
PAUL E. FISCHER
ROBERT S. HEDIN
CHARLES H. SWANSON
HENRY E. WISSMAN
BY William C. Strueber ATTORNEY

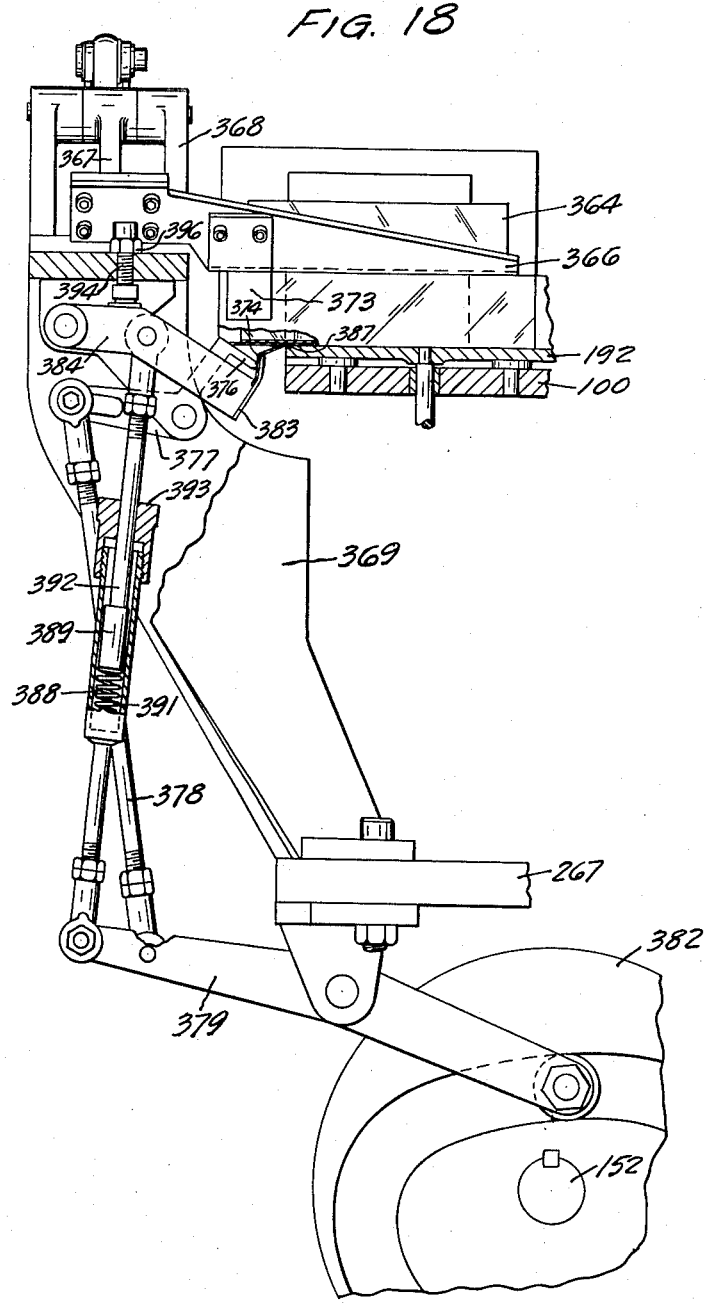

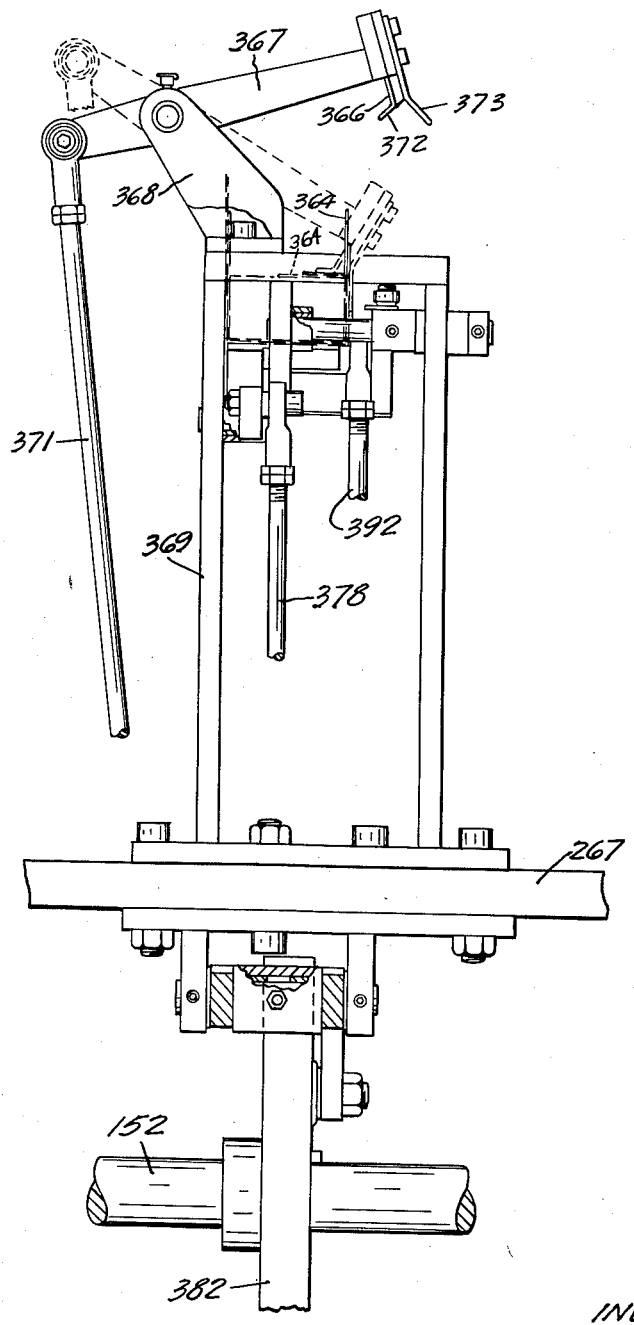

Jan. 8, 1957 P. E. FISCHER ET AL 2,776,609
MECHANISM FOR MAKING CONTAINERS
Filed March 31, 1952 48 Sheets-Sheet 15
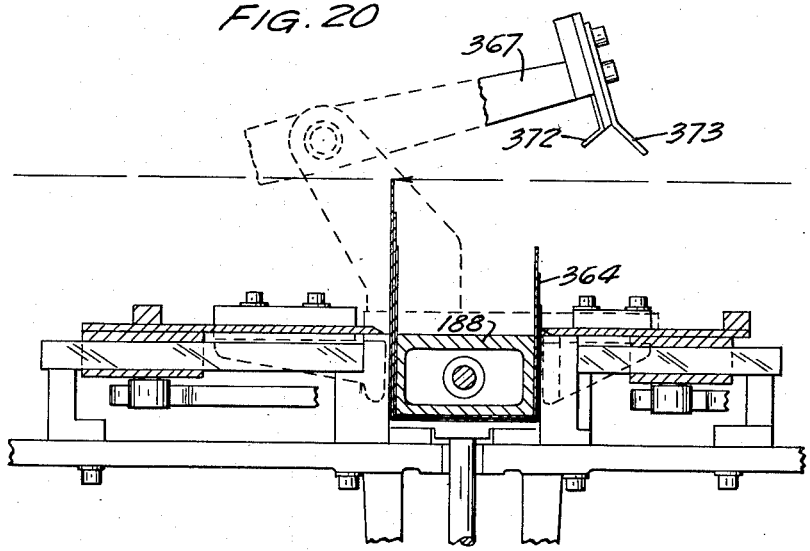
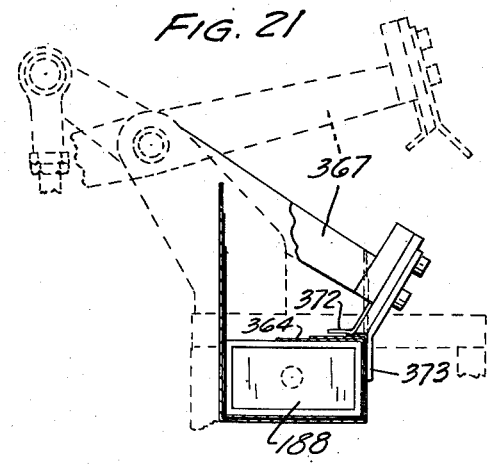
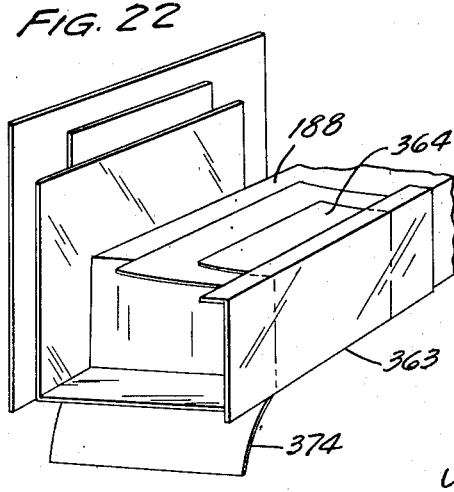
INVENTORS
PAUL E. FISCHER
ROBERT S. HEDIN
CHARLES H. SWANSON
HENRY E. WISSMAN
BY William C. Strueber
ATTORNEY Jan. 8, 1957 P. E. FISCHER ET AL 2,776,609
MECHANISM FOR MAKING CONTAINERS
Filed March 31, 1952 48 Sheets-Sheet 16
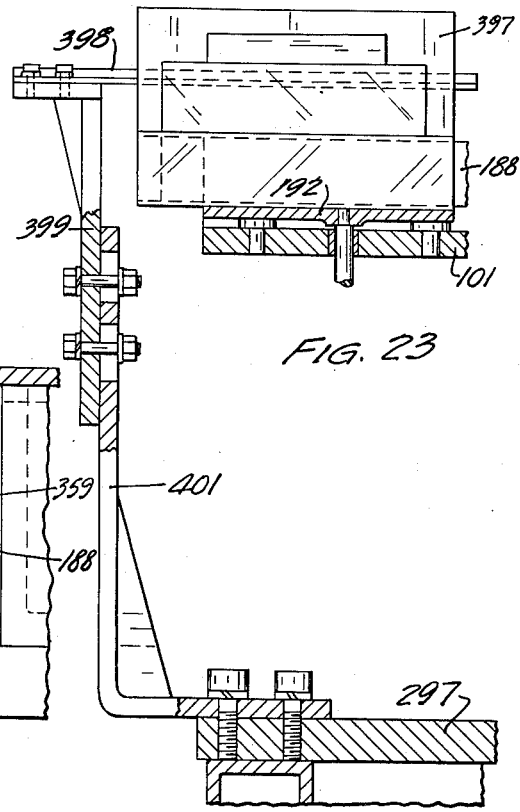
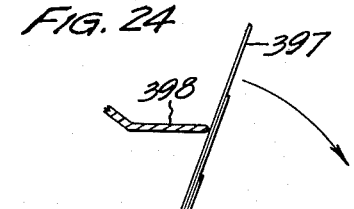
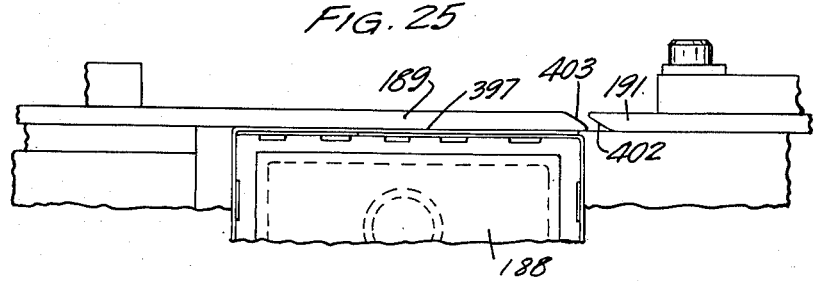
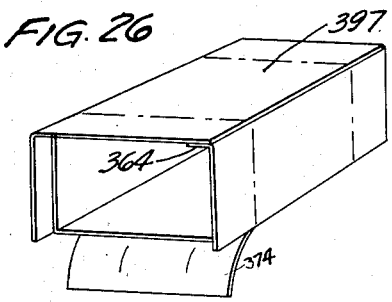
INVENTORS
PAUL E. FISCHER
ROBERT S. HEDIN
CHARLES H. SWANSON
HENRY E. WISSMAN
BY William C. Strueber
ATTORNEY

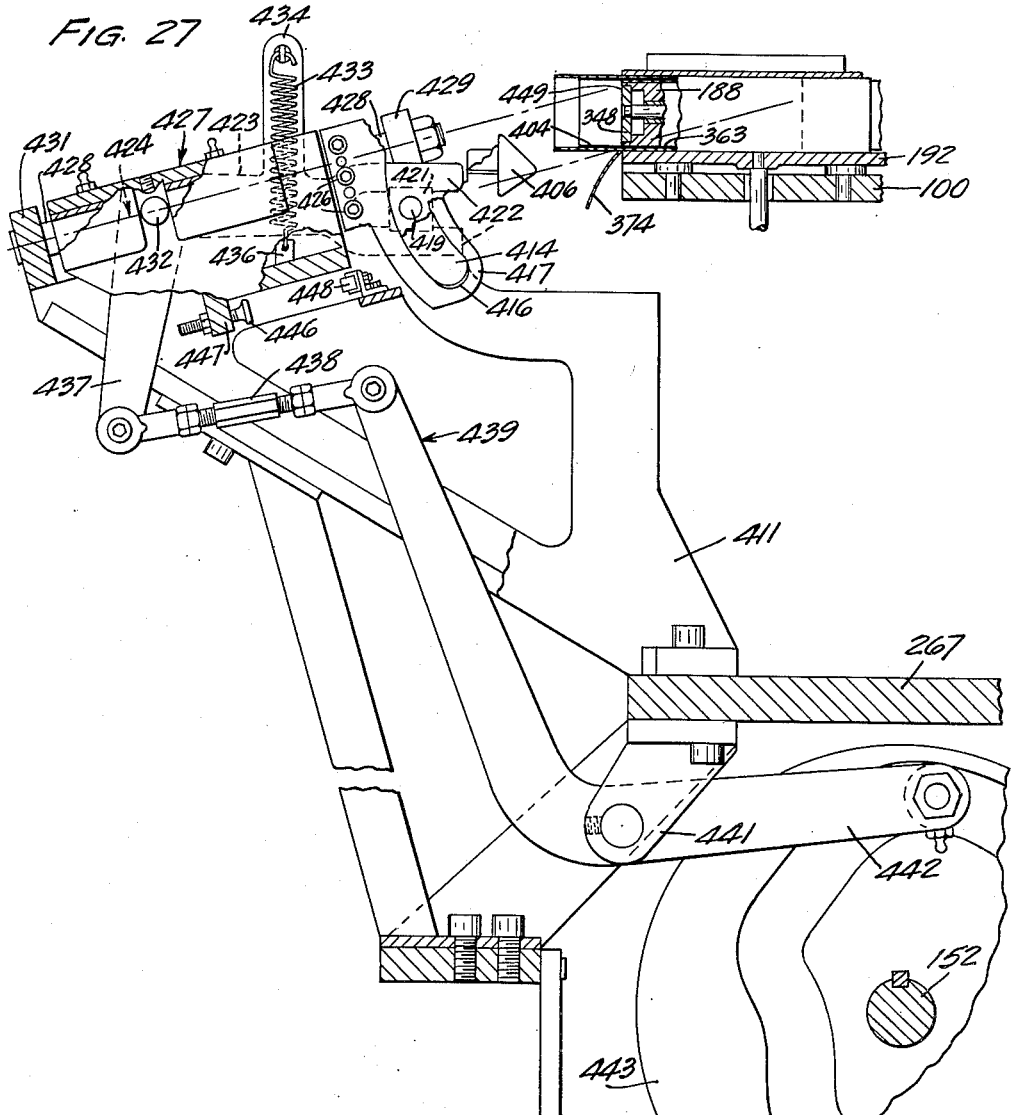
Fig. 27
Fig. 28
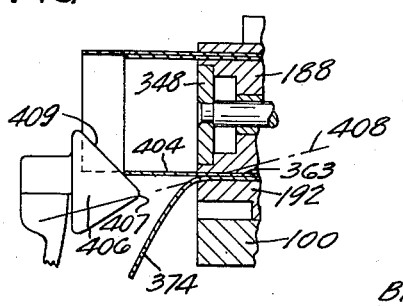
INVENTORS
PAUL E. FISCHER
ROBERT S. HEDIN
CHARLES H. SWANSON
HENRY E. WISSMAN
BY William C. Strueber
ATTORNEY Jan. 8, 1957   P. E. FISCHER ET AL   2,776,609
MECHANISM FOR MAKING CONTAINERS
Filed March 31, 1952   48 Sheets-Sheet 18

INVENTORS
PAUL E. FISCHER
ROBERT S. HEDIN
CHARLES H. SWANSON
HENRY E. WISSMAN
BY William C. Strueber  ATTORNEY Jan. 8, 1957 P. E. FISCHER ET AL 2,776,609
MECHANISM FOR MAKING CONTAINERS
Filed March 31, 1952 48 Sheets-Sheet 19
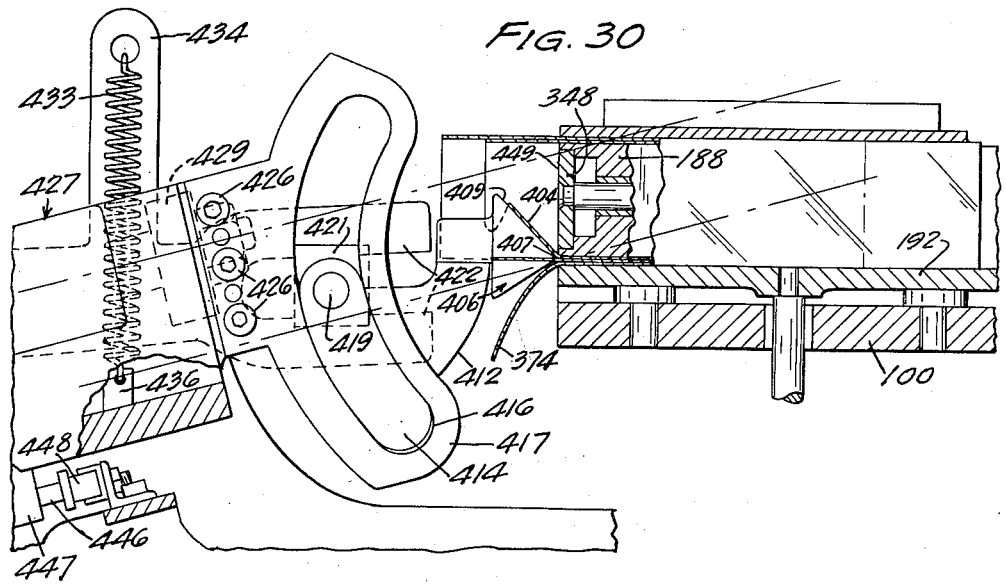
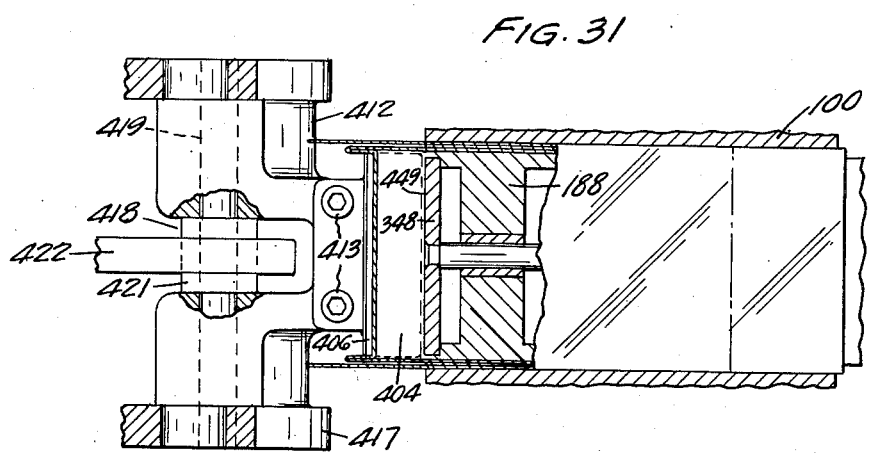
INVENTORS
PAUL E. FISCHER
ROBERT S. HEDIN
CHARLES H. SWANSON
HENRY E. WISSMAN
BY William C. Strueber ATTORNEY Jan. 8, 1957   P. E. FISCHER ET AL   2,776,609
MECHANISM FOR MAKING CONTAINERS
Filed March 31, 1952   48 Sheets-Sheet 20

INVENTORS
PAUL E. FISCHER
ROBERT S. HEDIN
CHARLES H. SWANSON
HENRY E. WISSMAN
BY
William C. Strueber
ATTORNEY

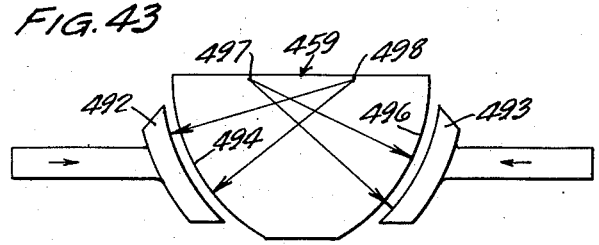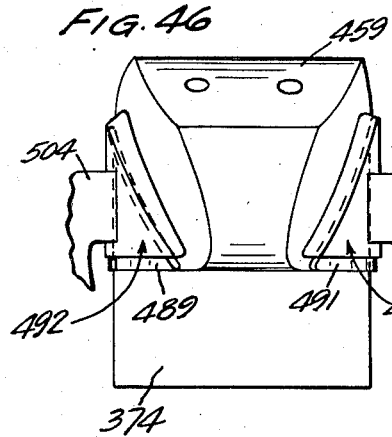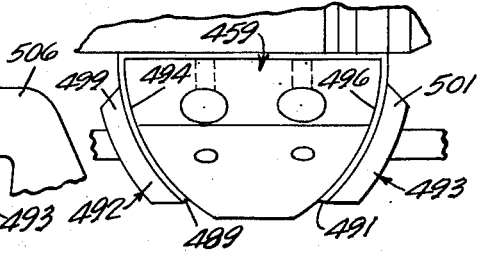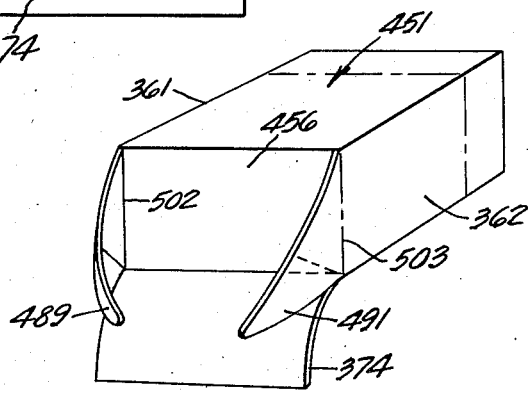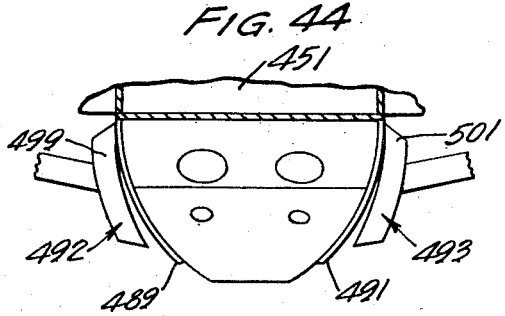

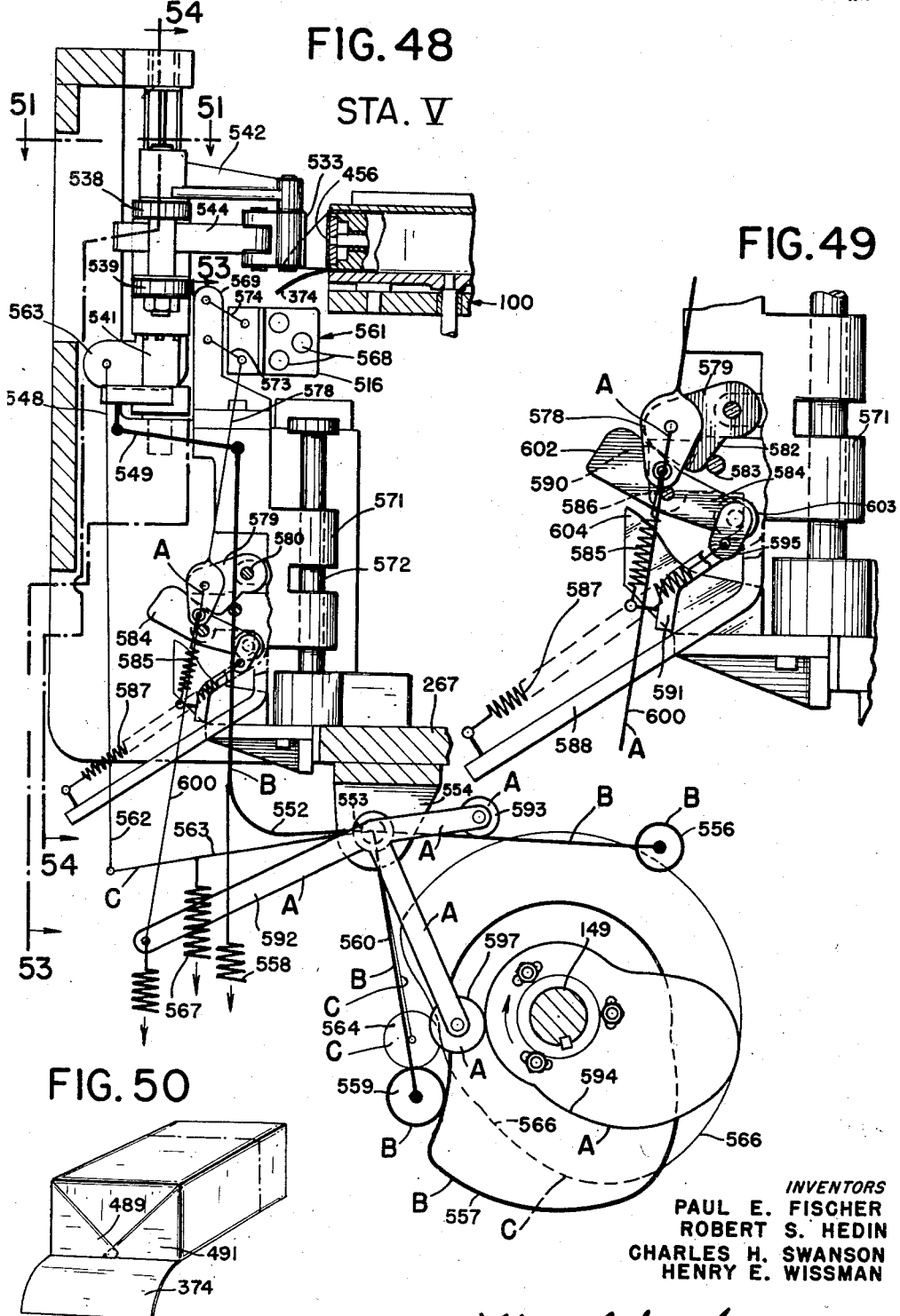

Jan. 8, 1957    P. E. FISCHER ET AL    2,776,609
MECHANISM FOR MAKING CONTAINERS
Filed March 31, 1952    48 Sheets-Sheet 23

INVENTORS
PAUL E. FISCHER
ROBERT S. HEDIN
CHARLES H. SWANSON
HENRY E. WISSMAN

BY William C. Stueber  ATTORNEY

Jan. 8, 1957  P. E. FISCHER ET AL  2,776,609
MECHANISM FOR MAKING CONTAINERS
Filed March 31, 1952  48 Sheets-Sheet 24

INVENTORS
PAUL E. FISCHER
ROBERT S. HEDIN
CHARLES H. SWANSON
HENRY E. WISSMAN

BY William C. Weber ATTORNEY

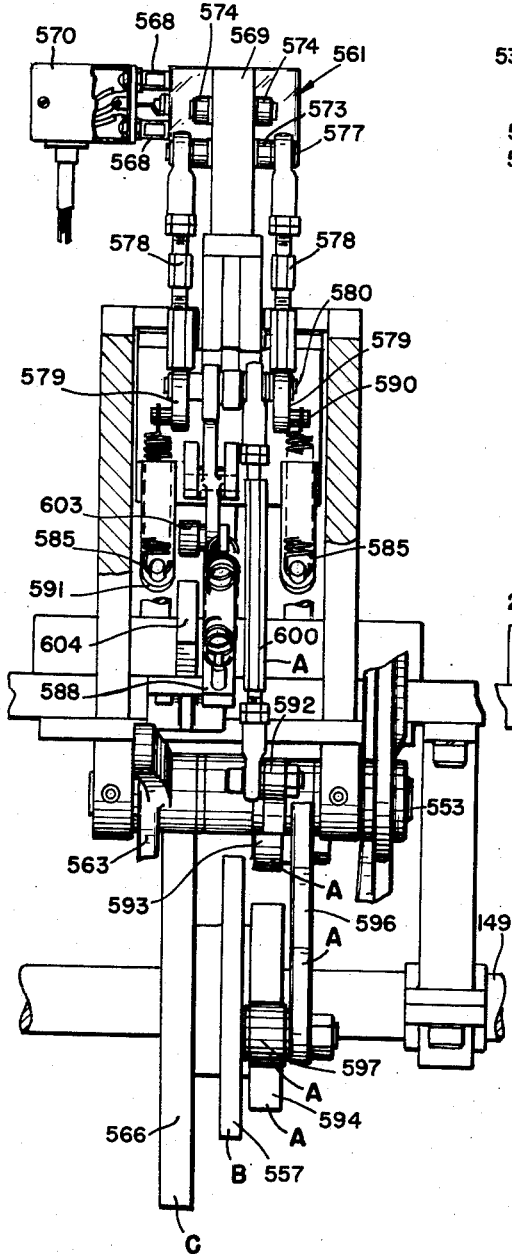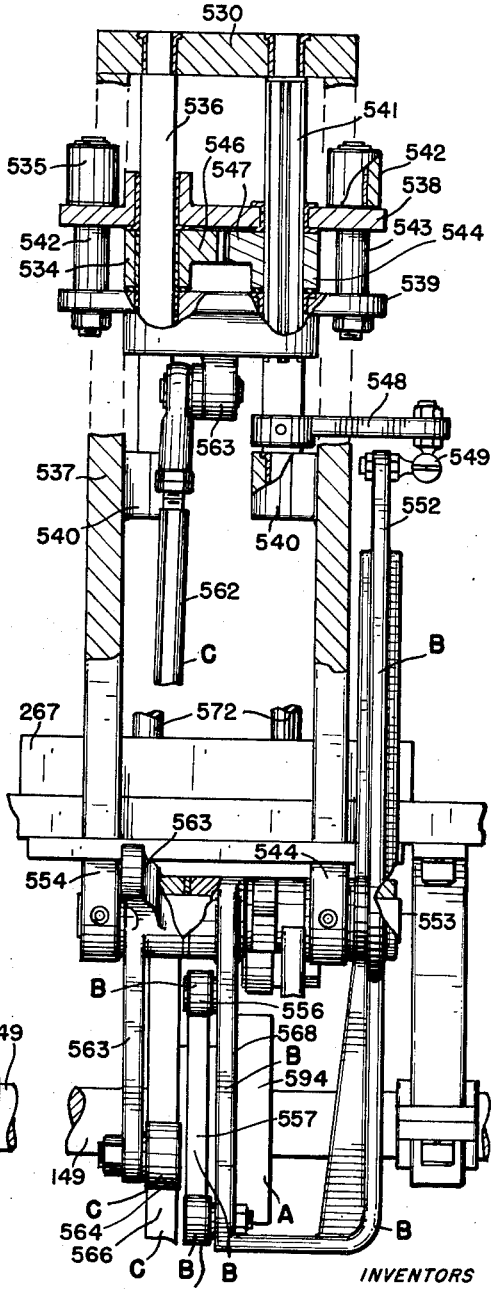

Jan. 8, 1957 P. E. FISCHER ET AL 2,776,609
MECHANISM FOR MAKING CONTAINERS
Filed March 31, 1952 48 Sheets-Sheet 26

INVENTORS
PAUL E. FISCHER
ROBERT S. HEDIN
CHARLES H. SWANSON
HENRY E. WISSMAN

BY *William C. Strieber* ATTORNEY

Jan. 8, 1957   P. E. FISCHER ET AL   2,776,609
MECHANISM FOR MAKING CONTAINERS
Filed March 31, 1952   48 Sheets-Sheet 27
FIG. 58
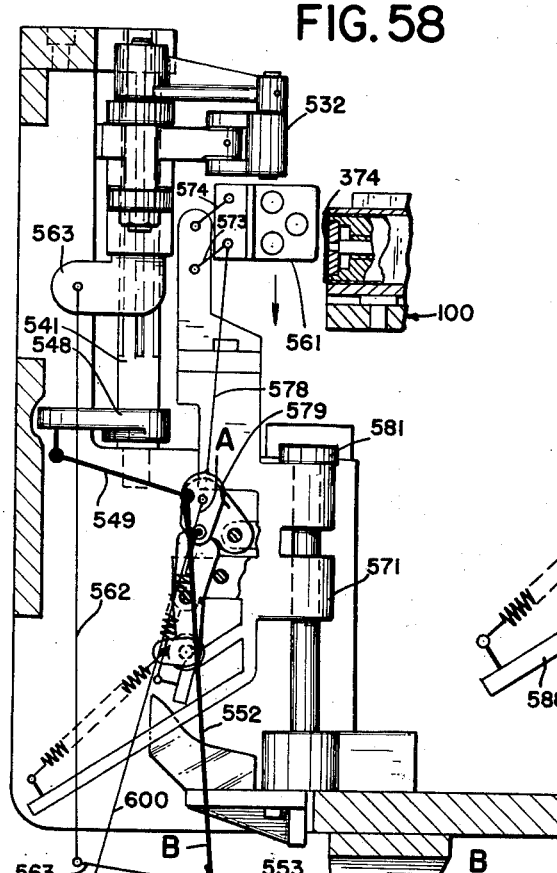
FIG. 59
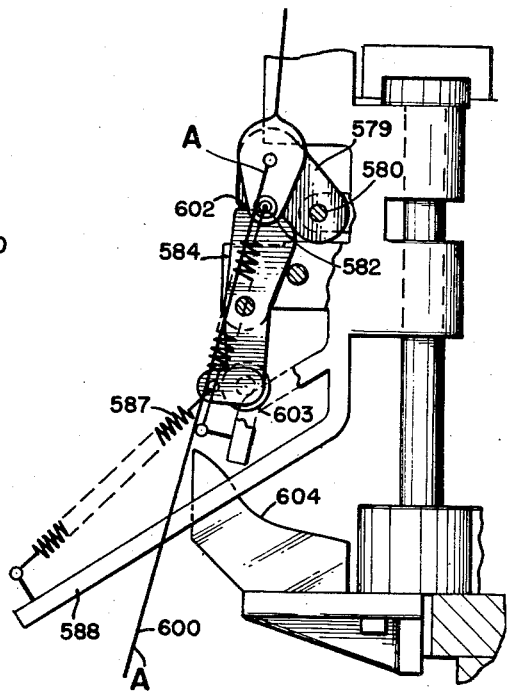
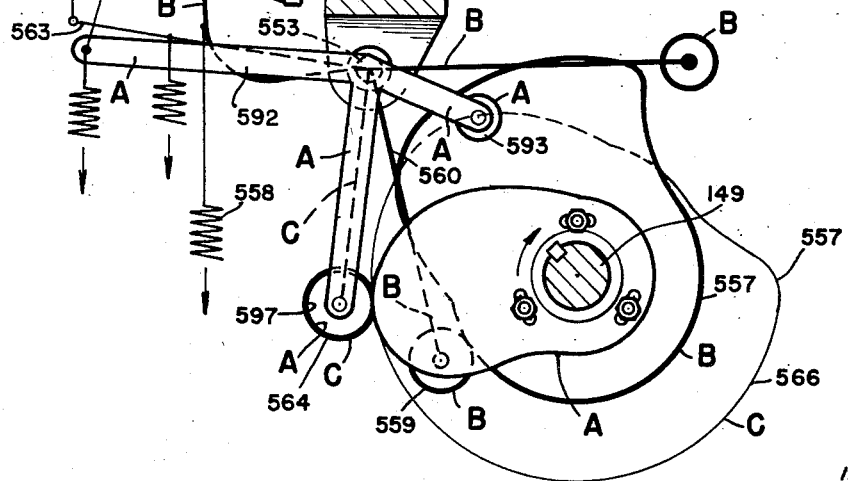
INVENTORS
PAUL E. FISCHER
ROBERT S. HEDIN
CHARLES H. SWANSON
HENRY E. WISSMAN
BY *William C. Stueber*   ATTORNEY Jan. 8, 1957 P. E. FISCHER ET AL 2,776,609
MECHANISM FOR MAKING CONTAINERS
Filed March 31, 1952 48 Sheets-Sheet 28
FIG. 60
FIG. 61
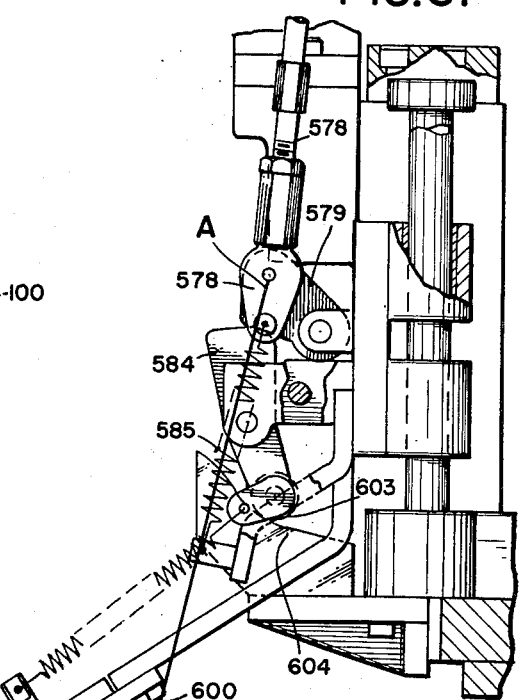
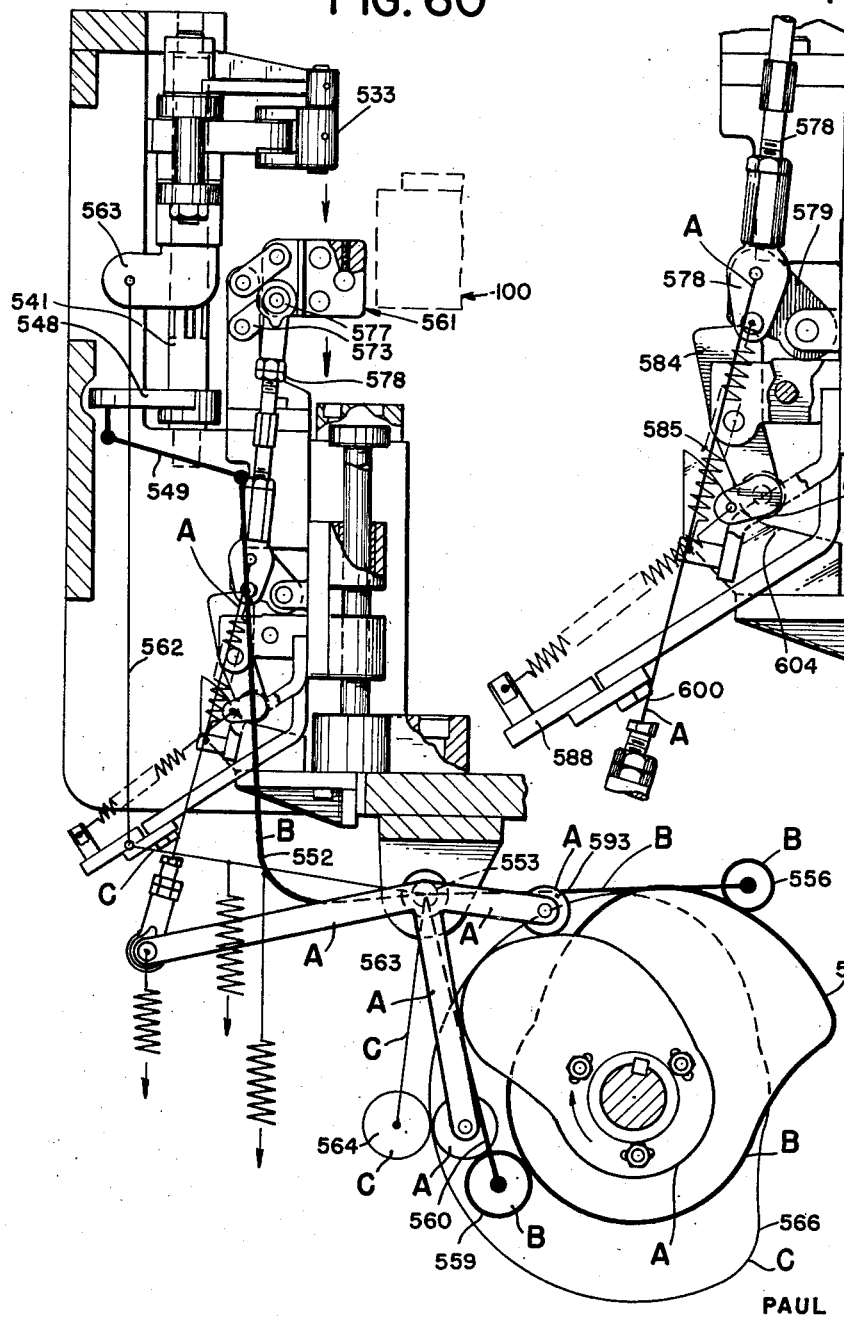
INVENTORS
PAUL E. FISCHER
ROBERT S. HEDIN
CHARLES H. SWANSON
HENRY E. WISSMAN
BY William C. Stueber ATTORNEY

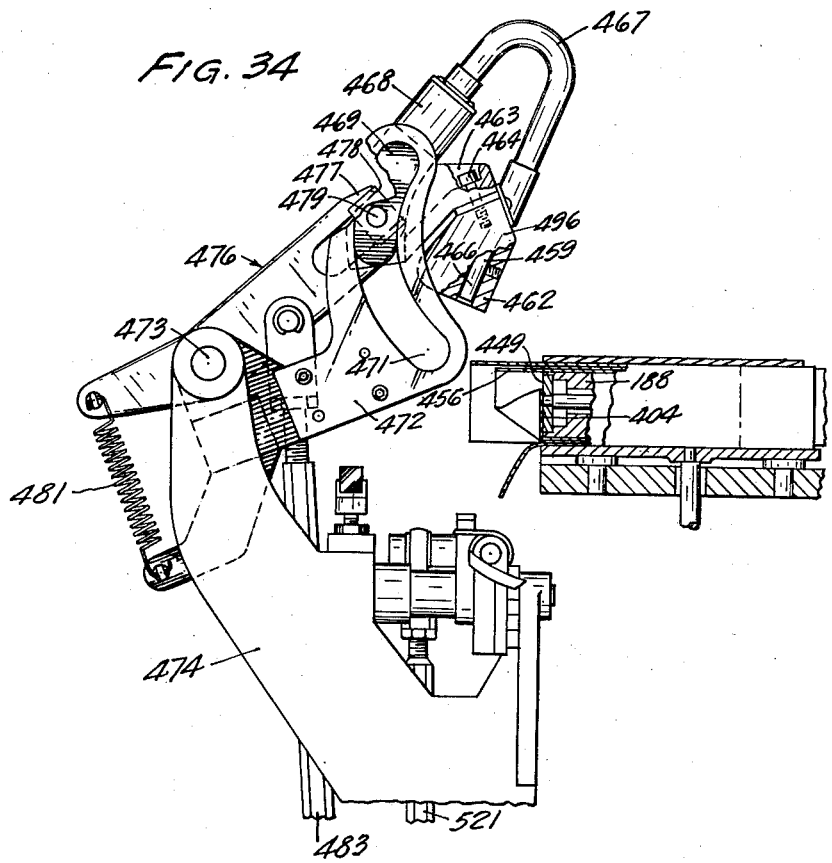

Jan. 8, 1957  P. E. FISCHER ET AL  2,776,609
MECHANISM FOR MAKING CONTAINERS
Filed March 31, 1952  48 Sheets-Sheet 33
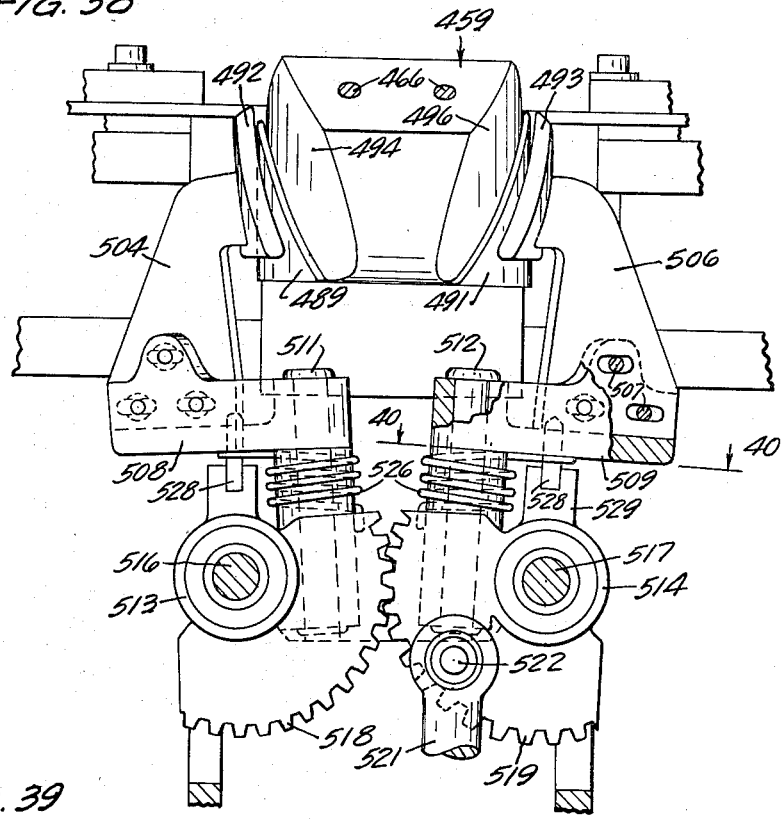
FIG. 38
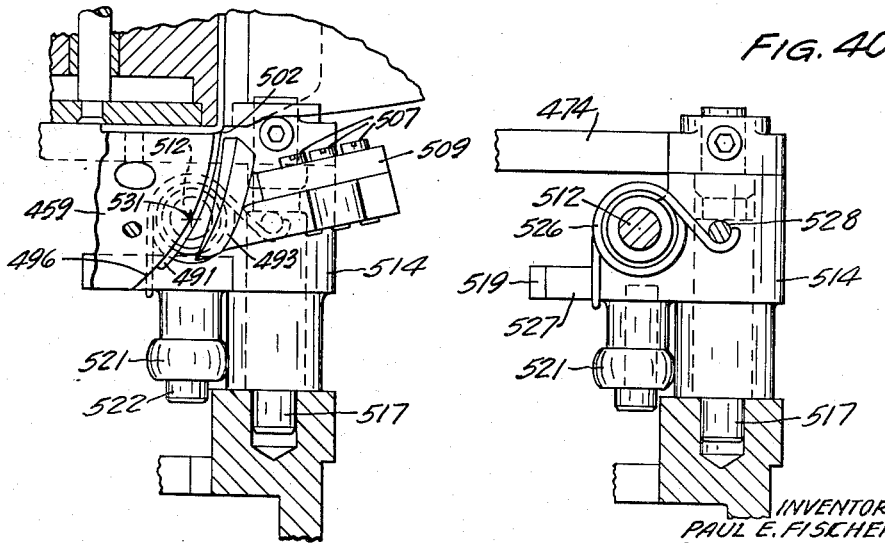
FIG. 39
FIG. 40
INVENTORS
PAUL E. FISCHER
ROBERT S. HEDIN
CHARLES H. SWANSON
HENRY E. WISSMAN
BY William C. Strueber ATTORNEY Jan. 8, 1957 P. E. FISCHER ET AL 2,776,609
MECHANISM FOR MAKING CONTAINERS
Filed March 31, 1952 48 Sheets-Sheet 34

INVENTORS
PAUL E. FISCHER
ROBERT S. HEDIN
CHARLES H. SWANSON
HENRY E. WISSMAN
BY William C. Strueber ATTORNEY

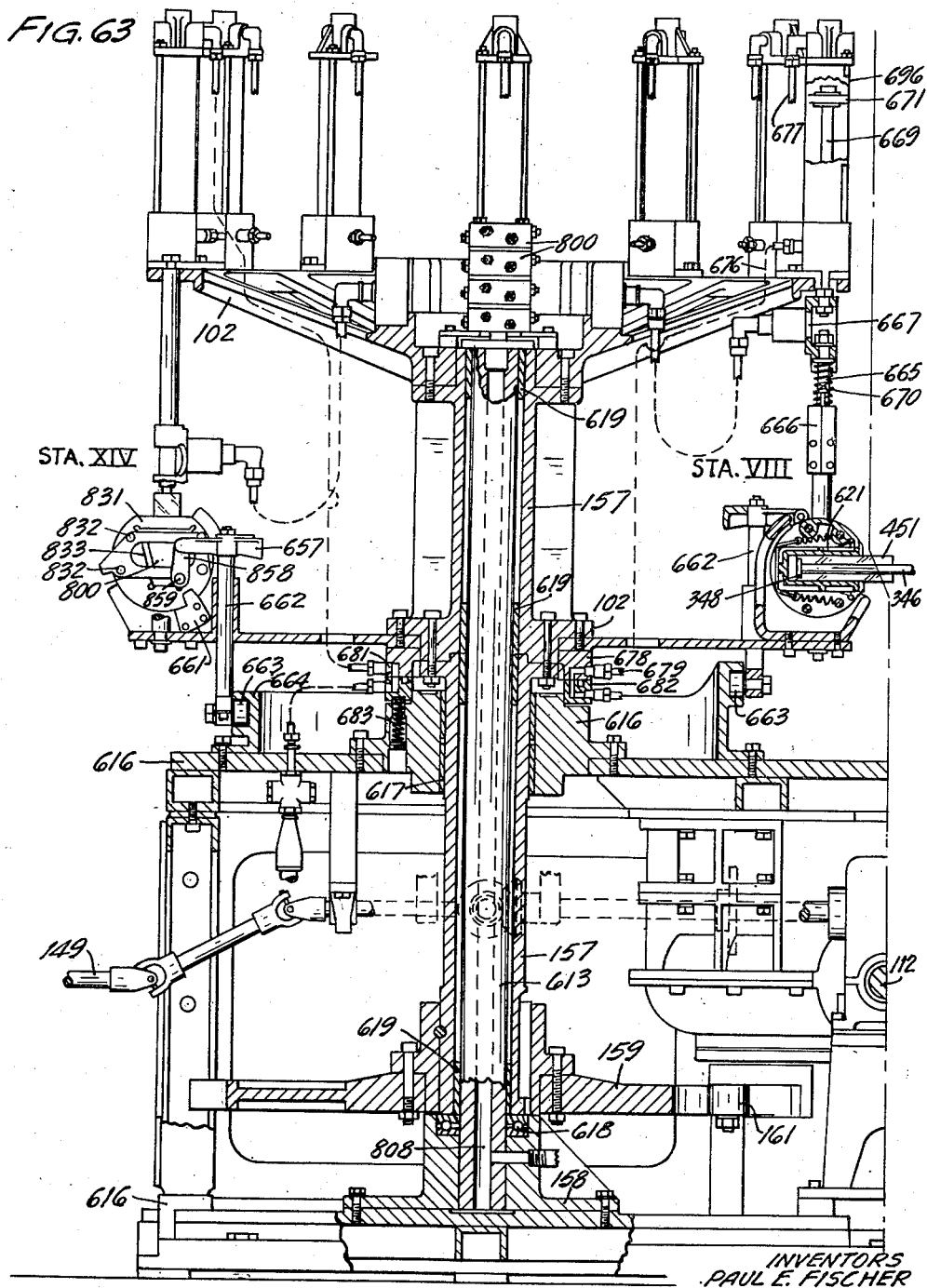

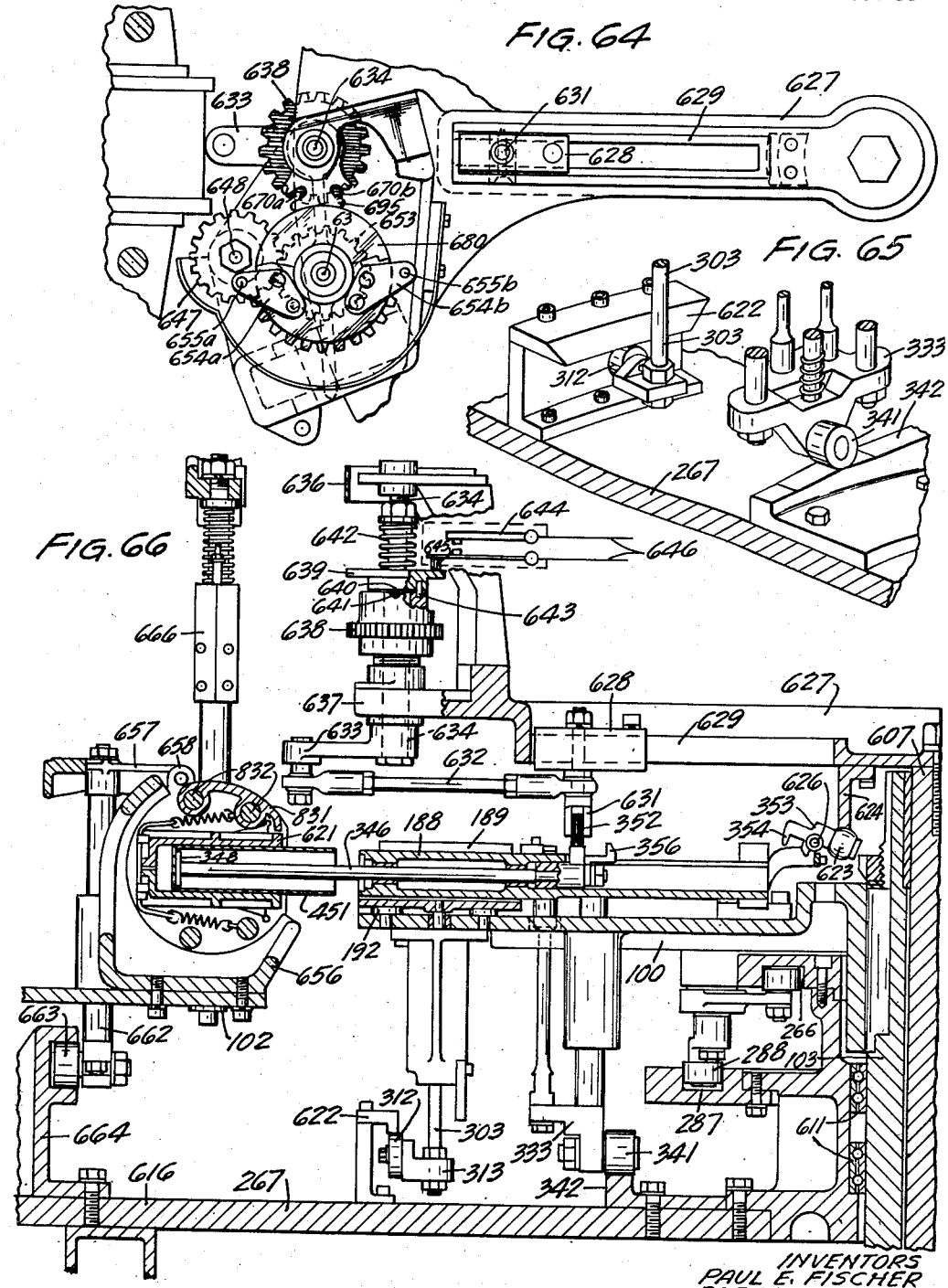

Jan. 8, 1957 P. E. FISCHER ET AL 2,776,609
MECHANISM FOR MAKING CONTAINERS
Filed March 31, 1952 48 Sheets-Sheet 37

INVENTORS
PAUL E. FISCHER
ROBERT S. HEDIN
CHARLES H. SWANSON
HENRY E. WISSMAN
BY
William C. Strueber ATTORNEY

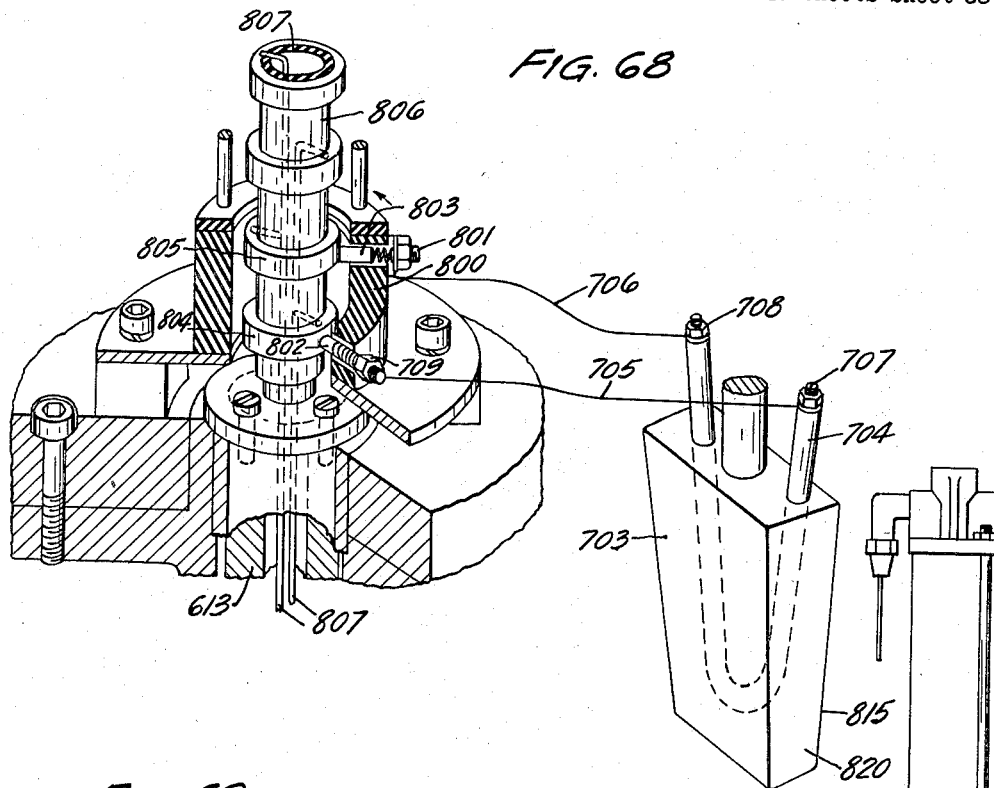
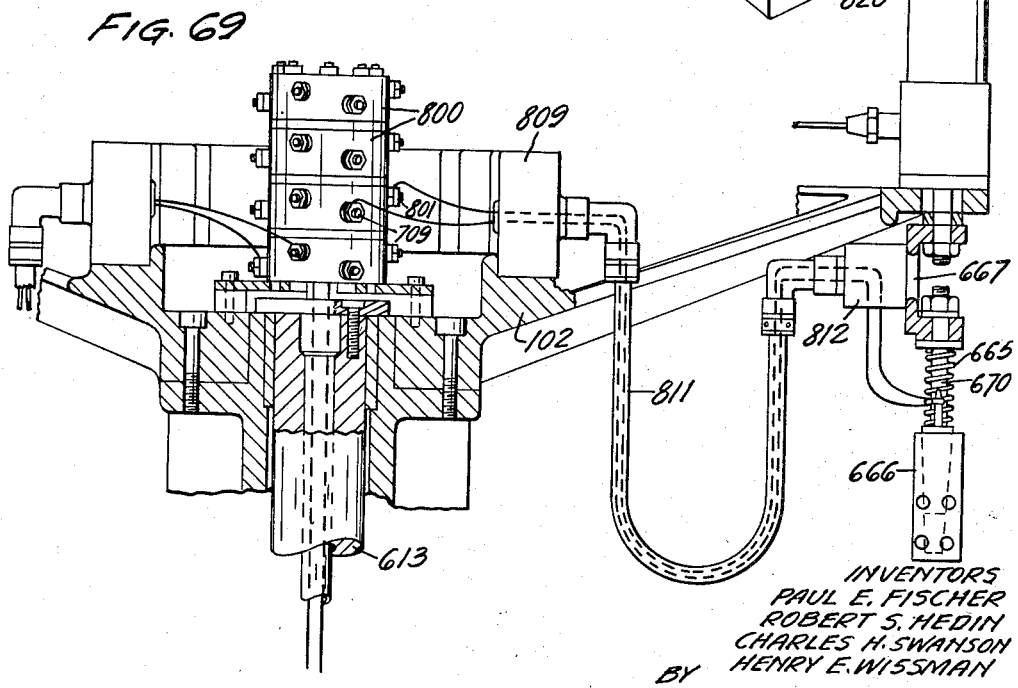

Jan. 8, 1957 P. E. FISCHER ET AL 2,776,609
MECHANISM FOR MAKING CONTAINERS
Filed March 31, 1952 48 Sheets-Sheet 39
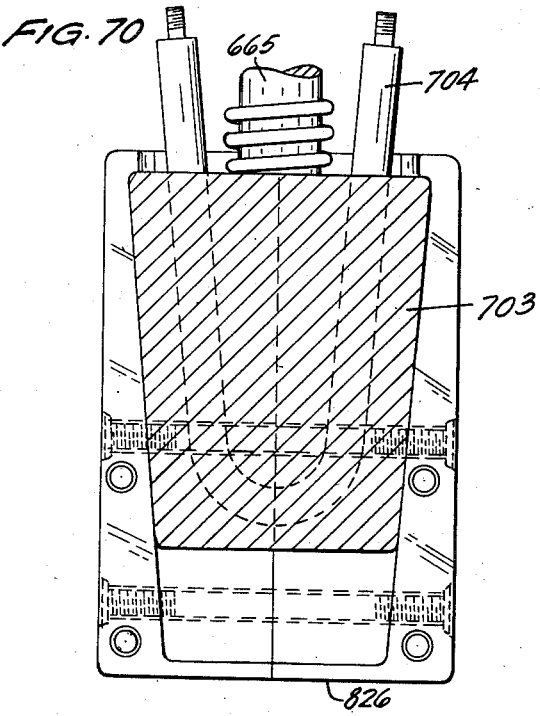
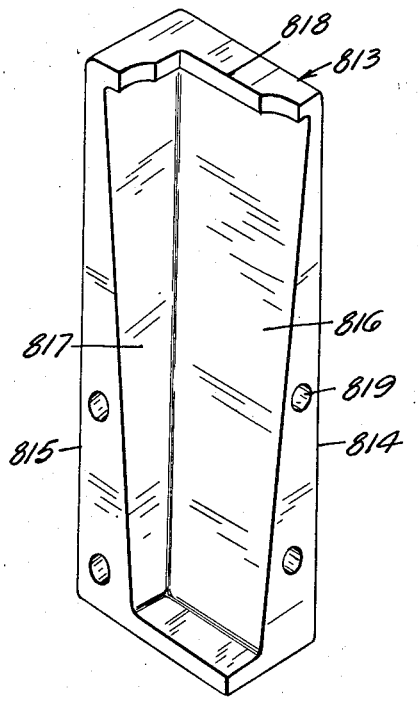
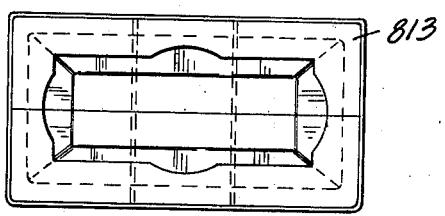
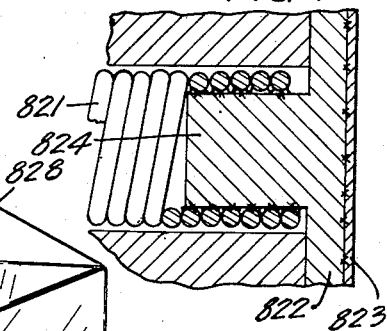
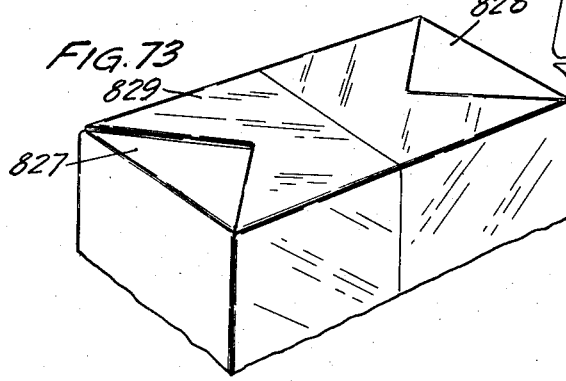
INVENTORS
PAUL E. FISCHER
ROBERT S. HEDIN
CHARLES H. SWANSON
HENRY E. WISSMAN
BY
William C. Strieber ATTORNEY Jan. 8, 1957 P. E. FISCHER ET AL 2,776,609
MECHANISM FOR MAKING CONTAINERS
Filed March 31, 1952 48 Sheets-Sheet 40
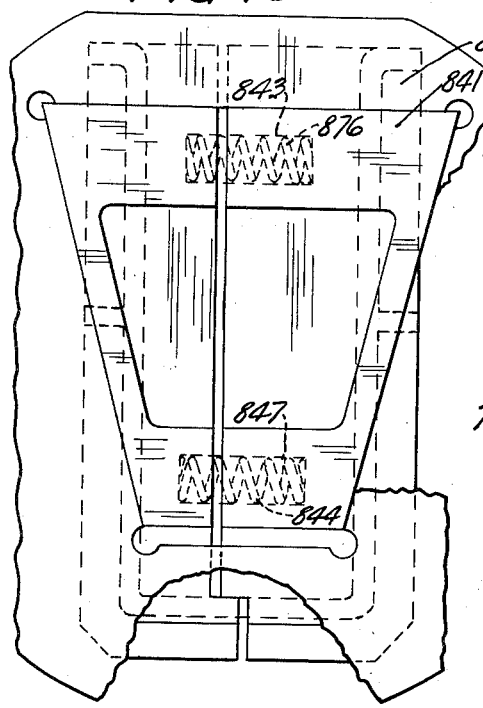
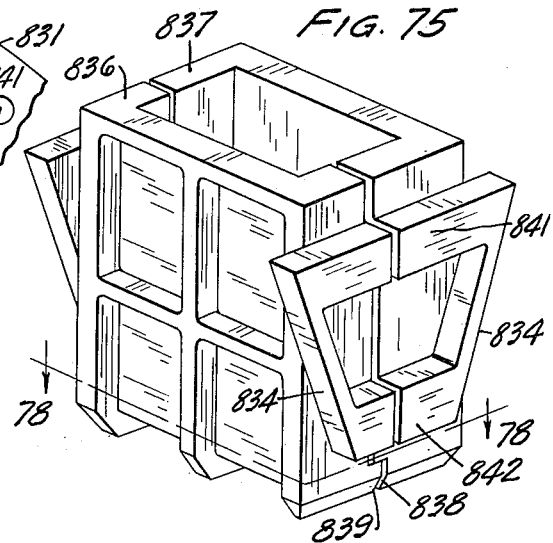
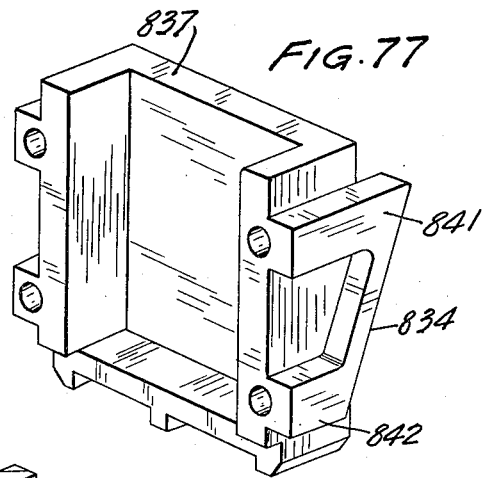
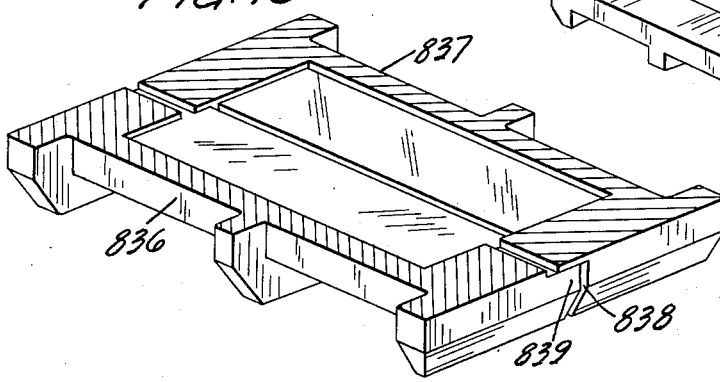
INVENTORS
PAUL E. FISCHER
ROBERT S. HEDIN
CHARLES H. SWANSON
HENRY E. WISSMAN
BY
William C. Strieber ATTORNEY

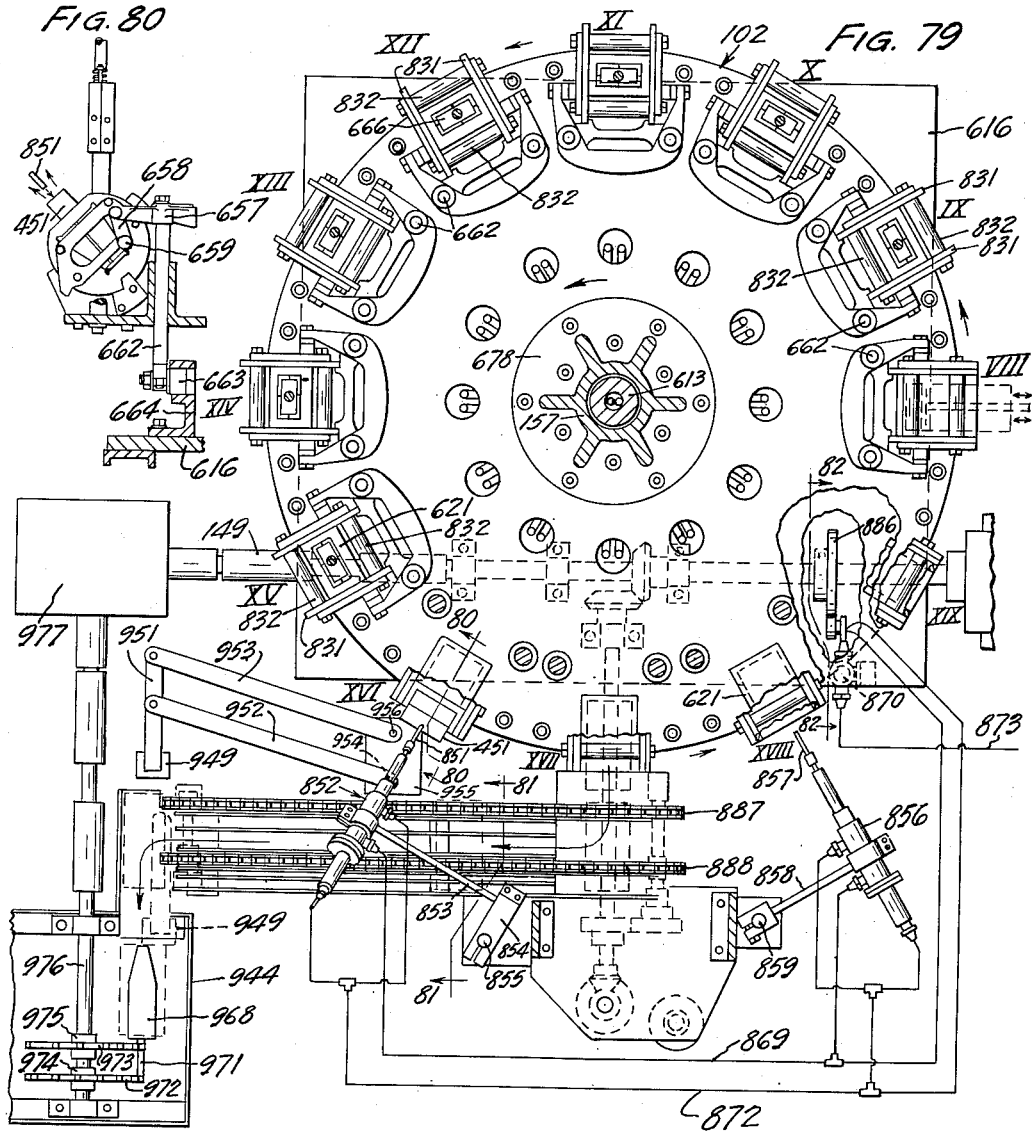

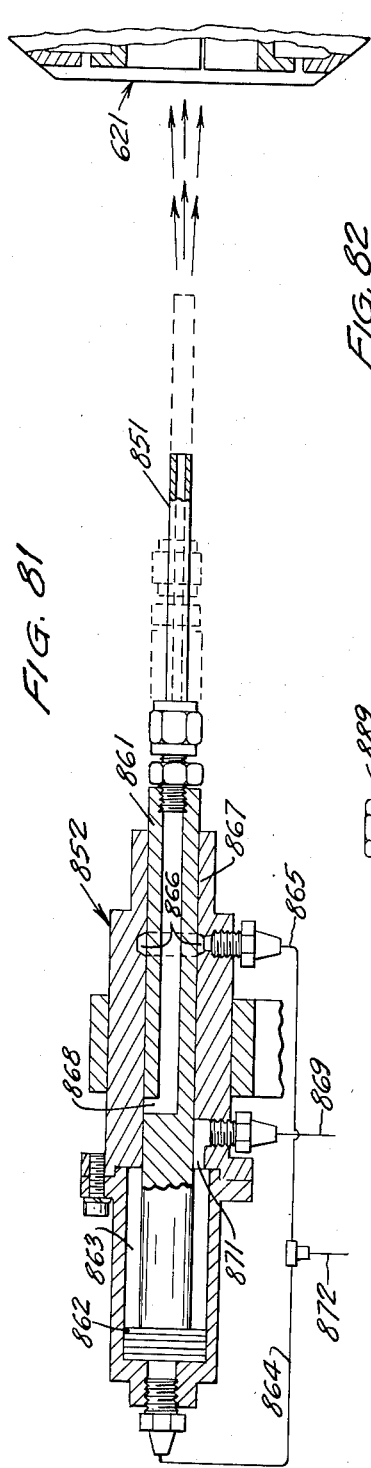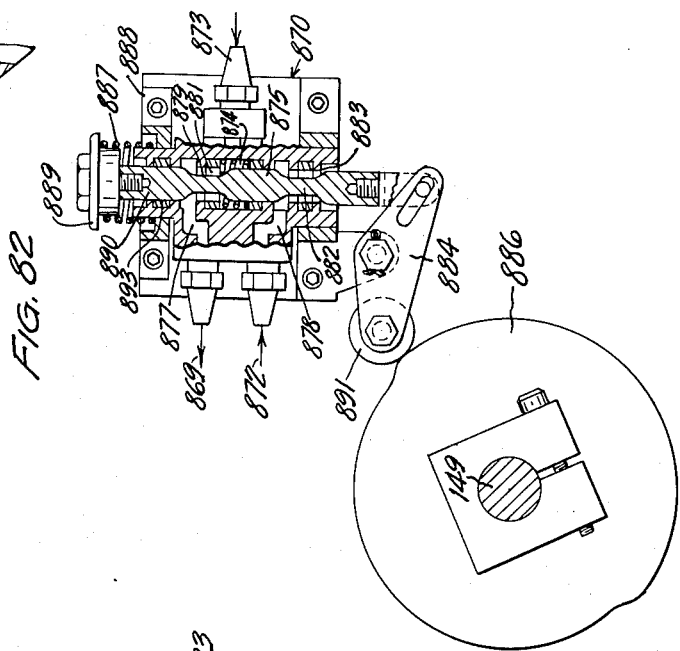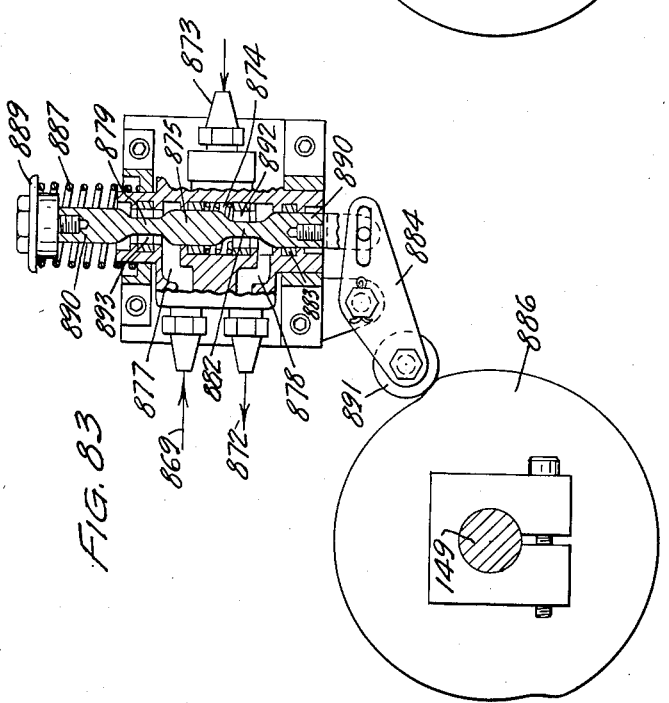

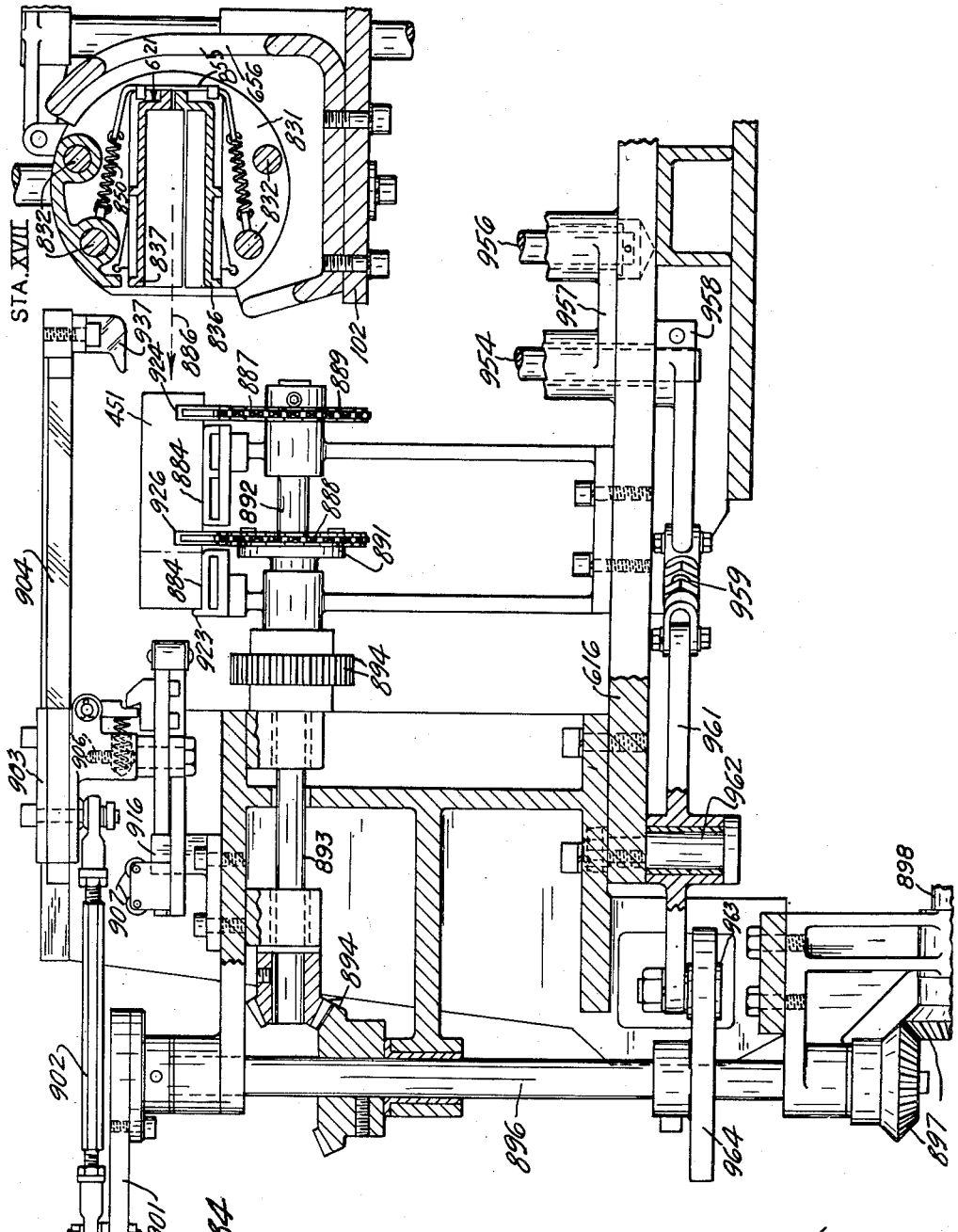

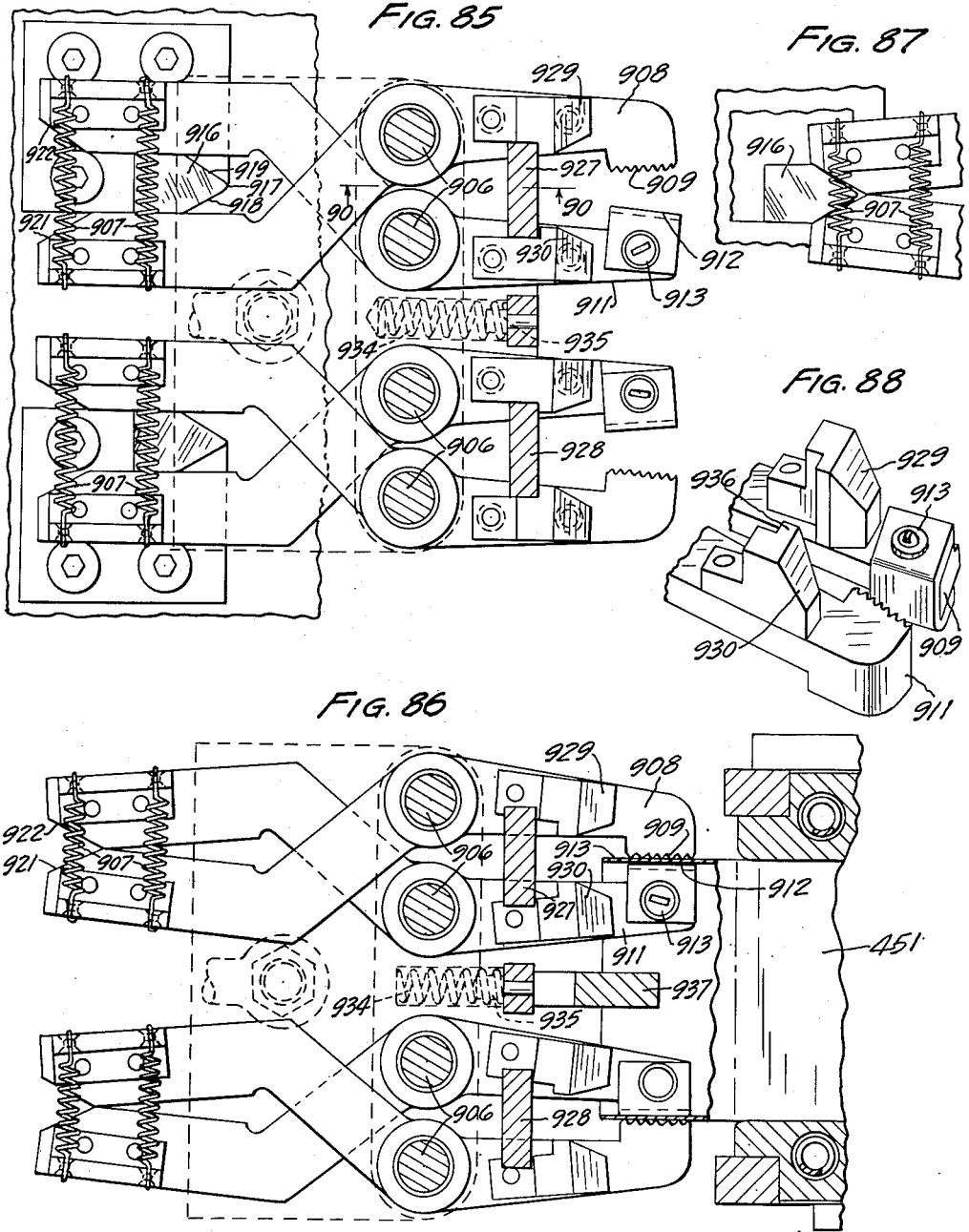

Jan. 8, 1957   P. E. FISCHER ET AL   2,776,609
MECHANISM FOR MAKING CONTAINERS
Filed March 31, 1952   48 Sheets-Sheet 45

INVENTORS
PAUL E. FISCHER
ROBERT S. HEDIN
CHARLES H. SWANSON
HENRY E. WISSMAN
BY
William C. Strueber
ATTORNEY

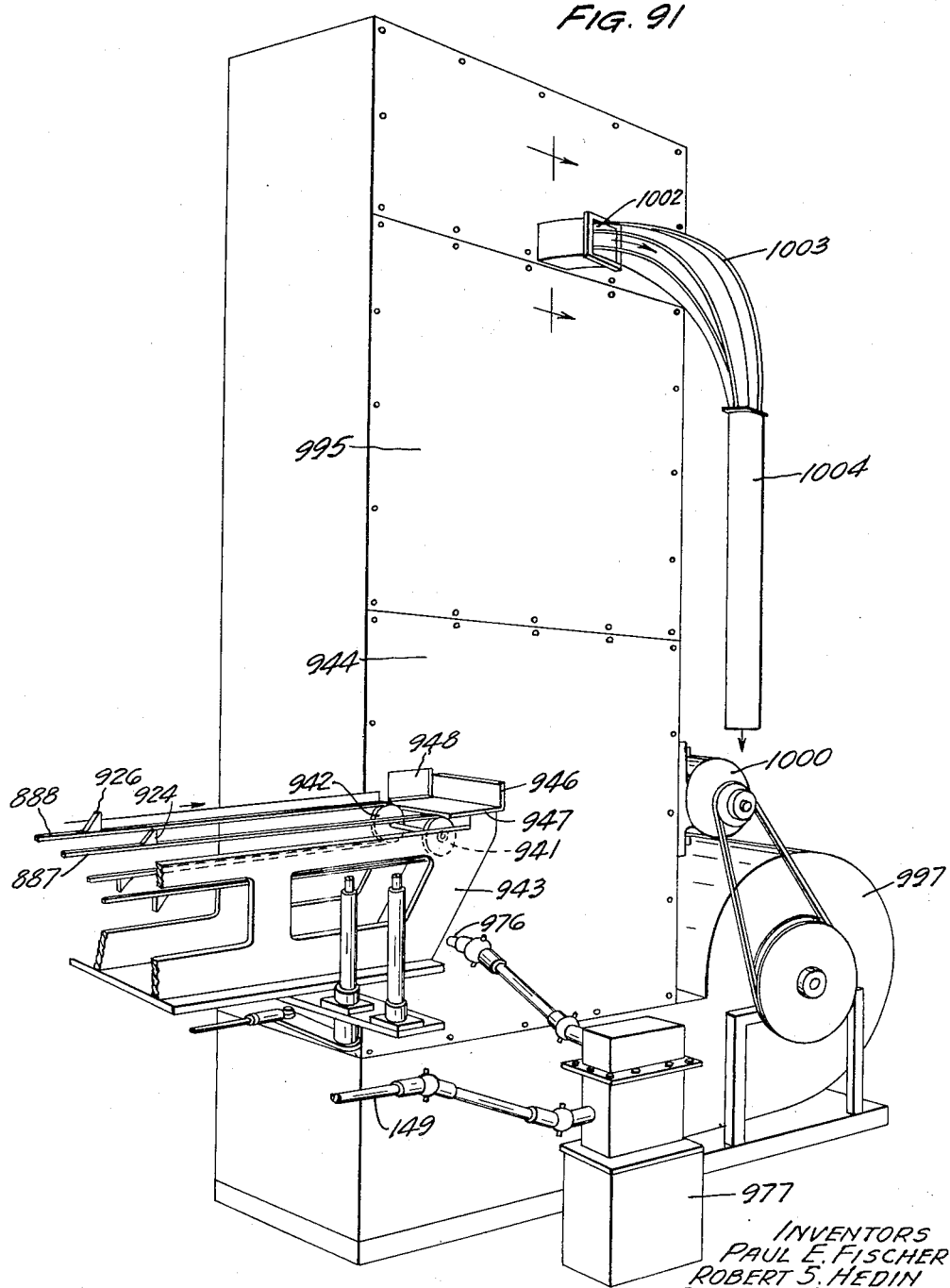

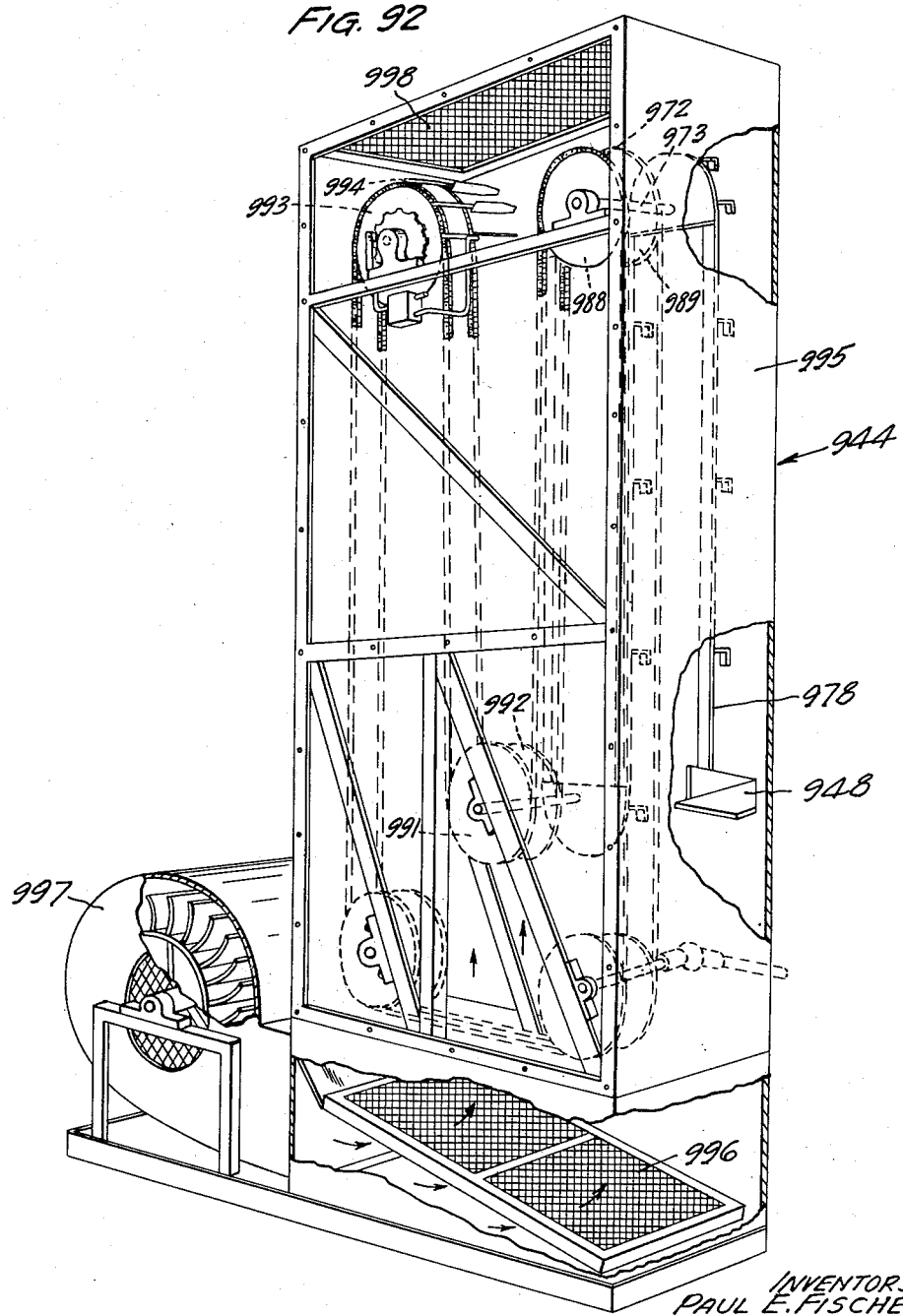

Jan. 8, 1957  P. E. FISCHER ET AL  2,776,609
MECHANISM FOR MAKING CONTAINERS
Filed March 31, 1952  48 Sheets-Sheet 48
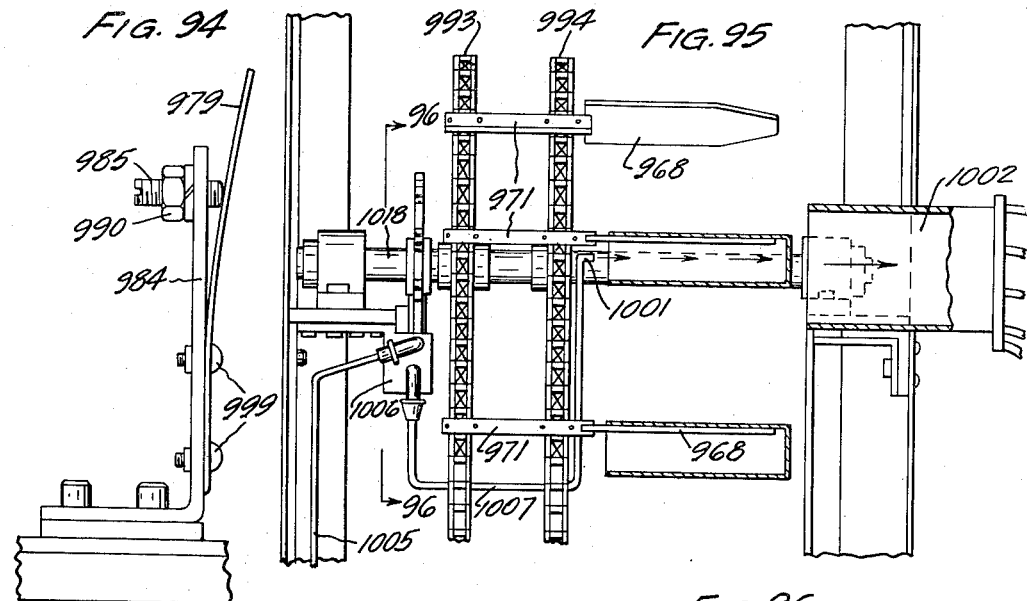
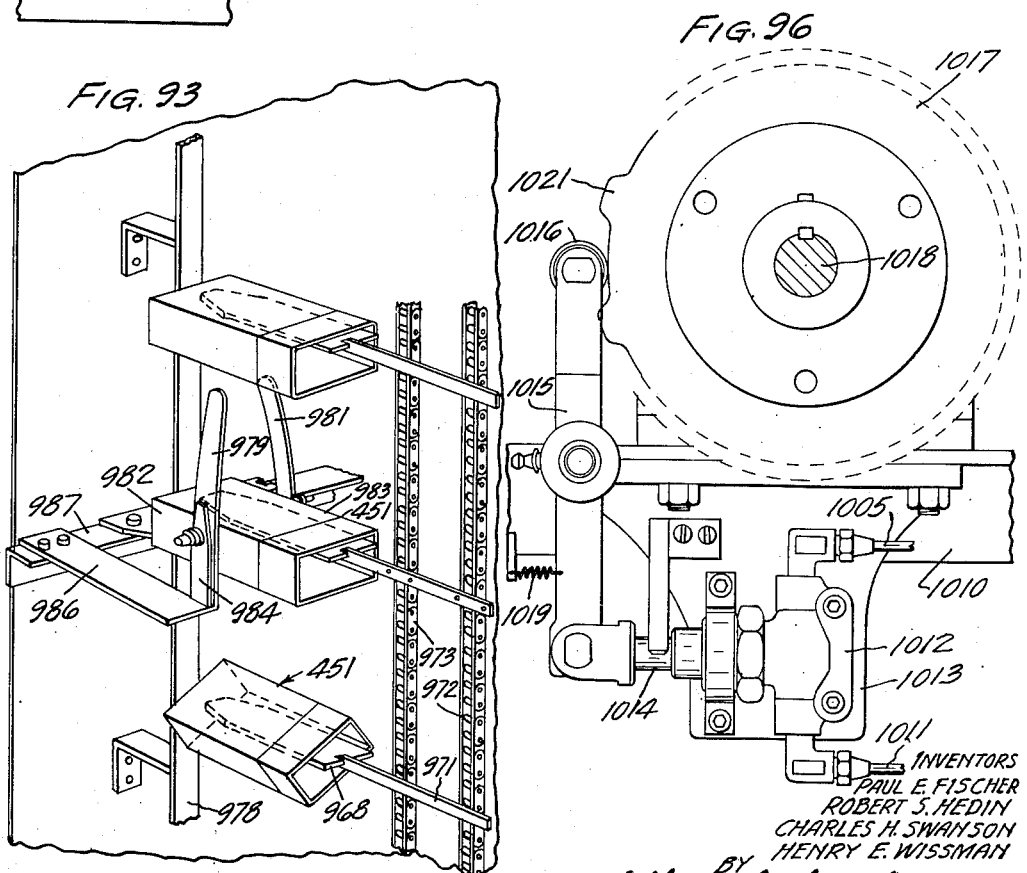

United States Patent Office 2,776,609
Patented Jan. 8, 1957

2,776,609

MECHANISM FOR MAKING CONTAINERS

Paul E. Fischer, Minneapolis, Robert S. Hedin, St. Paul, Charles H. Swanson, Minneapolis, and Henry E. Wissman, St. Paul, Minn., assignors to General Mills, Inc., a corporation of Delaware Application March 31, 1952, Serial No. 279,615

23 Claims. (Cl. 93—51)

The present invention relates to a machine for automatically forming containers from blanks.

More specifically, the invention presents an automatic machine which is capable of receiving previously prepared container blanks of either single or multiple layers, and which will hold the blanks to form a completed container. If a multiple layered blank is used, the blanks are first folded and are welded together after folding. The layers of the multiple layered blank may have a coating of thermoplastic adhesive and the layers are adhered or welded to each other by the fusion of the adhesive between the layers thus forming an air-tight, monolithic container. By welding together the sheets which form the blank after folding, the sheets are left free to slide with respect to each other when being folded, thus preventing wrinkles and stresses from occurring in the walls of the package.

The blanks may be prepared for the folding machine of suitable type, such as that shown in the co-pending application, Mechanism for Preparing Blanks, by the present inventors, Serial No. 279,619, filed March 31, 1952. The machine is well adapted to receive blanks which are multi-layered wherein the inner and outer layers include a sheet of metallic foil to make the container air-tight. The foil may be backed with paper for binding and the layers may include paper to give added strength and a coating of thermoplastic adhesive may be provided between the layers to secure them together.

The machine is entirely automatic, the blank entering as flat sheets of material and leaving the machine as a completed container ready for filling. To obtain high-speed production with such an automatic machine, each operation on the container must be done rapidly. In the present machine the container blanks are received by a turret which carries the blanks around to succeeding folding stations. At each station an operation is performed on the container to further bring it to completion. These operations, which are performed by special folding members, are rapidly performed by each member engaging the particular element of the container on which it operates at high speed. With the use of container material formed of thin metallic foil, difficulty is encountered in that the thin foil is easily scored or scratched, or even torn. Since the cost of foil is proportional to its thickness and a very thin foil would yield an adequately air-tight package, the foil sheets provided are generally relatively thin. In addition to being more easily torn or scratched, metallic foil is different in many physical qualities from other container material, such as paper. Paper has a natural resilience and resistance to bending, which can be depended upon to aid in folding operations and which will keep the container blank material flat when subjected to rough handling. In contrast, foil is very soft and, when bent, tends to take a permanent set and will not spring back to its original shape. Slight pressure, such as caused by drafts of air or by swift movements such as encountered when the blanks are rapidly accelerated while carried on a turret, may cause a deformation of the shape of the foil. These deformations result in the element of the container being improperly placed with respect to the folding element of the machine, preventing the machine element from properly folding the container and often causing the machine to jam.

The present invention forms a container from a multiple layer blank which is unique in that its layers are free to slide or shift with respect to each other. The process of forming a container in this manner is disclosed in the co-pending application, Multi-Layered Container and Method of Making, by Fischer, Hedin, Swanson and Wissman, Serial No. 279,618, filed March 31, 1952. With the present method, which folds the container completely, when each one of the elements of the container is folded before securing the elements with adhesive and before securing the various layers to each other, it must be held in its folded position while the remaining elements are folded. When the carton is completely folded, it must be held in its folded condition while it is transferred to a succeeding carton carrying turret where the entire folded container is welded to thereby permanently secure the elements in their folded relationship. This welding is done by heating the entire area of the container to fuse the thermoplastic adhesive between the layers of the container while holding the container in its proper shape and simultaneously pressing the layers together. When the thermoplastic is completely fused, the container is gently carried to a cooling mechanism wherein the fused thermoplastic is solidified to complete the container. The accomplishment of the above and the solution of the problems incurred are among the objectives of the present invention.

An object of the present invention is to present a completely automatic container making machine which is capable of successfully forming a container at high speeds.

Another object of the invention is to provide a high-speed automatic package forming machine which can handle blanks having multiple layers including metallic foil without wrinkling or damaging the material.

Another object of the invention is to present a mechanism which will successfully fold a blank formed of a plurality of layers which are unattached except within one side wall of the container, and which will form a complete container from the blank without further attaching the layers of the blank.

Another object of the invention is to present a machine which will successfully fold a light-weight blank formed of layers, including metallic foil, and form the blank into a tubular container having a uniquely folded end wall.

A further object of the invention is to provide a machine which will fold a tubular container from material having layers of metallic foil and thermoplastic adhesive, without sealing any of the seams and securing the container, by activating the thermoplastic between the layers of the end wall until it can be completely laminated by welding the layers of the package together.

A still further object is to present an automatic mechanism which will efficiently and speedily fold a blank into a completed smooth, precise, attractive airtight container.

Another object of the invention is to provide a mechanism which will receive a folded container having substantially unattached multiple layers with layers of thermoplastic adhesive therebetween, and which will attach the container layers by activating the thermoplastic while holding the container in proper shape, and which will subsequently cool and solidify the thermoplastic without permitting the container to lose its shape.

Another object of the invention is to provide various improved automatic packaging machine elements which will smoothly and successfully perform separate operations on a container blank which cooperatively with other operations constitute a complete machine function capable of converting a blank to a finished container.

Other objects and advantages will become apparent from the following specification taken in connection with the accompanying drawings, in which—

Figure 1 is a schematic drawing in perspective showing the arrangement of drive mechanism for the over-all machine;

Fig. 2 is a side elevation in vertical section taken through a body forming turret, showing the mechanism for delivering the container blanks to the turret;

Fig. 3 is a plan view of the mechanism of Fig. 2;

Fig. 4 is a sectional view taken along line 4—4 of Fig. 2;

Fig. 5 is an enlarged vertical section showing the positioning of the blank on the turret;

Fig. 6 is a sectional view taken along line 6—6 of Fig. 3;

Fig. 7 is a sectional view taken along line 7—7 of Fig. 3;

Fig. 8 is a plan view showing the blank in place on the turret and having the mandrel broken away for clarity;

Fig. 9 is a plan view of the body forming turret, having the upper portion broken away to illustrate the operating mechanism for positioning the blank;

Fig. 12 is a front elevation showing the blank on the turret;

Fig. 13 is another view of Fig. 12 showing the blank clamped preparatory to the movement of the turret;

Fig. 14 is a sectional view taken along line 14—14 of Fig. 13;

Fig. 15 is an enlarged front elevation of a portion of the turret illustrating the mandrel ascending into the well to fold the sides of the container;

Fig. 16 is a perspective view showing the condition of the blank after receiving the folding illustrated by Fig. 15;

Fig. 18 is another view of Fig. 17 showing the folding action of the elements of Station II;

Fig. 19 is a front elevational view taken from outside the turret of the mechanism of Station II, having portions removed for clarity;

Fig. 20 is a sectional view taken along line 20—20 of Fig. 17;

Fig. 21 shows a portion of Fig. 20 illustrating the action of the folding arm;

Fig. 22 shows the condition of the container after the mechanisms of Station II have performed their operations;

Fig. 23 is a vertical sectional view taken through the body forming turret between Stations II and III, illustrating the action of the bar for bending the container wall;

Fig. 24 is a vertical sectional view taken from the end of the mandrel, showing the action of the folding elements between Stations II and III;

Fig. 25 is an enlarged detailed view in front elevation illustrating the action of the folding plates to complete the folding of the blank into an open ended tubular form;

Fig. 26 is a perspective view of the container showing it folded to tubular form as it arrives at Station III;

Fig. 27 is a vertical sectional view taken through Station III;

Fig. 28 is an enlarged detailed view of a portion of Fig. 27 illustrating the action of the folding member as it engages the bottom of the container;

Fig. 30 is an enlarged vertical elevational view partially in section taken through Station III, illustrating further action of the folding member as shown in Figs. 27 and 28;

Fig. 31 is a plan view partially in section showing the action of the mechanism of Fig. 30;

Fig. 34 is a side elevation partially in section taken through Station IV;

Fig. 38 is an enlarged elevational view of the mechanism of Fig. 37, having portions removed to illustrate the action of the flap folding members;

Fig. 39 is a plan view partially in section of a portion of Fig. 38;

Fig. 40 is a sectional view taken along line 40—40 of Fig. 38;

Fig. 43 is a schematic plan view illustrating the curvature of various folding elements of Station IV;

Fig. 44 is a plan view showing the curved flap folding shoes of Station IV about to engage the carton flaps;

Fig. 45 is another view of Fig. 44, showing the movement of the flap folding shoes after engagement;

Fig. 46 is a front elevational view of Fig. 44;

Fig. 47 is a perspective view of the carton showing its condition after being folded at Station IV;

Fig. 48 is a side elevation of the mechanism of Station V; showing portions of the mechanism in section for purposes of clarity, and showing certain of the operating arms and springs schematically;

Fig. 49 is an enlarged view of a portion of Fig. 48, showing the position of the locking elements of the mechanism of Station V;

Fig. 50 is a perspective view showing the condition of the carton after the flaps have been folded by the mechanism of Fig. 48;

Fig. 53 is a sectional view taken along line 53—53 of Fig. 48;

Fig. 54 is a sectional view taken along 54—54 of Fig. 48;

Fig. 58 is another view of Fig. 48, showing the folding mechanism in still another position;

Fig. 59 is an enlarged view of a portion of Fig. 58, showing the locking linkage in detail;

Fig. 60 is yet another view of Fig. 48, showing the folding mechanism returning to normal position;

Fig. 61 is an enlarged view of a portion of Fig. 60, showing the position of the locking linkage;

Fig. 63 is a continuation of the drawing of Fig. 62, showing the welding turret in vertical section;

Fig. 64 is an enlarged plan view showing the details of the mechanism which drives the apparatus for carrying the containers from the body forming turret to the welding turret;

Fig. 65 is an enlarged perspective view of a small portion of the body forming turret, illustrating the cam for an operating mechanism to release the container;

Fig. 66 is an enlarged detailed sectional view showing the container being transferred from the body forming to the welding turrent;

Fig. 68 is an enlarged perspective taken partially in section and illustrating the arrangement of the slip rings for feeding electricity to the heated welding mandrels;

Fig. 69 is a front elevation, partially in section, showing the electrical arrangement for feeding current to the welding mandrels;

Fig. 70 is a vertical sectional view taken through the welding mandrel, showing its interior construction;

Fig. 71 is a perspective view of one quarter of the shell of the welding mandrel;

Fig. 72 is a plan view of the top of the welding mandrel with the heated wedge removed;

Fig. 73 is an enlarged perspective view showing the configuration of the bottom of the mandrel;

Fig. 74 is a greatly enlarged sectional view showing the details of mounting the springs within the welding mandrel;

Fig. 75 is a perspective view of the welding box for holding the container while carried on the welding turret;

Fig. 76 is an enlarged side elevation of the welding box and its support;

Fig. 77 is a perspective view of the welding box with the front half of the box removed;

Fig. 78 is a sectional view taken along the line 78—78 of Fig. 75;

Fig. 79 is a perspective view of the entire welding turret, illustrating the positions of the device for blowing air into the containers and into the container supporting boxes;

Fig. 80 is a sectional view taken along line 80—80 of Fig. 79;

Fig. 81 is a horizontal sectional view taken through one of the devices for blowing a jet of air into the container for its supporting box along line 81—81 of Fig. 79;

Fig. 82 is a sectional view taken along line 83—83 of Fig. 79 and having portions of the valve broken away to illustrate its operation;

Fig. 83 is another view of Fig. 82, showing the air valve in a different position;

Fig. 84 is a vertical sectional view taken through the mechanism for removing the container from the welding turret;

Fig. 85 is an enlarged detailed plan view showing the apparatus for pulling the containers from the welding turret;

Fig. 86 is another view of Fig. 85, showing the container being gripped as it is being pulled from the turret;

Fig. 87 is a detailed view of a portion of Fig. 85, showing the action of the cam in spreading the grippers;

Fig. 88 is an enlarged perspective view showing the details of the grippers;

Fig. 91 is a perspective view of the tower for cooling the containers after they have been welded;

Fig. 92 is a perspective view of the cooling tower having portions broken away to show its operating features;

Fig. 93 is an enlarged perspective view showing the details of the mechanism for straightening the boxes as they are carried in the cooling tower;

Fig. 94 is a front elevation showing the detailed construction of the spring straightening members;

Fig. 95 is a side elevation showing the removal of the containers from the cooling tower; and Fig. 96 is an enlarged front elevational view showing the details of the air valve which operates the jet for removing the containers.

Figure 10:
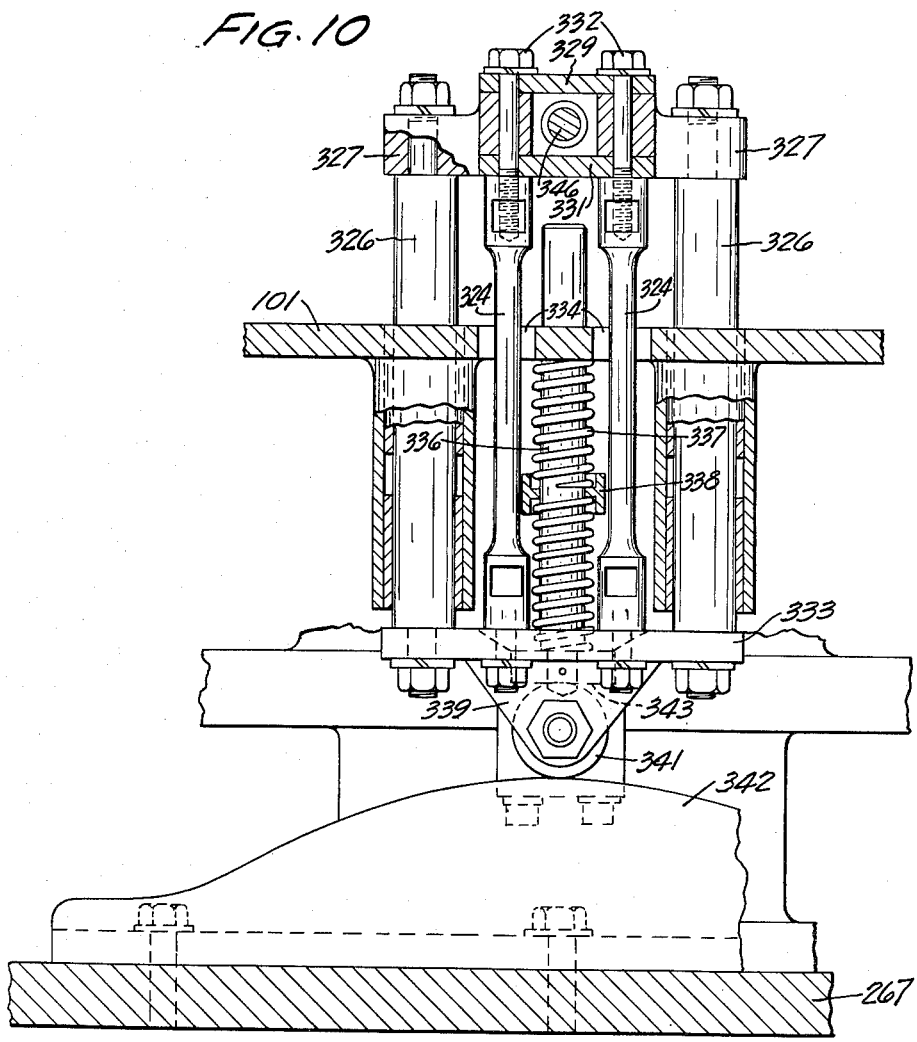
Fig. 10 is an enlarged sectional view taken along line 10—10 of Fig. 2.

The drawings, showing the preferred embodiment of the machine, disclose the various elements as arranged to form a completely automatic machine, the folding elements being arranged around a first turret and container heat-welding elements being arranged on a second turret. The various elements cooperate to form a completed container, receiving it as a prepared blank. However, it is to be understood that many of these elements could be located on other types of machines and are not to be restricted to use in a turret type container former.

The blanks which are folded into a container in the present invention, are formed of three sheets attached to each other in a limited area, which lies wholly within the limits of one side wall of the container. This limited attachment holds the three blanks in absolute registry and yet permits them to slide with respect to each other when being folded into the shape of a container. The blank is gripped at the location where the sheets are attached and the sheets are free to slide with respect to each other over the remainder of their area.

The sheets may be formed of any material, but preferably the inner and outer blanks are formed of metallic foil with a coating of thermoplastic adhesive and the intermediate blank is formed of a binder and stiffener material, such as paper, coated on both sides with thermoplastic. A blank of this type and the formation thereof are shown in detail in the co-pending application, Mechanism for Preparing Blanks, mentioned above. Since the machine is designed to be able to handle multiple sheets of paper of light-weight delicate material, such as metallic foil, it is preferably used with this type of blank as therewith the greatest number of advantages are obtained. It will be understood, however, that the features of the invention may be utilized for folding blanks of many varieties.

Referring now to the drawings, Fig. 1 shows a schematic representation of the body forming turret 100 and the welding turret 102 and of the drive mechanism for actuating the turrets and the folding devices. This drawing will be frequently referred to to aid in connecting the various detail illustrations with the over-all machine.

The container blank which has been previously prepared enters the machine at the position labeled I. It will be noticed that each succeeding station around the body forming turret is labeled with a Roman numeral, indicating the station number. At each one of these stations is positioned apparatus for performing a folding function on the container. The description of the machine will be separated into sections, labelled with the number of the station at which the mechanism is found, to aid in clarity and to enable quick reference to mechanism of a particular station. The turret shown, is indexed in a clockwise direction to carry the container blank around to each of the stations, the turret being briefly halted between each indexing movement to permit the mechanism at the station to perform its function on the container blank. After a folding operation has been performed on a blank at a particular station, the turret indexes the blank to the next succeeding station where it receives an additional operation. After it has been carried through to Station VII, the blank has been folded into a completed container and this container, held in shape by the mechanical folding elements, is transferred to the welding turret 102. In this turret heat is applied to the container while it is held in shape in a unique manner, to fuse the thermoplastic adhesive between the layers which form the container, thereby welding the inner and outer walls and intermediate layers together to make a composite container. The adhesive is partly cooled to set it on the welding turret while the box is held in shape. The box at the station marked XVII on the welding turret is then transferred to a conveyor where it is carried to a cooling tower to completely solidify the adhesive to complete the container.

The body forming turret 100 itself, is a circular table 101 with pockets 105 around the edge for carrying the containers. The table 101 is carried on vertical shaft 103 which is rotatably supported in a bearing 104 at its base. The turret is intermittently rotated by means of a Geneva drive, the Geneva gear 106 being secured to the shaft 103 and the Geneva pinion 107 rotating with the shaft 108. This shaft is rotated by a worm gear, the gear 109 on the shaft 108 being rotated by a worm 111 on main shaft 112 which is driven through a clutch 113 by a pulley 114 driven by a belt 116, which is driven by a pulley 117 driven by the main drive motor 118, which drives the entire machine. A speed control 119 on the motor, adjusted by hand wheel 121, permits control of the speed of the entire machine. At the end of main shaft 112 opposite the clutch, is a hand wheel 122 for manually actuating the machine.

The clutch 113, which engages to cause the motor to rotate the main shaft 112, is operated by a rocker arm 123, having a forked upper end to connect it to the clutch and having a rod 129 at its lower end to connect it to an arm 131 on a shaft 132 which is manually rotated by a control lever 133 to engage or disengage the clutch.

The clutch is shown in engaged position in Fig. 1 and has a safety device which will throw it out of engagement in the event of the jamming of the machine at certain selected locations. This safety device consists of an arm 134 on the shaft 132, which is engaged by a pin 136 on a crank arm 137 mounted on shaft 138, to throw out the clutch. A bell crank 139 is mounted on the end of the shaft 138 and has a weight 141 secured on one of the arms to drop and rotate the shaft 138 to cause the pin 136 to force down the arm 134 to disengage the clutch. This occurs when the pin 142 is moved upwardly to release the other arm of the bell crank. The pin 142 is carried on pivotally mounted arm 143 which is lifted to release the arm of the bell crank 139, by the plunger 144 of a solenoid 146, when the solenoid is actuated. The solenoid is powered through leads 147 which connect to a source of electrical power. The solenoid is energized to throw the clutch out of engagement when a safety switch 148 is closed to complete the circuit to the solenoid. The means for closing this switch, which is caused by a jamming of the machine by a damaged container, will be described later in the specification. The switch 148 is shown in only one location on the machine, but other switches, also positioned to close the circuit to energize the solenoid and disengage the clutch, could be positioned on any point on the machine where danger of jamming is present.

The devices for folding the container, which are located at each of the stations of the folding turret, are actuated by cams and followers. The cams for Station V, which are labeled "Station V," are carried on a shaft 149 driven by the main shaft 112 through helical gears 151. The cams for driving Stations I through IV are located on a shaft 152, driven by shaft 149 through bevel gearing 153. It is to be noted that these latter cams are mounted on a single cam shaft, thereby eliminating the need for provision of a separate shaft for each station and eliminating the need for a series of gearings, which adds to the expense of the machine and results in lost motion. Since timing is very important in a machine such as this, where the time of operation on the container at a station must be kept at a minimum, lost motion and play in machine parts cannot be tolerated as they will result in improper folds being made and may cause jamming of the machine.

At the end of shaft 152 is positioned a shaft 154 driven by gearing 156, which may be used to operate auxiliary machines, such as a machine for preparing blanks for the present machine.

The welding turret 102 is positioned adjacent the body forming turret 100 and has a circular table 155 with container supporting pockets (not shown in Fig. 1) arranged around the edge and which carry the boxes 621. The table is mounted on a shaft 157, similar to shaft 103, and is rotatably mounted in a bearing 158 at its base. This turret is indexed in timed relation to the body forming turret so that each one of the receiving pockets on the welding turret will be in position to receive a container from the body forming turret after it has been formed. The welding turret has twelve carton supporting members positioned around its periphery, whereas the body forming turret has only eight. This gives the cartons a longer period in which to remain on the welding turret so that the thermoplastic adhesive can be thoroughly fused without applying a high degree of heat. To obtain proper timing, the welding turret is rotated one-twelfth of a turn with each index, whereas the body forming turret is given one-eighth of a turn with each index.

To rotate the welding turret, a Geneva drive is provided. A gear 159 is secured on the supporting shaft 157 and is driven by the pinion 161 on the shaft 162 which is driven by gear 163 rotated by the pinion 111 which is common to both gears 109 and 163.

Arrows of rotation are placed on the drawings to indicate the direction of rotation of each of the shafts and pulleys. Broken line arrows 164 indicate the path of movement of the container blank through the machine.

STATION I

Referring now to Figs. 2 through 5, the apparatus for delivering previously prepared blanks to the body forming turret is shown.

The container blank 170 itself may be observed in Fig. 8, consisting of an upper layer 166 which will form the inner layer of the completed container and which is faced on its upper side with metallic foil. The foil is backed with a layer of thermoplastic adhesive which may be covered with a layer of thin adhesive absorbent paper. The intermediate sheet 167, which is as wide as the body length of the container, consists of a sheet of paper coated on both sides with thermoplastic adhesive. The outer sheet 168 has on its lower face a layer of metallic foil faced with thermoplastic adhesive which may be covered with a layer of thin adhesive absorbent paper.

These three sheets are unattached except for the attachment at the areas 169, which lie within the limits of one side wall of the container, the side wall defined by dotted lines 171. This limited area of attachment holds the sheets together in perfect orientation with each other and yet permits the sheets to slide with respect to each other as they are folded into tubular form to form the container.

The sheets are offset with respect to each other so that when folded into tubular shape the ends of each sheet will overlap to form a seam and the seams for each of the three sheets will be offset from each other and will not occur in one place as to form an excessively thick spot in the side wall.

The blank 170 is delivered from the preparing machine having framework 172, Figs. 2 and 3, carried on a conveyor chain 173 which has lugs 174 to push the blank 170. The chain is carried over idler sprocket wheels 175 and 176, the former being carried on shaft 180. The chain is driven by a sprocket wheel 177, mounted on a rotating shaft 185, rotated by a chain 178 driven by a sprocket 179 which is mounted on a shaft rotated through a suitable gearing, not shown, driven by the shaft 154 which is driven off the main machine and in timed relation thereto.

A roller 181, having its axis parallel to the direction of movement of the container blank, extends slightly above the upper surface of the chain conveyor and is rotated by suitable means to push the blank against the adjustable guide rails 182 so that the blank will be conveyed onto the body forming turret in proper position.

As the blank moves to the right in Figs. 2, 3 and 5, it passes knurled wheels 183 and is held thereagainst by floating pressure wheel 184 which is mounted on arms 187 pivotally hung on the frame. Since the knurled wheel 183 is carried on the same shaft 180 as the sprocket 176, and it is of larger diameter than the sprocket, as soon as the blank passes onto the knurled wheel 183, it receives an acceleration and is carried rapidly onto the body forming turret, passing beneath the mandrel 188 and resting on the folding plates 189 and 191. The clamping plate 192 is lowered slightly below the level of the folding plates, as shown in Fig. 5. An upper guide 193, positioned on the delivery mechanism above the conveyor chain, has a lower edge 194 slightly lower than the lower face 196 of the mandrel to guide the blank therebeneath.

In order to bridge the gap between the plates 197, which lie between the conveyor chains and on which the blanks slide when being pushed by the conveyor chains and the body forming turret, a gap-closing platform 198 is positioned between the ends of the plates 197 and the turret.

To position the blank radially with respect to the turret, blank engaging fingers 199 swing down to engage the blank at its trailing edge 201 and push it against stops 202 and 203 projecting from the upper surface of the turret at the rear edges of the folding plates 189 and 191. The fingers 199 are carried on a shaft 204 which is pivotally mounted on sliding blocks 206. These blocks are slid back and forth in ways 205 and 207 by an adjustable push rod 208 connected to the end of a lever arm 209 pivotally carried on a shaft 210 on the frame 172. This lever arm is rocked by a bell crank 211 connected to the lever 209 by a link 212, the bell crank being pivotally mounted on the frame 172 and being rocked by a cam 213 engaging the follower 214 carried in the lower arm of the bell crank. The cam 213 is secured to rotating shaft 185. A tension spring 216 is secured between the frame and the upper portion of the bell crank 211 to hold the follower in engagement with the cam as the cam rotates.

As the blocks 206 move to the right, as shown in Figs. 2 and 5, a finger 217 on a casting 218, which is secured to the pivotal shaft 204, strikes the end of a cam plate 219, secured to the upper ways 205. The finger 217 rides thereunder, pivoting the shaft 204 counterclockwise, carrying the pushing fingers 199 down against the trailing edge 201 of the blank to the dotted line position of Fig. 2.

As the finger 217 rides under the lower edge of the cam piece 219, the blocks 206 continue to slide to the right thus pushing the blank to the right against its stops 202 and 203, shown in Fig. 5.

The blank engaging finger has a lip 221 on its lower end to prevent the trailing edge of the blank from sliding beneath the finger. Recesses 222 are cut in the platform 198 and permit the fingers to carry the blank completely against the stops. As the carriage is returned back to its original position to pivot the finger upwardly, back out of the way of the succeeding blank which will be carried beneath it, the finger 217 is carried out from beneath the cam plate 219. The spring 223 connected between the lever arm 209 and the casting 218 pivots the shaft 204 clockwise to carry the fingers 199 upwardly, as is shown in the solid line position of Fig. 2. A second finger 224 on the casting 218 strikes a stop 226 on the blocks to limit the pivotal movement of the shaft 204. Before the turret can be permitted to rotate, the platform 198 must be moved out of the way so that it will not be struck by the rounded edges 227 of the turret. Since the outer edge of the turret cannot be rounded at the place where the blank is received, but must be flattened as shown in Fig. 3 at 228 to be able to fold the end of the container, the platform cannot remain in the gap while the turret is rotated. The platform 198 is therefore lowered out of the way when the turret is rotated, being lowered to the dotted line position 229 of Figs. 2 and 5.

Platform 198, mounted on vertical posts 231, is shown in Figs. 2, 4 and 5. These posts are slidably mounted for vertical reciprocation in upper guide bearings 232 and lower guide bearings 233. Coil compression springs 234 are compressed between lower bearings 233 and a collar 236 affixed to the post 231 to urge the platform upwardly. These springs 234 are divided into two parts, separated by a washer 237, which aids in preventing dynamic instability of the springs during rapid operation, due to the long length and relatively heavy weight of the springs.

At the lower end of the vertical posts is bolted a cross piece 238 which is curved to permit members 314 and 316 to pass. The crosspiece has a bracket 248 which is pivotally connected to a link 239 (Fig. 2), the lower end of the link being pivotally connected to an arm 241 of a bell crank. The bell crank is pivotally mounted on the trunnion 232, on the lower turret frame 243, and the other arm 244 of the bell crank has a follower 246 which rides on a cam 247 carried on the shaft 152 (see also Fig. 1). This cam rotates to lower and raise the bridging platform 198. Each time the turret is indexed, it raises the platform as the turret stops to provide a surface for the blank to slide on as it moves from the delivery mechanism to the body forming turret. The forward end of the platform 249 is beveled to prevent the blank from catching on the edge as it is slid over the platform.

As the blank is slid onto the turret beneath the mandrel 188 and on the folding plates 189 and 191, it slides between guides 251 and 252. These guides, as shown in Figs. 3, 6, 7 and 8, are secured to the upper surfaces of the folding plates 189 and 191. Their forward edges 253 are curved inwardly to guide the blank between them, as may be observed in Fig. 8. The guides have overhanging lips 254 and 255, respectively, which have their forward surfaces 257 curved downwardly to deflect the blank as it is pushed onto the body forming turret. When the blank 170 is pushed fully against the rear stops 202 and 203 (Fig. 6), it lies between the guides 251 and 252, which are spaced a distance apart slightly greater than the over-all length of the blanks.

To accurately position the blank circumferentially with respect to the turret, the right folding plate 191 carrying the right guide 252, is kicked slightly to the left, as shown in Figs. 8 and 12, to push the blank against the left guide 251, thereby positioning it accurately with respect to that guide. The guide, having thus positioned the blank, moves back to its normal position slightly away from the edge of the blank to the position of Fig. 13. The blank has then been positioned circumferentially with respect to the turret by the movement of guide 252 and has been positioned radially by the pushing action of the fingers 199.

To secure the blank as thus accurately positioned, the clamping plate 192 moves upwardly, as shown in Figs. 13 and 14, clamping the blank against the lower face 196 of the forming mandrel. This holds the blank in its proper position, eliminating any chance of movement of the blank by the jerking of the turret as it is indexed from Station I to Station II.

To give movement to the positioning guide 252, the plate is moved inwardly by its operating mechanism. Extending beneath the plate, Fig. 6, is a stud bolt 258 having an enlarged head 259 which rests in the forked end of an arm 261 which is mounted on a pivotal sleeve 260 and surrounding a pivotal vertical pin 262. The sleeve is pivotally supported in the framework, and the pin independently pivotal in the sleeve (Figs. 2, 3, and 9). The sleeve 260 has an extension arm 263 having a cam follower 264 on its end which rides in the cam track 266 which is cut around in a stationary frame 267 below the rotating turret table 101. The follower 264 is guided in the cam track 266 to pivot the arm 263 and the sleeve 260 and arm 261 and control the movement of the folding plate 191.

The arm 261 has a vertical pin 268 (Figs. 2, 3 and 9) extending downwardly from it through an elongated slot 269 in the turret. Clamped to the lower end of the pin 268, below the turret, is an arm 270 having a follower roller 271 on the end. This follower roller is struck by a rotating cam lobe 272 carried on the upper end of a shaft 273 which is journaled in the stationary frame 267.

As the cam lobe 272 strikes the follower roller 271, the arm 261 is pivoted clockwise, as shown in Figs. 3 and 9. This pivotal movement amounts to only a small jog which is sufficient to move the folding plate 191 to the left, as shown in Fig. 6, and push the guide 252 against the edge of the blank 170 to push it against the lefthand guide 251, thereby accurately positioning the blank in the direction tangential to the turret. A small depression 274 is cut in the cam track 266, Fig. 9, to give the follower 264 room to move when the cam lobe jogs the follower and its connected arms. A spring 276 is connected between the turret and the arm 261 to urge the arm in a counterclockwise direction and constantly keep the follower 264 against the inner shoulder of the cam track 266. This spring keeps the folding plate 191 in its retracted position away from the mandrel until the shape of the cam track 266 causes it to slide over the top of the mandrel to perform its folding function.

The shaft 273, upon which the cam lobe 272 is mounted, is driven by bevel gear 277, the driving gear being mounted on the shaft 278, as shown in Fig. 1. The shaft 278 is driven through gearing 279 driven by shaft 281 which is connected through bevel gearing 282 to the vertical shaft 108 which carries the pinion 107 for driving the Geneva gearing which indexes the turret.

The folding plate 189 on the lefthand side, as shown in Fig. 6, is driven in much the same way as the plate 191. A stud bolt 283 is secured beneath the plate 189 and has an enlarged head which is carried between the forked end of the arm 284 which is pivotally mounted on a vertical pin 285. This pin is a duplicate of pin 262 in sleeve 260, and is mounted in a different sleeve carrying arm 301 which extends to the next adjacent blank holding station on the turret. A spring 286, Fig. 3, is secured between the turret and the arm to urge it in a direction holding the plate 189 in its retracted normal position, out of the way of the mandrel 182. The arm and plate remain in this position until acted on by the cam track 287 in which the follower 288 on the end of an arm 289 rides. This arm 289 is secured to the pin 285 to move arm 284, and gives it pivotal movement as the follower rides in the cam track 287.

The structure of the folding plate 189 and its associated mechanism is shown in enlarged detail in Fig. 7. Beneath the plate and surrounding the stud 283 is a sliding block 280 which has grooves 290 cut on either side and a pair of ways 295 provide a track which guides the block as it is slid back and forth by the action of the arm 284.

It is to be noted that two folding plate operating arms 261 and 302 (Fig. 3) are mounted to pivot about the same axis but operate folding plates at different stations. The arm 302 is mounted on pin 262 carrying arm 289 and follower arm 305 which also rides in cam track 287 to control the motion of the arm 302. The turret has arranged around its periphery eight blank holding stations, each of which receives a carton blank and holds it until folded, when it is withdrawn from the turret. It will be seen that there is a series of eight pins, such as 262 and 285, arranged around the turret, each supporting two folding plate operating arms, such as 261 and 302 or 284 and 301. Each of the arms for operating the blank folding plate to the right of the blank has a follower which rides in the cam track 266. This track is shaped to operate the right blank folding plate at the proper time. Each of the arms for operating the blank folding plate which is positioned to the left of the blank, has a follower which rides in the cam track 287 which is shaped to operate the folding plate at the proper time.

As the turret moves each one of the blank supporting stations to a position opposite the carton delivery mechanism, the blank is delivered onto the turret and the cam lobe 272 comes around to strike the follower 271 to give the plate 191 a jog to position the blank. The cam lobe 272 makes one revolution for each time a new carton supporting station is brought in front of the delivery mechanism to correctly position each one of the blanks as it is placed on the turret.

The blank has now been accurately positioned in a radial direction with respect to the turret by fingers 199 pushing against its outer edge. The blank has also been positioned in a direction tangential to the turret by virtue of the guide 252 being jogged against its edge to push it against the opposing guide 251. Now that the blank is positioned, the turret is ready to carry the blank to Station II, whereupon the folding mechanism at that folding station will perform its folding functions. In order to prevent the fragile blank from being jarred out of place or being bent or torn by the sudden movement of the turret, it is securely clamped against the lower face 196 of the mandrel 182 by the clamping plate 192.

The clamping plate is supported on a vertical post 303 which is journaled for vertical reciprocation in the turret table 101 and is shown in Figs. 2, 4, 5, 6, 12, 13 and 14. Its lower end is journaled in a U-shaped bracket 306 bolted beneath the turret (Fig. 6). A compression spring 307, surrounding the post 303 and having its lower end against the bracket 306 and its upper end against a collar 308 secured to the post 303, urges the clamping plate 192 upwardly. The spring 307 is split into parts having a ring 309 between the parts to prevent excessive vibration at high speeds. In order to draw the clamping plate 192 down away from the mandrel 188 at Station I to obtain a space between the two for the blank to slide between, an overhanging cam 311 engages a roller follower 312 journaled on a bracket 313 secured to the lower end of the supporting post 303 (Figs. 2 and 4). The cam 311 is mounted on the upper end of a pair of vertical posts 314 which are journaled for vertical reciprocation in the frame 267. Between the lower ends of the posts is a bar 316 which carries a link 320 pivotally suspended on a pin 325 extending across a slot in the bar. Secured to the lower end of the link is the outer end of a rocker arm 317 pivotally mounted on a bracket 318 secured to the stationary frame 267. At the inner end of the rocker arm 317 is carried a follower 321 which engages a cam 319 carried on the end of the shaft 278. A spring 321 is connected between the bracket 318 and the rocker arm 317 to hold the cam follower 321 against the cam as it rotates.

The turret is first rotated to carry a blank receiving sector into Station I. The cam 319 rotates, drawing down the cam 311 to engage follower 312 and pull the plate 192 away from the mandrel, thereby creating a space for the carton blank to slide between the mandrel 198 and plate 192. As soon as the blank has been accurately positioned, the cam 319 continuing in its rotation releases the plate 192, permitting it to move upwardly against the mandrel and clamp the blank securely therebetween. This moves the plate from the position of Fig. 12 to that of Figs. 13 and 14, the latter figures illustrating the blank as securely clamped. The blank is thus clamped when the turret begins its movement to carry the blank to Station II.

It will be noted that the guide 252 remains over against the sheet of paper, holding it in place while the blank is being clamped, as shown in Fig. 13. The positioning fingers 199 likewise remain against the blank until it is clamped securely against the bottom face of the mandrel, as shown in Fig. 14. When the clamping action is completed, the fingers are carried back away from the blank, and the guide 252 is withdrawn to its normal position, the cam lobe 272 having rotated so that the follower 271 rides off the high portion.

The body forming mandrel 188 is a hollow rectangular tube having outer dimensions the size of the inner dimensions of the container. The outer surface is marked by longitudinally extending channels or grooves 322 (see Figs. 3, 5 and 12) which permit the escapement of air as the container is rapidly folded about the sides of the mandrel.

The mandrel is secured to a support 323 (Figs. 2 and 3. The mandrel is supported as a cantilever, being supported by a pair of vertical posts 324 (Figs. 2 and 10) and by additional posts 326 which are secured to lateral protuberances 327 on the extension 323. The mandrel is secured to the extension 323 by an enlarged tongue portion 328 (Figs. 5 and 10) which extends between an upper and lower flange 329 and 331 on the inner end of the mandrel. A pair of bolts 332 clamp these flanges against the tongue and are threaded down into the supporting posts 324. The vertical posts 326 are journaled for vertical reciprocation in the turret table 101 and have connected across their lower ends a cross plate 333, Fig. 10. The lower ends of the posts 324, which extend through holes 334 in the turret table 101, are also secured to this plate 333. At a midpoint in this plate is secured a vertical guide shaft 336 slidably journaled for vertical reciprocation in the turret table 101. A spring 337 is compressed between the frame 100 and the plate 333 to urge the entire mandrel assembly downward. The spring 337 is split and a ring 338 is positioned between the sections of the split spring to prevent excess vibration thereof during rapid operation.

A bracket 339 extends downward from the plate 333, carrying a follower roller 341 which engages a cam track 342 mounted on the frame 267, the follower raising the entire mandrel assembly as it rolls over the raised portion of the cam track as the turret carries the mechanism into Station I. To prevent the inertia of the weight of the mandrel from carrying the mandrel member upwardly as it is raised swiftly by the cam track, an overhanging lip 343 (Fig. 9) is positioned over the follower roller 341, holding it against the cam 342 at the high point in the track. Thus, by the action of the cam 342, the mandrel is lifted above the upper surface of the turret to permit the container blank to pass therebeneath at Station I.

Figure 11:
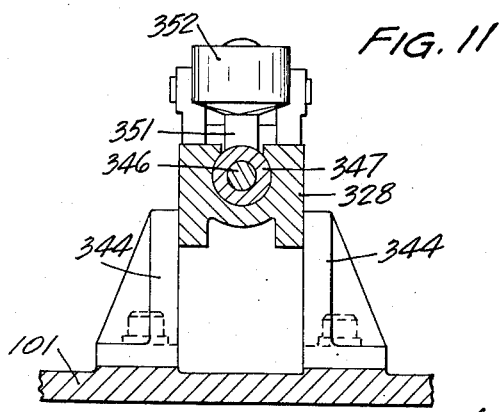
Fig. 11 is a sectional view taken along line 11—11 of Fig. 2.

Referring now to Figs. 3 and 11, the rear end of the mandrel extension 323 is guided in its vertical movement between a pair of ways 344 which have inner bearing surfaces between which the extension 328 which is integral with 323, slides.

Extending through the center of the mandrel and the extension 323, is an ejector rod 346 slidably mounted and journaled therein in bearing 347.

The rod carries at its outer end a flat ejector plate 348 which is seated so as to be flush with the end of the mandrel and present a flat surface against which the end of the container can be folded. Extending vertically from the inner end of the rod is a vertical projection 351 having a flat shoe 352 at its upper end. This shoe is engaged by mechanism, later to be described, and pushed radially outward to carry the ejector plate 348 outwardly and strip the completed carton from the mandrel. The ejector rod and plate are held inwardly by a pivotal latch member 353, having a hook 354 which engages a mating hook 356 secured to the inner end of the ejecting rod. This latch is later released by an unlatching mechanism which permits the ejection operation to occur.

As the turret indexes the mandrel from Station I to Station II, the follower 341, as shown in Fig. 10, will roll off the cam 342, permitting the mandrel to descend into the forming well, forcing the blank down into the well, as shown in Fig. 15, folding the sides of the container against the sides of the mandrel.

The forming well is defined at the sides by the vertical walls 358 and 359 which are spaced apart sufficiently to permit the container material to be squeezed between them and the mandrel. The lower clamping plate 192, which is urged upwardly against the bottom of the mandrel, is also forced downwardly into the well and holds the container blank tightly against the lower face 196 of the mandrel. The mandrel moves downwardly under the action of its spring 337, forcing the clamping plate 357 ahead of it against its spring 307, the spring 337 being stronger than the spring 307.

The downward movement continues until the clamping plate 192 strikes the resilient bumpers 360 which are mounted in the bottom of the well and which limit the downward movement of the plate 192. The action of the spring 337, holding the mandrel down to force the plate 192 against the bumpers 360, continues until the container is folded and is removed from the turret. The container blank 170 now has had the side walls 361 and 362 folded upwardly, as shown in Fig. 16, at right angles to the lower side wall 363. It is to be noted that the multiple layers of the container blank are attached only along the side wall at 363, and were gripped along that wall. The layers are free to shift with respect to each other over the other areas as they are folded around the corners of the mandrel.

STATION II

When the container arrives at folding Station II, the first function of the machine is to begin folding the portions of the container blank, extending above the vertical side walls 261 and 262, downwardly over the top of the mandrel 188. Since the container blank is formed of a soft, non-resilient material such as metallic foil, care must be taken during swift folding to prevent the turning back of the corners or wrinkling of any of the material. Any damage done to the material at this stage will result in an insecure fold being formed and one which may produce a leaking carton or even jam the machine because of extra thickness of material at certain places.

Referring to Figs. 17 through 22, the portion 364, extending above the side wall 362 on the right of the carton, is first crimped downwardly over the edge of the mandrel in a manner shown in the dotted line position of Fig. 19 and the solid line position of Fig. 21, producing the fold shown in Fig. 22. A blade 366, having a lower straight edge, is moved down against the upper corner of the mandrel to sharply crease the container blank over the mandrel top. This blade is carried on a rocker arm 367 pivotally mounted on a bracket 368 on the supporting tower 369. The tower 267 at Station II carries the operating mechanism of Station II and is mounted on the frame. The rocker arm 367 is pivoted down toward the mandrel corner by a connecting rod 371, which is operated by a rocker arm having a follower contacting a cam carried on the cam shaft 152. The rocker arm, follower, and cam are not shown, being of the type well known to one skilled in the art.

It is to be noted that, since the turret has eight stations, they must be octagonally arranged. The cam shafts shown in Fig. 1, are, however, rectangularly arranged, one straight shaft carrying the cams from Station I through Stations IV and the other shaft carrying the cams from Station V. This unique arrangement makes it possible to obtain accurate timing between cams, eliminating the need for gearing and consequent motion loss between cams. This arrangement means that the cam may be angularly arranged with respect to the station at which it operates. For convenience in understanding the drawings, the cam shafts are shown as being arranged tangentially to the turret at each station rather than at an angle thereto.

At the outer end of the creasing blade 366 is a unique edge breaking device. The device consists of a pair of fingers 372 and 373, finger 372 being integral with the blade 366. Finger 373 is vertical and finger 372 is horizontal in the position shown in the solid line position of Figs. 18 and 21. These fingers shape only the end of the container blank which is unsupported by a mandrel and which, if not creased, may wrinkle and buckle when the blade 366 folds flap 364. The fingers continue the crease formed by the blade 366 out to the very end of the container, making clearly defined end panels. The fingers perform their folding when carried downwardly by arm 367 from the dotted to solid line position of Fig. 21.

At Station II the cover flap 374, which is hingedly attached to the outer lower side wall, is bent away from the end of the container to hang downwardly. This flap was formed by cutting slits along the crease line of the blank when the carton blank was formed.

Figure 17:
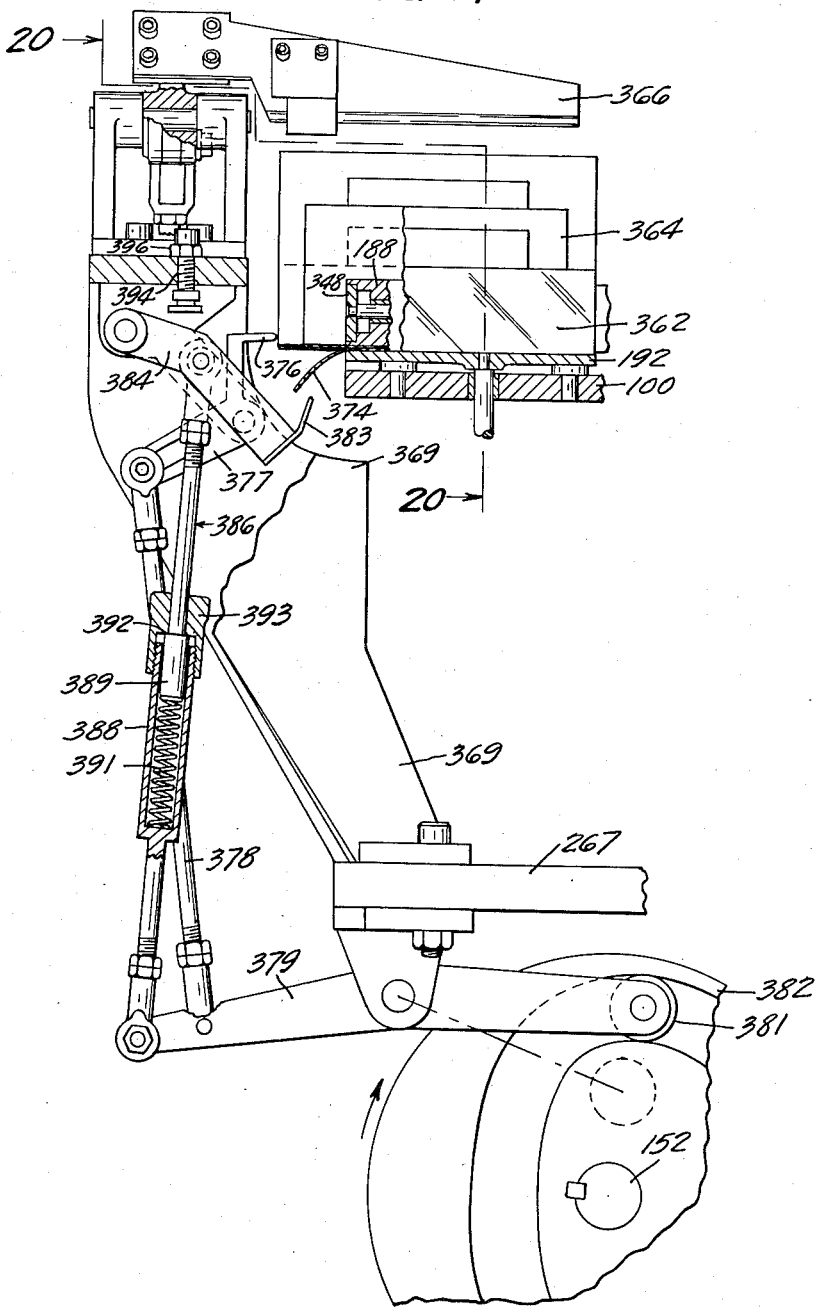
Fig. 17 is a vertical sectional view taken through Station II of the body forming turret of the machine.
Figure 29:
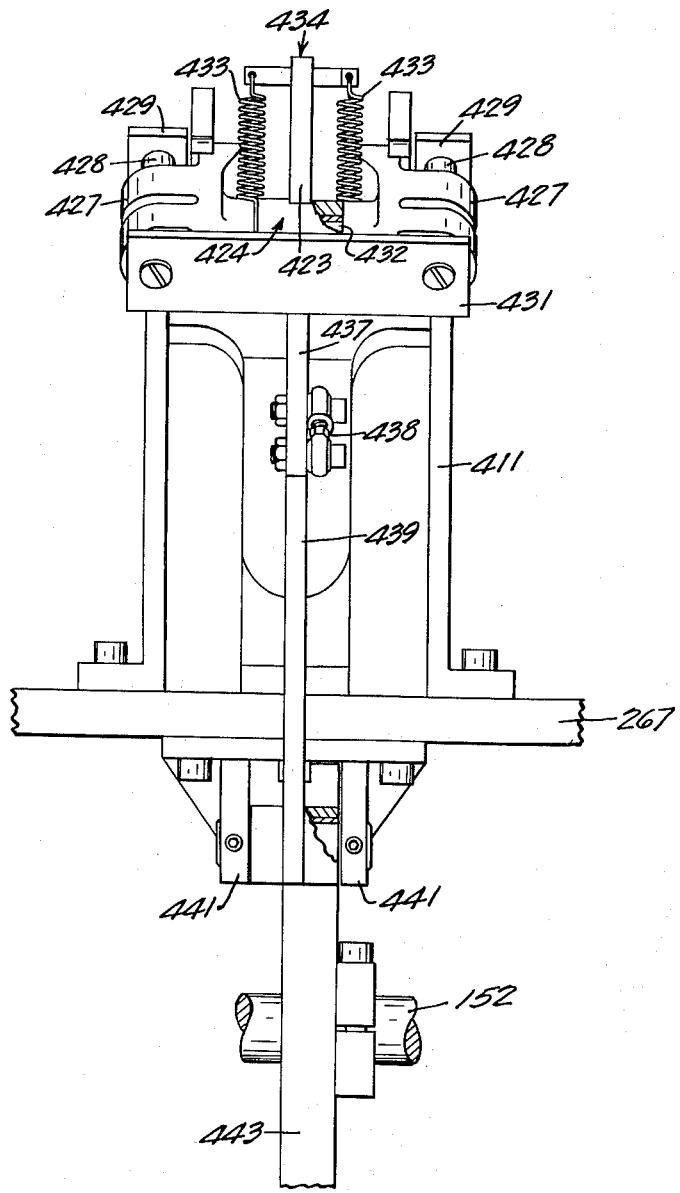
Fig. 29 is a front elevation looking radially toward the turret, illustrating the mechanism of Station III.
Figure 32:
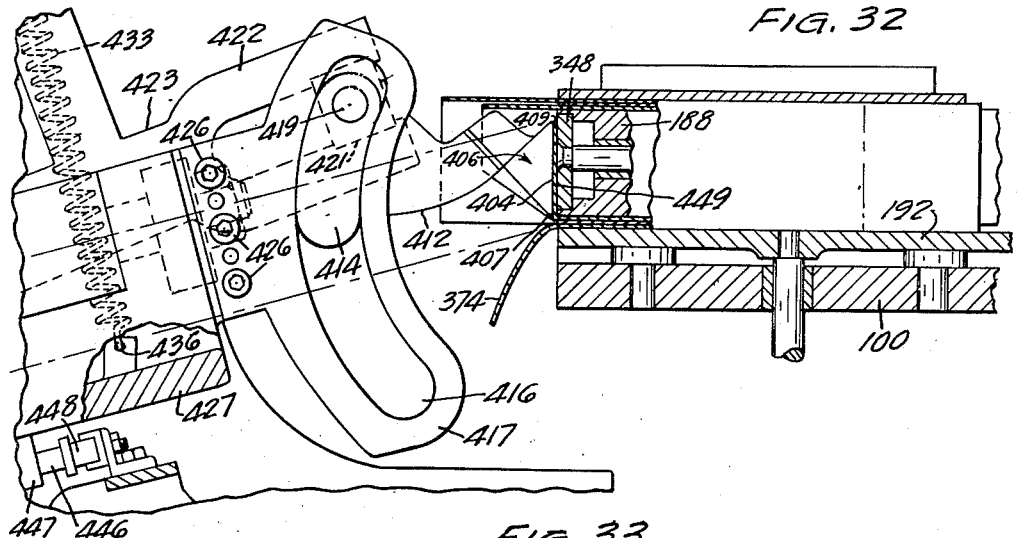
Fig. 32 is a vertical elevational view partially in section illustrating the action of the folding mechanism of Fig. 2 at the completion of its folding operation.

To separate the flap from the carton and push it downwardly out of the plane of the lower side wall 363, a separating blade 376 (Figs. 17 and 18) is moved arcuately downwardly against the flap from the position of Fig. 17 to the position of Fig. 18. The separating blade 376 is pivotally hung on the tower 369 and has a lower arm 377 which is connected by a link 378 to a rocker arm 379 which is pivotally mounted on the tower. The inner end of the rocker arm carries a follower 381 which rides in the track of cam 382 which is rotated on the cam shaft 152.

To insure that the flap 374 will stay in its depending downward position, a crease is formed in it at its line of connection to the lower side wall by pulling it downwardly. This is accomplished by an angularly shaped blade 383 which pivotally moves up against the lower side of the flap and is met by blade 376 to clamp the flap and pull it downwardly. Blade 383 is carried on an arm 384, pivotally hung on the tower 369, and is pivoted by a link 386 connected between the arm and the common rocker arm 379.

As the rocker arm 379 rocks clockwise, as shown in Figs. 17 and 18, the separating blade 376 moves clockwise to pull the flap downwardly. At the same time the creasing blade 383 is pivoted upwardly against the lower face of the flap to a point where the tip of the separating blade 376 is positioned against the inner face of the creasing blade 383. At that point, the separating blade 376 continues its downward movement. Since the flap 374 is pinched between the blades 376 and 383, continued downward movement of blade 376 will pull it tightly downward drawing it firmly over the outer edge of the clamping plate at 387. The upward movement of the blade 383 is limited by the arm 384 engaging the head of an adjustable stop bolt 394 which is threaded into a boss 396 secured to the tower 369. This prevents the shoe 383 from moving too far upwardly to either tear the flap 374 or spoil the cooperative action of the blades 376 and 383. The blade 376 can continue downwardly and carry the blade 374 with it because the link 386 is telescopic and spring loaded, which permits its being shortened under pressure. The lower end of link 386 has a hollow cylinder 388 into which may telescope an enlarged portion 389 of the upper end of the link. The coil compression spring 391 within the cylinder 388 urges the link to fully extended position. The upper shoulder 392 formed by the enlarged portion bears against the inner face of a cap 393, which is threaded to the top of the cylinder, thereby preventing the spring from separating the two sections of the link.

As the folding members are returned to their normal position, the turret again indexes, carrying the partially folded container blank from Station II to Station III, the container blank now being in the condition shown in Fig. 22 with the flap 364 bent over the mandrel and the flap 374 bent downwardly. As the container is moved on the turret between Stations II and III, the right folding plate 191 moves to the left over the top of the mandrel to complete the folding of the extension 364 and flatten it over the top of the mandrel 188 in the manner shown in Fig. 24.

The movement of the folding plate 191 is, of course, occasioned by the action of the cam follower 264 as it rides in the stationary cam track 266, as shown in Fig. 9. As the container is carried even farther along between Stations II and III, the vertical extension flap 397 of the side wall 361 is struck by a stationary folding blade 398 which extends radially inwardly over the top of the turret table 101, Figs. 23 and 24. This blade is mounted on a vertical support member 399 which is adjustably bolted to another vertical bracket 401 secured on the outer edge of the frame 297 in the manner shown in Fig. 23.

As the container approaches Station III, and the blade 398 has begun folding the flap 397, the right folding blade 191 begins withdrawing itself to return to its normal position and folding blade 189 follows it completing the folding of the flap 397 to fold it over the top of the mandrel and over the extension 364. The edges of each layer of the container blank overlap the corresponding edges on the other flap of the same layer to form three overlapping seams. It will be noticed that in some of the drawings, as in Figs. 25 and 26, only the outer layer of the container is shown. This is for convenience of illustration and also shows that the mechanism could be used on a single layered blank.

It is to be noted that the forward edge of the folding blade 191 is undercut at 402 and the folding edge of the blade 189 is beveled back at 403. This permits the blade 191 to remain close to the edge of the forming well and yet permits the blade 189 to slide completely to the right beyond the right edge of the forming well to completely cover the upper side wall of the container. Since there is no adhesive holding the seams of the container together, the container must rely on the folding plate 189 to hold it in its folded shape. This folding blade 189 remains over the top of the mandrel for the remainder of the folding operations, holding the seams snugly together and permitting the end panels to be folded across the end of the mandrel without shifting of the container seams. The container will be held to its exact size and shape while it is being folded. The adhesive between the end panels of the container will be warmed when the panels are folded to tack the container end thereby holding it in shape. If the container end were tacked without being held in proper shape, the layers would later have to shift into shape when they are welded by softening the adhesive, thus creating the risk of distorting or wrinkling some of the layers of material.

STATION III

With the container in the condition shown in Fig. 26, it is moved into Station III to be operated on by the mechanism show in Figs. 27 through 33. At Station III, the lower end panel 404, hingedly attached to the inner layer of the lower side wall 363, is folded up against the end of the mandrel into the plane of the carton end to the position shown in Fig. 33. To accomplish this, a folding shoe 406, in the shape of a wedge, is carried against the end of the container with its leading edge 407 moving along the broken line path 408 between the panel 404 and the flap 374, as shown in Fig. 28. The upper inclined face 409 of the wedge-shaped folding shoe first engages the inner layer of the end panel 404, camming it upwardly to where it lies against the face 409, in the position shown in Fig. 30. The shoe then pivots about its leading edge 407 folding panel 404 against the end of the mandrel to the position shown in Fig. 32.

The shoe 406 is carried on the mechanism supported on the tower 411 secured on the frame 267 at Station III. The shoe is secured to a cross bar 412 (Figs. 31 and 32) by bolts 413. This cross bar has arcuately shaped bosses 414 on each of its ends which slide in elongated arcuately shaped slots 416 in a guide member 417. The bosses 414 normally rest on the bottom of the slot 416 so that the shoe is in the position shown in Fig. 27. A recess 418 is cut in the rear side of the cross member 412 across which extends a pin 419, the pin being inserted through a hole which extends completely through the cross member and bosses. Journaled on the pin in the recess 418 is a bearing block 421 having a groove cut in its upper and lower surfaces to provide a bearing surface for the fingers 422 which form the forked end of the upper arm 423 of a bellcrank 424 which has pivotal movement to slide the elongated bosses 414 up and down in the slots 416. The members 417, in which the slot 416 is cut, are secured by bolts 426 to a main sliding crosshead 427 which is slidably mounted on a pair of ways 428 secured at their inner and outer ends to brackets 429 and 431 on the supporting tower 411, Figs. 27 and 29. Brackets 429 (Fig. 29) are separated to permit movement of the arm 423 of bellcrank 424 therebetween. The bellcrank 424 is pivotally mounted on a pin 432 which extends between sections of the sliding crosshead 427 and which carries the bellcrank with the crosshead. A pair of springs 433 are secured to a vertical arm 434 projecting above the arm 423 and are secured at their other ends to a pin 436 on the crosshead, thus urging the bellcrank 424 to pivot clockwise, as shown in Fig. 27. The lower arm 437 of bellcrank 424 is connected by a link 438 to a bellcrank 439 pivotally mounted on the frame 267 between brackets 441 which are secured to the frame 267. The lower arm 442 of this bellcrank 439 has a follower which rides a track of the cam 443 mounted on the cam shaft 152.

Rotation of this cam 443 rocks the bellcrank 439 clockwise to cause the link 438 to pull upwardly and to the right, as shown in Fig. 27. Since the bellcrank 437 is prevented from moving counterclockwise by the tension of the springs 433, the crosshead slides upwardly on its ways 428. As the crosshead slides upwardly, an adjustable stop bolt 446 mounted in a bracket 447 on the crosshead strikes a stop 448 mounted on the tower 411 to halt the movement of the crosshead. At this point, the folding shoe 406 will then be moved into the position shown in Fig. 30 to cam the container panel 404 upwardly. As the bellcrank 439 continues its clockwise movement, it continues to pull on the lower arm 437 of the bellcrank 424.

Since the crosshead 427 can slide no further because of the stop 448, the tension of the springs 443 is overcome, permitting the bellcrank 424 to begin to pivot counterclockwise. This causes the upper arm 423, which holds the bearing block 421 between the fingers 422 of its end, to push the crossbar 412 upwardly, thus sliding the elongated bosses 414 upwardly in the arcuate slot 416, to the position shown in Fig. 32. This rocks the folding shoe 406 about its front edge 407, to force the container panel 404 tightly against the end face 449 of the mandrel 188. This shoe action permits flap 404 to be folded upwardly without any sliding movement between the flap and the upper flat face 409 of the folding shoe. The arcuate slot 416 is cut so that its radial center is at edge 407 when the shoe is in folding position. This causes upward movement of the arcuate bosses to pivot the shoe about its front edge.

Figure 33:
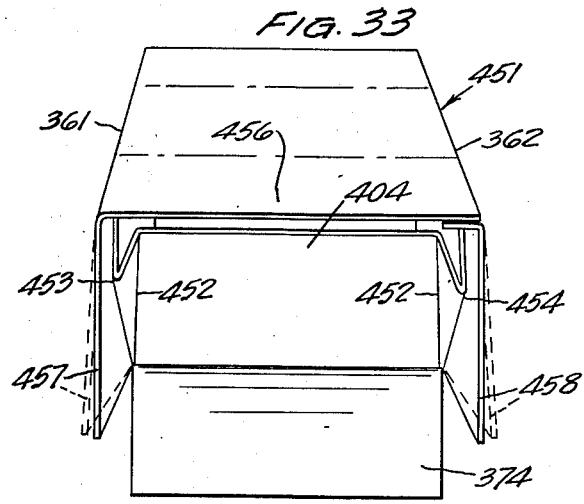
Fig. 33 is a perspective view of the container, showing its condition after the folding operations of Station IV.

When the container has been operated on at Station III, it is in the condition shown in Fig. 33. The container numbered 451, has its cover flap 374 depending downwardly and has the closure panel 404 folded inwardly over the container end. It will be noticed that the panel 404 is not quite as wide as the container. That is, the crease lines 452 at the ends of the panel 404 are positioned just slightly inwardly from the plane of the side walls 361 and 362 of the container. This is due to the fact that the width of the folding shoe 406 is slightly less than the corresponding dimension of the carton. This folds the ears 453 and 454 evenly and prevents them from being wrinkled.

The container is next carried to Station IV by the indexing of the turret where the end closure panel 456 opposite panel 404 is to be folded into the plane of the carton end. The ears 453 and 454, formed from the side closure panels 457 and 458, are then pressed flat and heated to form multiple layered laminated ears.

STATION IV

The mechanism for folding the container end at Station IV is shown in Figs. 34 through 46. An overhanging folding head 459 is carried down against the end folding flap 456 to fold it against the end 449 of the mandrel 188. The flap 456 is, of course, comprised of two layers, one being the inner layer of the container and the other being the outer layer. For convenience, however, the drawings show it as a single layer. The head 459 is shown in profile in Figs. 34 and 35, and has a plate 462 having a contacting face which engages the container. The sides of the head 494 and 496 are curved, the surfaces of curvature being vertical. The head is carried on a supporting member 463, being secured thereto by bolts 464. The head and plate are heated by a heating element 466 embedded therein which is supplied current through electrical leads 467 connected to a junction box 468 secured on the carrying member 463. The carrying member has arcuate shaped bosses 469 slidably journaled in an arcuately shaped slot 471 cut in a pivotally mounted rocker arm 472.

The arm 472 is pivotally mounted on a pin 473 which extends across the top of the tower 474. The tower serves to support the operating mechanism at Station IV and is mounted on the frame 267 at Station IV. Also mounted on pin 473 is a rocker arm 476 which has an inner forked end 477 between which rides a grooved bearing block 478. This bearing block is positioned in a recess on the carrying member 463 and is journaled on a pin 479 extending across the recess. To the outer ends of the pivotal arms 476 and 472 is connected a tension spring 481 which urges the arms in opposite directions and holds the arcuate boss 469 in the top of the slot 471. The assembly, including arms 476 and 472, is rocked by means of a bellcrank 482 connected to arm 476 by a link 483. The bellcrank is pivotally mounted on a pin 480 which is secured between brackets 485 mounted on the frame 267. The lower arm of this bellcrank 482 has a follower 484 which rides in the track of a cam 486 which is carried on the main cam shaft 152.

Figure 35:
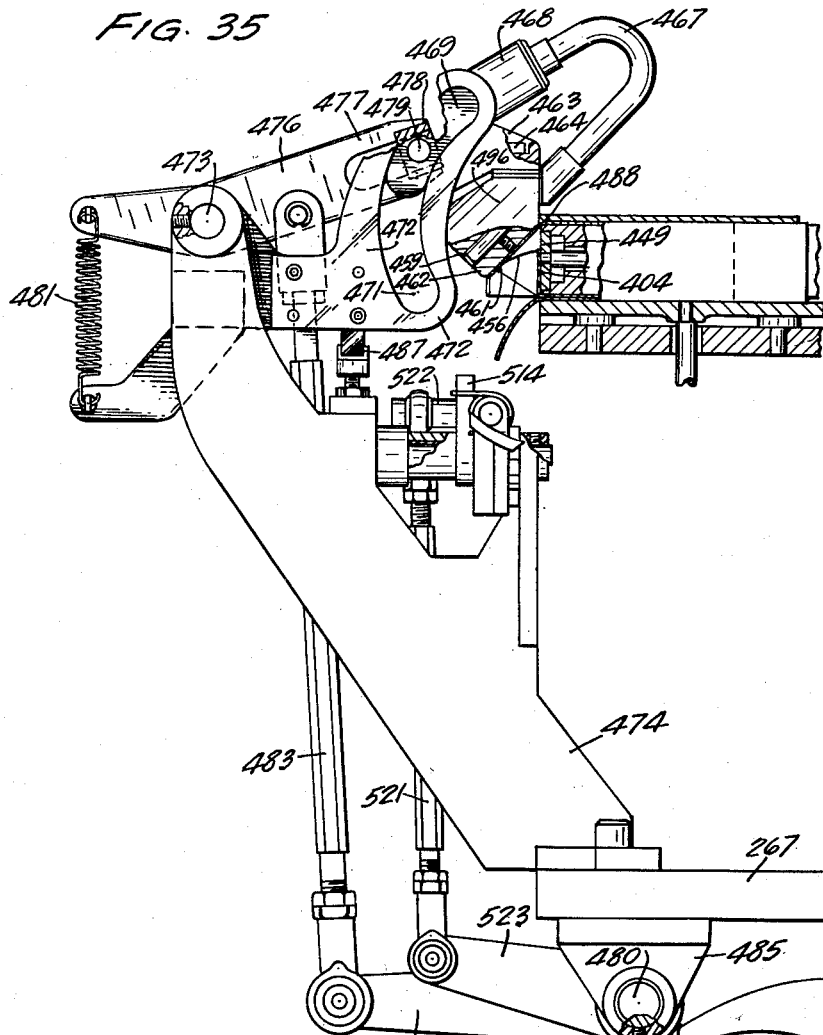
Fig. 35 is another side elevational view partially in section taken through Station IV of the body forming turret.

As the cam rotates, the bellcrank 482 is pivoted counterclockwise, as shown in Fig. 35, to draw down the link 483 and pivot the assembly, pivoting folding head 459 clockwise. As the flat face 461 of the plate engages the end panel 456 of the container, it folds the panel downwardly to the position shown in Fig. 35.

Figure 36:
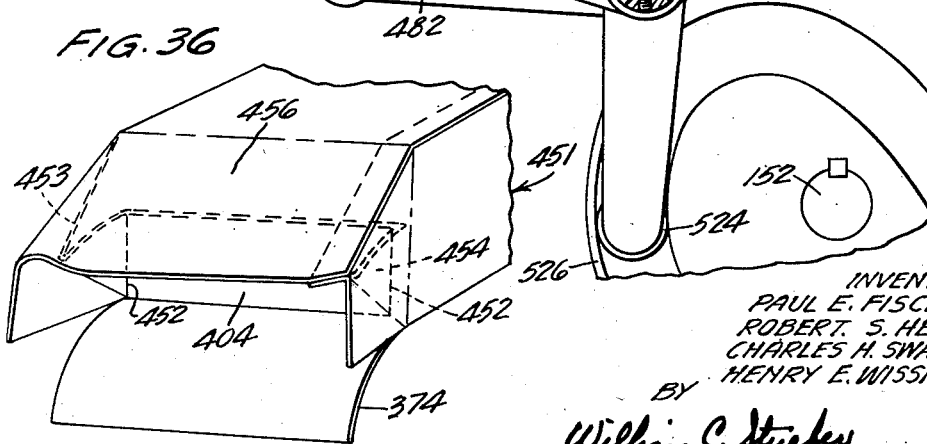
Fig. 36 is a perspective view of the end of the container showing its condition as it is operated on by the mechanism shown in Fig. 35.

The beginning of the folding of the end of the container 451 is shown in detail in Fig. 36. The plate 462 forming the face of the folding head is narrower than the width of the flap 456 so that the head will pass between the ears 453 and 454. Continued folding will carry flap 456 against the end of the container without interference from the ears.

When the folding head reaches the position shown in Fig. 35, the pivotal arm 472 strikes an adjustable stop member 487 to stop any further downward movement of the arm 472. Continued clockwise movement of the bellcrank 482 draws the link 483 downwardly to pivot the arm 476 clockwise, overcoming the tension of the spring 481. This causes the forked end 477 to push the bearing block 478 downwardly, causing the arcuate bosses 469 to slide downwardly in the slot 471. This rocks the folding head counterclockwise about point 488, pivoting the folding flap 468 downwardly against the mandrel end 449. This folds the flap over the previously folded flap 404 to the position shown in Figs. 41 and 42. The arcuate slot 471 is cut so that when the arm 472 is at the position shown in Fig. 35, the radial center of the slot is at point 488. This, of course, causes the head 462 to pivot about point 480 without sliding movement occurring between the flap 456 and the face 461 of the head.

The head is held against the end of the mandrel while the ears 489 and 491, which extend on either side of the head, are flattened, stretched taut, and pressed thereagainst. The head is mildly heated so that, during its time of contact with the container end, the thermoplastic adhesive, which is coated on the inner surface of the outer surface of the carton material is softened, but only sufficiently to cause the end closure panels to adhere and not to cause the thermoplastic to run out from between the layers.

To flatten the ears against the sides of the folding head 459 a pair of uniquely shaped shoes 492 and 493 are pressed against the sides of the head 459. The side or lateral faces 494 and 496 of the head are rounded, being curved inwardly in the manner shown in the schematic drawing of Fig. 43. The shoes 492 and 493 are cooperatively curved, the radius of curvature being drawn from the same centers, as indicated by points 497 and 498. The space between the shoes and the sides of the head represent the thickness of the container ears and is shown exaggerated in Fig. 43. Thus it will be seen that the outer faces of the head and the inner faces of the shoes are substantially parallel and will squeeze the container ears evenly between them when in the position shown in Figs. 45 and 46.

Figure 41:
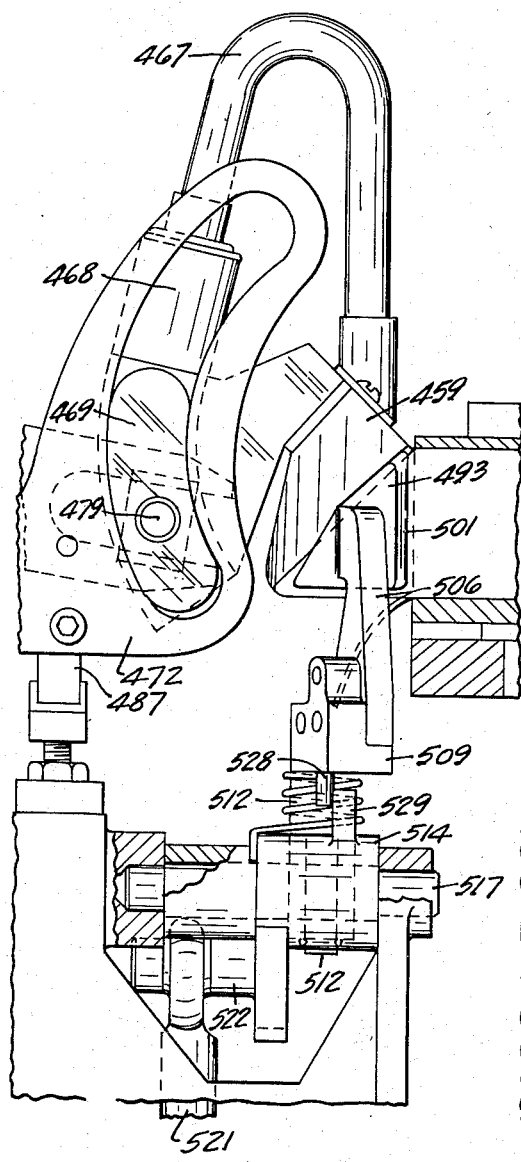
Fig. 41 is a side elevation of the mechanism of Station IV.
Figure 42:
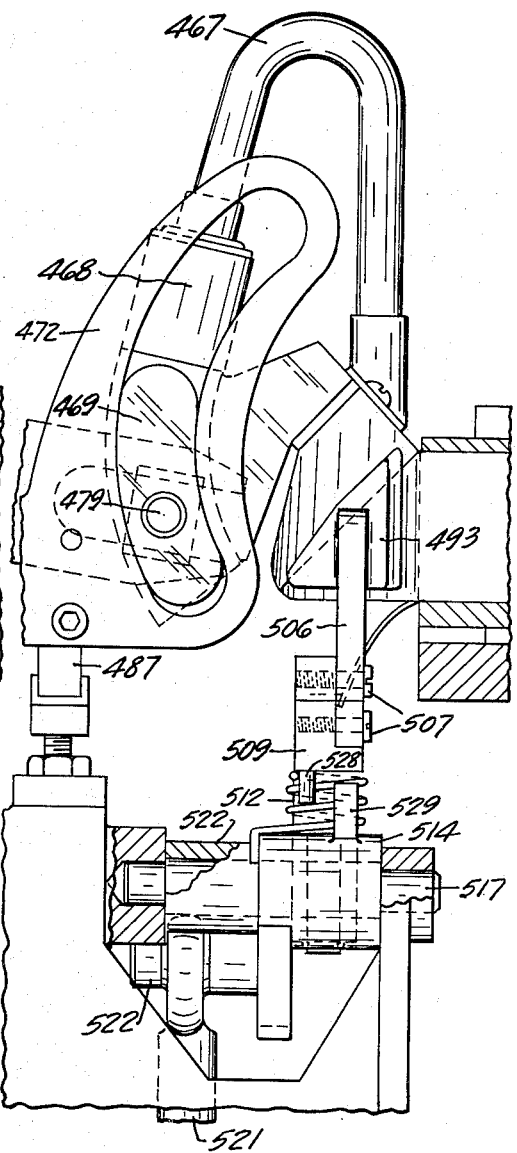
Fig. 42 is another view of Fig. 41, showing the flap folding members advanced from the position of Fig. 41.

The shoes 492 and 493 perform both an ironing and a stretching function to flatten the layers which form the ears, forcing them tightly together to squeeze the thermoplastic tightly into the material. To perform both the flattening and stretching action, the heels 499 and 501 of the shoes are the first to engage the curved faces 494 and 496 of the head 459, as shown in Figs. 38, 39, 41, and 44. The shoes next begin pushing their forward ends against the head and at the same time, begin sliding along the curved surface. The movement against the head progressively flattens the ears and the sliding movement stretches them away from the container. This combination of the pressing, squeezing and ironing action completely flattens the ears and pulls them taut away from the carton, drawing out any wrinkles which may be in the carton side wall or in the carton ear or at the lines of attachment 502 and 503 between the ear to the sidewalls 361 and 362, as illustrated in Fig. 47. The shoes, when slid to their forward position, as shown in Figs. 42, 45 and 46, are flat against the ears. The container 451, as completed by the Station IV, is shown in Fig. 47.

Figure 37:
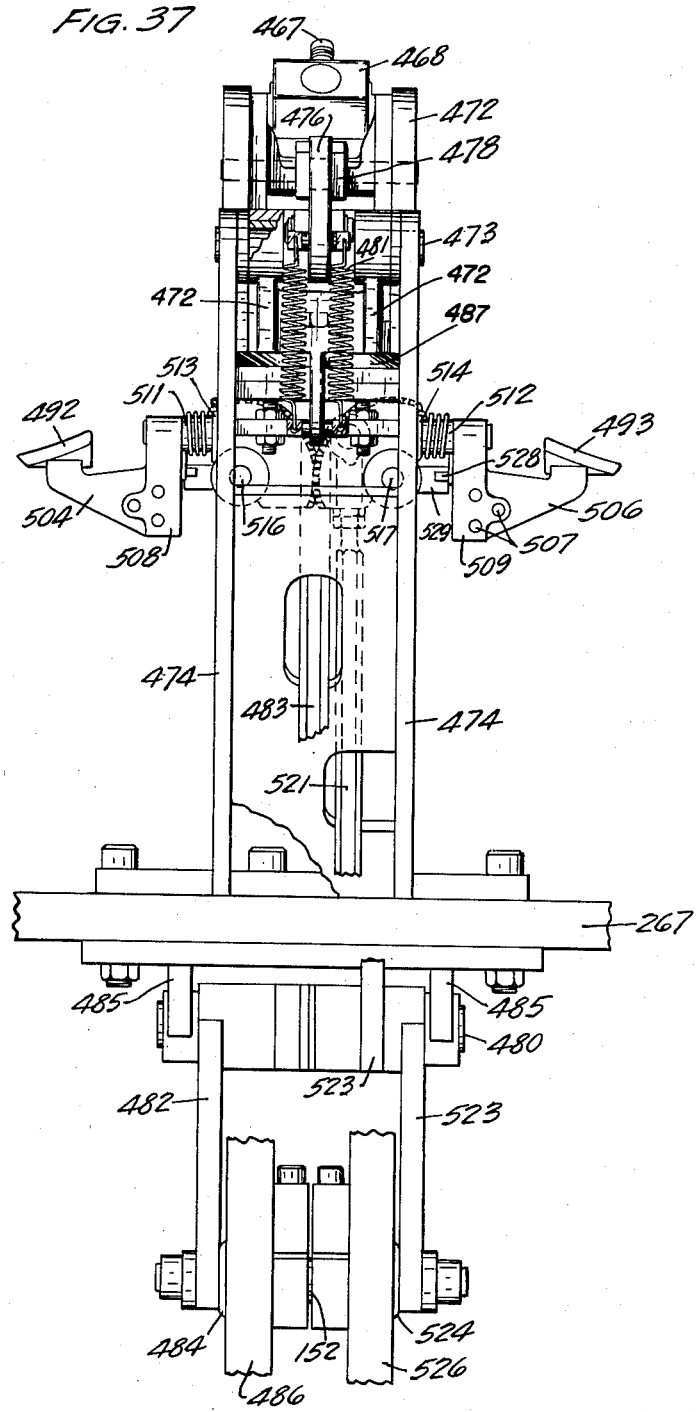
Fig. 37 is a front elevation of the mechanism of Station IV.

The shoes 492 and 493 have a triangular shape, being substantially the size of the container ears. The shoes 492 and 493 are mounted upon the supporting arms 504 and 506, respectively, the arms being adjustably secured by screws 507 to arms 508 and 509. These arms are mounted for pivotal movement and are secured on pins 511 and 512 which extend down through pivotally mounted castings 513 and 514. The arms 508 and 509, carried by the pivotally mounted pins 511 and 512, are urged to pivot counterclockwise, as shown in the plan view of Figs. 39 and 40, by a torsion spring 526 which has one end hooked over the edge 527 on the casting and the other end hooked on a pin 528. The projecting pin 528 strikes a protruding stop 529 to limit the pivotal movement caused by the torsion spring. The castings 513 and 514 pivot on bearing pins 516 and 517, extending horizontally and at right angles to the axis of the pins 511 and 512 and parallel to the axis of the container. These pins 511 and 512 will be positioned nearly vertical when the shoes 492 and 493 are in the folding position, as shown in Figs. 38, 41 and 42. The pins 511 and 512 are swung around back to the horizontal position, as shown in Fig. 37, when the shoes are in their return, non-folding position. The castings 513 and 514 each carry meshing segment gears 518 and 519, respectively. To pivot the folding shoes from the position of Fig. 37 to that of Figs. 38 and 41, a connecting link 521 is pivotally secured to a trunnion pin 522 on the segment gear 519 and is vertically reciprocated (Fig. 35) by a bellcrank 523 pivotally mounted on the supporting pin 480. The bellcrank has at its lower end a follower roller 524 riding in the track of a cam 526 carried on the main cam shaft 152.

As this cam rotates, the bellcrank 523 pivots counterclockwise, drawing the connecting link 521 downwardly and pivoting the castings 513 and 514 upwardly to carry the folding shoes 492 and 493 against the curved sides of the head 459. When the shoe 493 (Fig. 39) is brought up against the curved face of the head 459, the heels of the shoe are the first to make engagement. The reactance against the shoe acts along a line which is to one side of the vertical pin 512. This reactant force, acting to one side of the pin 512, causes the arms carrying the shoe to pivot in a clockwise direction against the action of the spring 526, thereby rolling and sliding the shoe 493 against the curved face 496. Since the curved face of the outer surface of the flap is positioned slightly outward from the axis 531 of the pin 512 about which it pivots, it moves outwardly along the surface of the flap to stretch the flap away from the container and to draw it taut. Thus, the continued downward pull of the link 521 has pulled the shoes tightly up against the side of the head, forcing them forward along the curved face of the head from the original contact position, as shown in Figs. 39, 41 and 44, to the position where the ears have been pressed and stretched, shown by Figs. 42, 45 and 46. While the shoes 492 and 493 are pressing the ears tight against the head 459, heat is being transmitted to them from the head and the thermoplastic adhesive between the layers, which form the ears, is being softened. The pressure caused by the shoes squeezes the thermoplastic into the pores of the material, forming a monolithic welded ear.

The shoes are then dropped back to return position and the head withdrawn from the container end, leaving it folded as shown in Fig. 47.

STATION V

Figure 57:
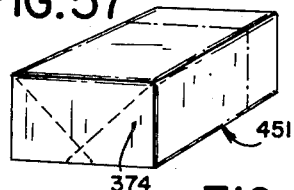
Fig. 57 is a perspective view showing the container as completed by the mechanism of Station V.
Figure 56:
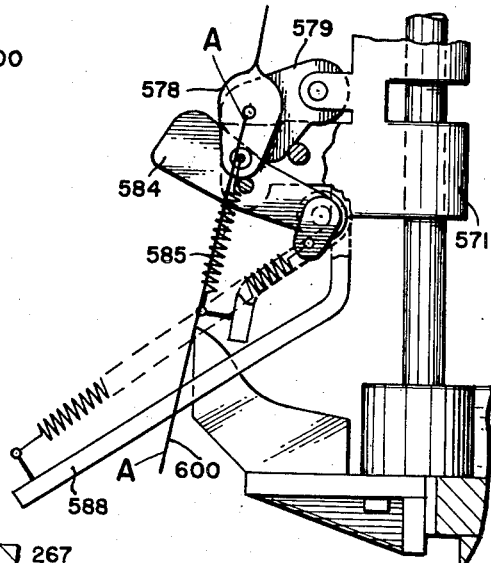
Fig. 56 is an enlarged view of a portion of Fig. 55, illustrating the details of the locking linkage.

With the folding elements of Station IV returned to their non-operative position, the turret indexes, moving the container at Station V. The mechanism of Station V is shown in Figs. 48 through 61. At Station V, the container ears 489 and 491 are folded flat against the container end over the panel 456 which is folded at Station IV, as shown in Fig. 50. With the ears flattened, the depending cover flap 374 is folded over the flattened ears, as shown in Fig. 57, and the thermoplastic material coating the face of the cover flap is heated to cause the flap to adhere to the container end, tacking the end flaps in their folded relationship.

Figure 51:
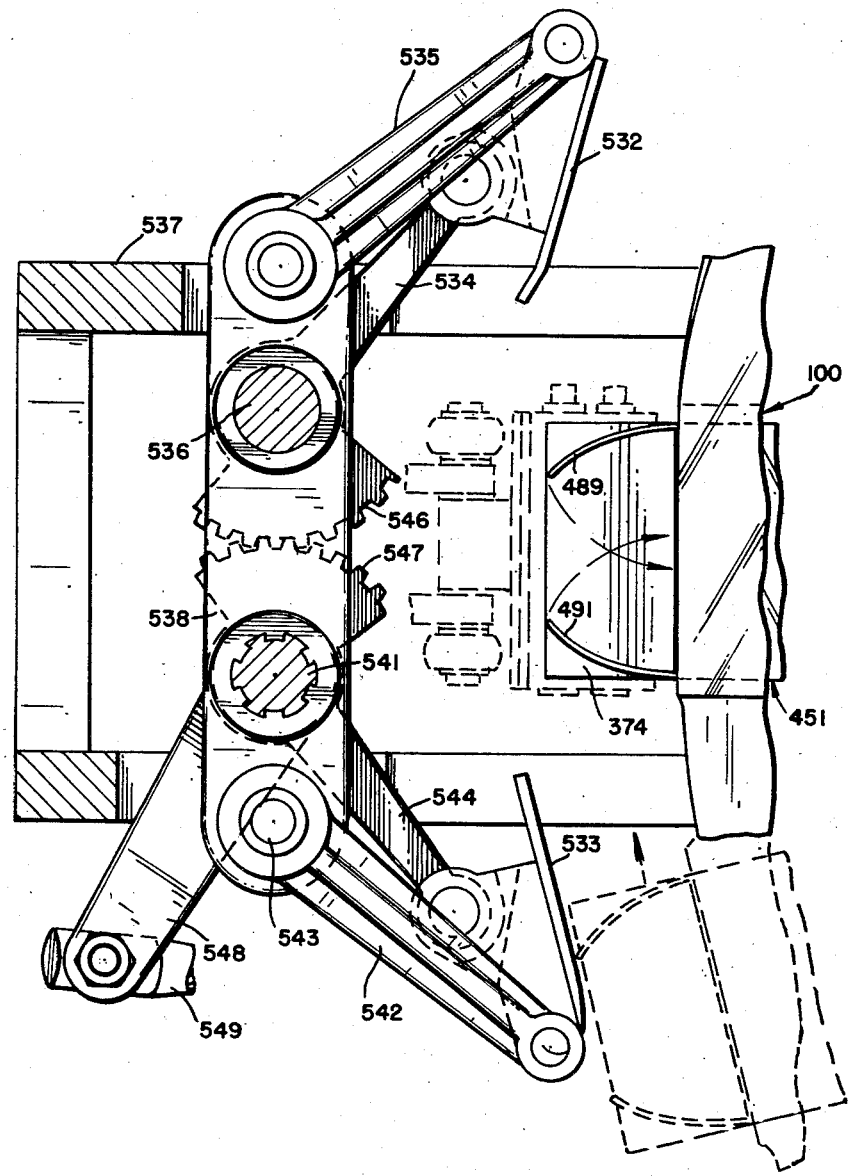
Fig. 51 is a sectional view taken along line 51—51 of Fig. 48.
Figure 52:
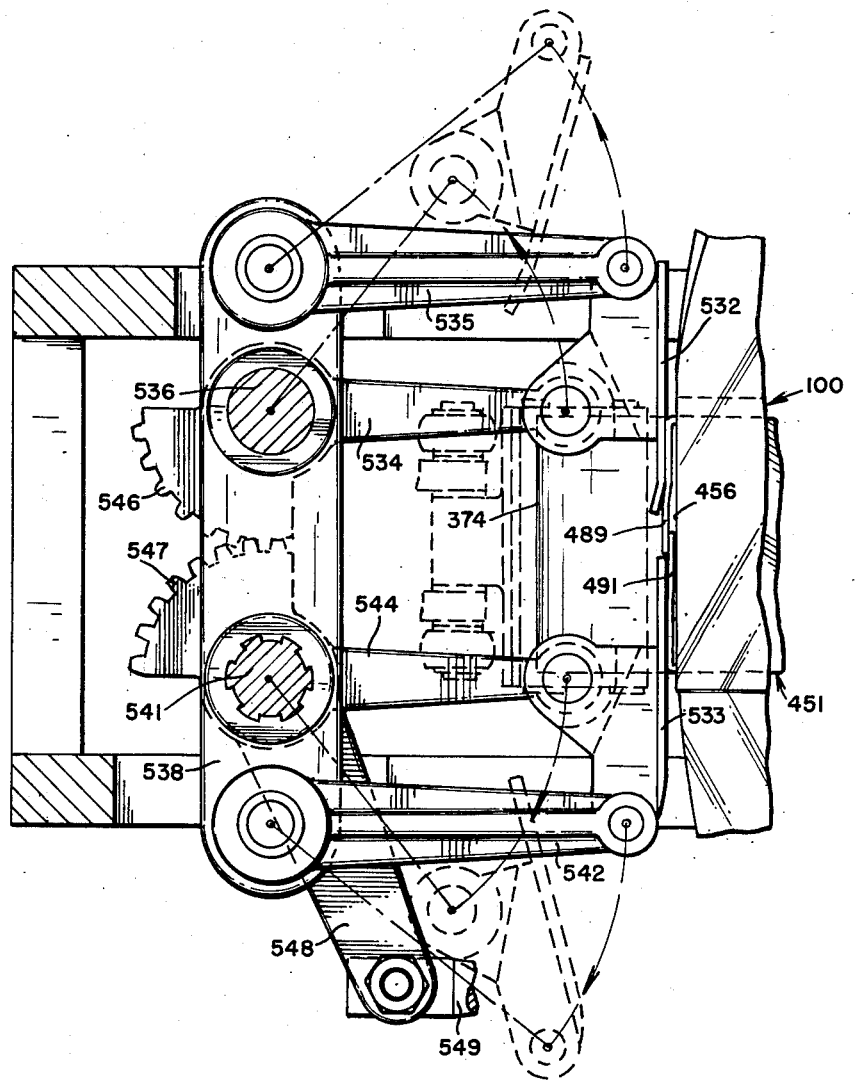
Fig. 52 is another view of Fig. 51, showing the folding members engaging the container flaps.

The ears are folded against the container end by a pair of shoes 532 and 533, as shown in detail in Figs. 51 and 52. The shoe 532 is carried on a pair of arms 534 and 535 which are pivotally connected to the shoe on their outer ends. The arm 534 is pivotally mounted on a vertical post 536 (Fig. 54) which is secured at its upper end to a crossbar 530 on the tower 537. The tower is the framework supporting the operating mechanism at Station V and is suitably mounted on the main frame 267. The lower end of the post 536 is secured in a bracket 540 on the tower. The arm 534 is pivotally mounted on the post 536 and also slides vertically thereon, being carried between upper and lower plates 538 and 539 which together with the arms form a crosshead assembly which slides vertically on the post 536 and on a parallel splined post 541. Post 541 is rotatably journaled at its upper end on cross members 530 and at its lower end in a bracket 540 in the tower 537. The plates 538 and 539 are held together by vertical bolts 542 and 543. Journaled to the upper end of the bolt 542 is the arm 535 which helps carry the folding shoe 532.

The folding shoe 533 is similarly carried as by an arm 542 which is pivotally joined to the shoe at its outer end and is pivotally mounted on its inner end to bolt 543. The other arm 544 which supports the shoe, is pivotally connected thereto at its outer end and it is splined to rotatable shaft 541 at its inner end.

The two arms 534 and 544 carry meshing segment gears 546 and 547, respectively. A crank arm 548 is secured to the rotatable splined post 541, the crank arm being pivoted by a connecting link 549 to give motion to the folding shoe assembly. When the connecting link 549 pivots the crank arm 548 clockwise, the shoes are carried inwardly and together to engage the container ears 489 and 491, forcing them against the container end moving from the dotted to the solid line position of Fig. 52. The tip of the folding shoe 533 engages the ear 491 before the shoe 532 engages its ear, thereby folding the ear 491 slightly ahead of the opposing ear 489 to prevent interference between the overlapping tips thereof.

To pivot the link 549 and drive the folding shoes, the link is connected to the upper end of a bellcrank 552 (Fig. 54). This and other driving mechanism are shown schematically in part for sake of clarity in Figs. 48, 55, 58 and 60. The bellcrank 552 and its connected mechanism are labeled B for ease of following the drawings, and especially the schematic showings. The bellcrank 552 is pivotally hung on a shaft 553 supported by brackets 554 secured on the frame 267. At the inner end of the lower arm of the bellcrank is a follower 556 which engages a cam 557 for a part of the cam's rotation. The cam 557 is carried on the cam shaft 149. A tension spring 558, connected between the bellcrank and a suitable bracket support from the frame, urges the bellcrank to pivot counterclockwise, as shown in the drawings. An additional arm 560 is secured to the bellcrank 552, at the location of its pivotal mounting on shaft 553. The arm carries a follower 559 which engages cam 557 for the portion of its rotation when it is not being engaged by cam follower 556.

As shown in Fig. 48, the follower 559 engages cam 557 and rides up over the high portion of the cam to pivot the bellcrank 552 to the right, carrying the folding shoes to folding position against the container end. As the cam 557 continues to rotate, the follower 559 drops off the high portion to a lower portion of the cam whereupon the spring 558 urges the bellcrank 552 to the left, which will return the shoes to the position of Fig. 51, separating them and drawing them away from the container end.

To insure the return movement of the shoes, the follower 556 is provided. Shortly after the follower 559 has ridden to a low part of cam 557, the high portion of the cam engages the follower 556, as shown in Fig. 60, to cause positive pivotal movement of the bellcrank 552 to the left, insuring the positive return of the folding shoes and insuring that they will be out of the way when the turret rotates.

Returning now to the stage of operation where the shoes 532 and 533 are against the end of the container, the next motion of the shoes is in a vertical direction, sliding off the end of the container. As the shoes slide vertically upward, they continue to hold the ears against the container end, while a folding head 561 follows in close adjacency to fold the cover flap 374 over the ears to prevent them from springing outwardly.

Only when the shoes 532 and 533 have risen completely above the container are they withdrawn away from the container end to spread position, as shown in Fig. 51. When completely spread, they again drop down to the position opposite the end of the container in preparation for folding the ears of the next succeeding container.

To cause this vertical movement of the ear folding shoes, a connecting rod 562 is pivotally secured to a lug 563 on the lower plate 539 of the crosshead. Reciprocal movement of the rod 562 will cause the entire crosshead to slide up and down on the posts 536 and 541. Since the post 541 is splined, vertical reciprocation of the arm 544 with respect to the post does not affect its rotational position, which is determined by the position of the post, as controlled by the crank arm 548. The lower end of rod 562 is pivotally connected to the end of a bellcrank 563, which is pivotally mounted on the shaft 553 and which carries at its lower end a follower 564 which engages a cam 566 carried on the common cam shaft 149. A tension spring 567, connected between the crank 563 and a suitable bracket mounted on the frame 267, urges the crank counterclockwise to hold the follower 564 against the cam.

The linkage, associated with the vertical movement of the ear folding shoes, is labeled "C" in the drawings to aid ease of reading.

The folding head 561 is heated by a series of heating elements 568 supplied with electricity from leads connected to a junction box 570. The heating elements cause the head to soften the thermoplastic adhesive on the cover flap 574. The head is normally in lowered retracted position, as shown in Fig. 48, and remains in that position until moved upwardly to follow the vertical ascension of the ear folding shoes. The head is carried on a vertical extension 569 of crosshead 571, which is vertically reciprocal on a pair of ways 572, secured on the frame 267. The head is supported from the extension 569 by a pair of lower links 573 and a pair of upper links 574. These parallel links are pivotally connected to the extension at one end and pivotally connected to the head on their outer ends so as to always carry the flap contacting face 576 of the head parallel to the container end 456. The lower links 573 are connected to a pin 577 on the head, to which is also connected a pair of connecting rods 578. The lower end of these connecting rods are pivotally connected to the free ends of a pair of locking links 579 which are pivotally connected to the crosshead at their other end by being secured to a pivotal cross pin 580. This linkage is shown in front elevation in Fig. 53, which is a section taken through Fig. 48 but has the elements shown in the position which obtains the clearest view but does not necessarily follow the position of Fig. 48. In Fig. 48 and the other figures showing parts of the links schematically, link 578 is shown as a straight line and its lower end is shown enlarged to illustrate its size relative to the other locking links.

Figure 55:
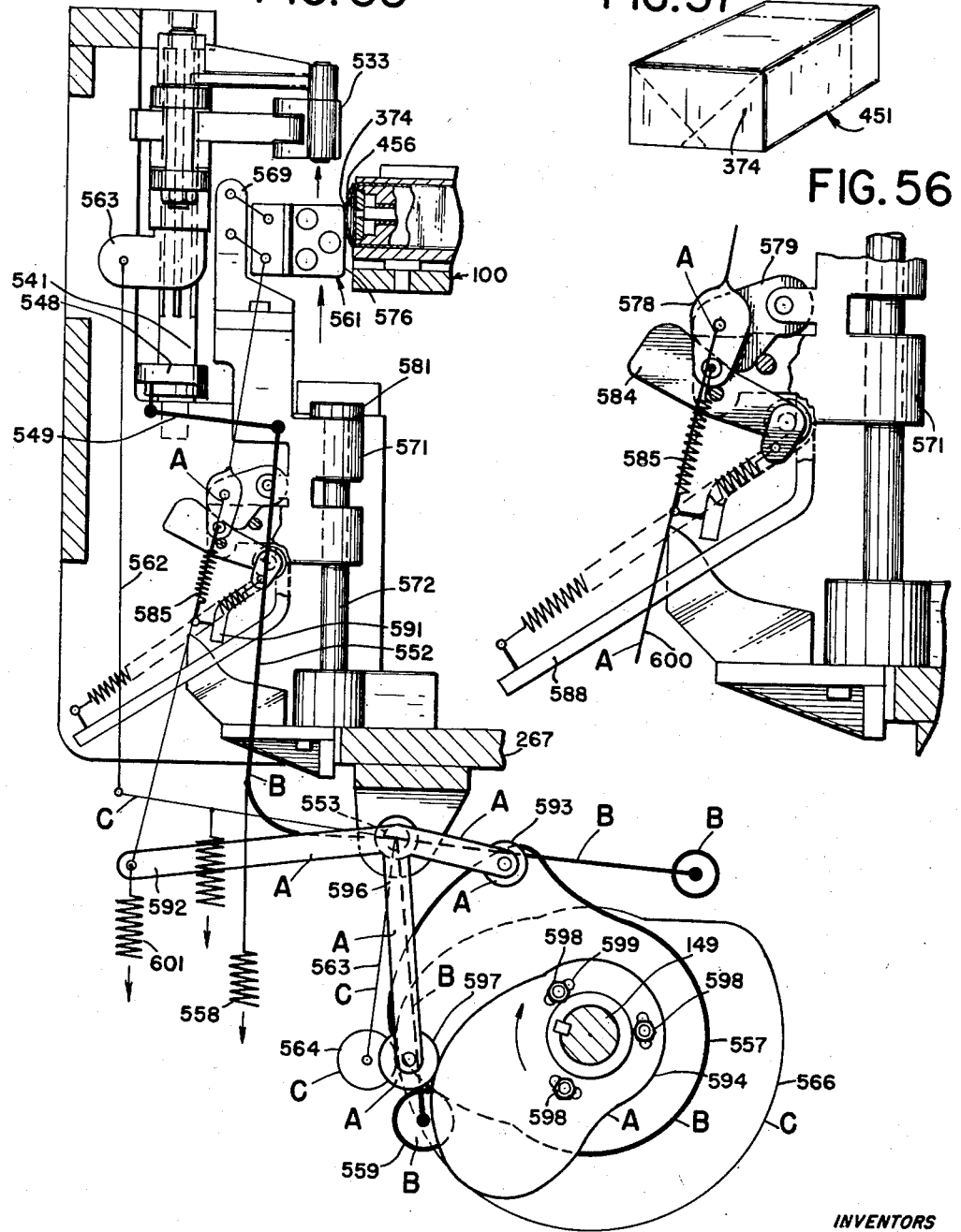
Fig. 55 is another view of Fig. 48, showing the folding elements in a different position.

When the head 561 is in the down position with respect to the crosshead 571, it may be considered in the unlocked position, as shown in Figs. 48 and 55. The locking link 579 comprises one of the links of a locking mechanism which operates to permit the head to remain in the down or unlocked position with respect to the crosshead until it is raised to a position past the container end and then the head is locked.

The raising of the head is caused by the crosshead 571 sliding upwardly on the ways 572 from the positions shown in Fig. 48 to that shown in Fig. 55. At that point, the crosshead strikes the enlarged stop 581 at the upper end of the ways to cease its upward movement. The heated head 561 then begins swinging upwardly on its parallel supporting arms 573 and 574. As the head moves upwardly, the arms carry it inwardly as they move to a horizontal position. The head swings tightly against the cover flap 374 in an arcuate path. Continued upward movement of the head causes the arms to leave the horizontal position, continuing the head in its arcuate path and carrying it away from the container end. When the head reaches the position shown in Fig. 58, it is locked in that upward position away from the container end and then carried downwardly by the crosshead, as shown in Fig. 60, until it is clear of the container end. The head, being locked in the upward position away from the container end, will not brush the container cover flap as it is lowered to cause damage to the completed end. As the crosshead reaches its lowermost position, the head is unlocked and permitted to swing downwardly on its support arms 573 and 574 to its normal position, preparatory for another folding operation on a succeeding container.

The locking linkage which controls the movement of the head 561 with respect to the crosshead 571 is shown in enlarged detail in the smaller figures opposite the views 48, 55, 58 and 60, which show the various positions of the mechanism, and also in Fig. 53.

When the head 561 is in the unlocked lowered position, the locking link 579 is pivoted downwardly with its latch engaging face 582 against a stop pin 593 mounted on the crosshead 571, as shown in detail in Fig. 49. The sear 584, which is pivotally mounted on a bracket 586 on the crosshead, is shown positioned to the left in unlatched position. A tension spring 587 is secured between a bracket 588 on the crosshead and a small projection 595 on the sear 584 to urge it to rotate in a clockwise direction or to latched position. Rotation is prevented in the unlatched position by the upper end of the latch striking the lower rounded end of the locking link 579. A pair of tension springs 585 is secured at its lower end to a bracket 591 which is secured to the crosshead 571, and at its upper end to a pin 590 which is attached to the free end of the rod 578.

Pivotally connected to the lower end of the rod 578 is a connecting link 600 which lifts the crosshead. The link is connected at its lower end to a rocker arm 592 which is pivotally mounted on the common shaft 553 and which carries on its inner end a follower 593 which engages a cam 594. Another arm 596, secured to the rocker arm 592 at the point of pivotal mounting, carries at its lower end a follower 597 which engages the cam 594 for a portion of its rotation. The cam 549 is keyed to the cam shaft 149, and the remaining cams 566 and 557 are mounted on this shaft or secured to the cam shaft 149 by bolts 598 which extend through slots 599 to make them adjustable with respect to each other. All operating elements connected with the linkage for operating the flap folding head are labeled "A," for ease of the following drawings.

A spring 601 is connected between the end of the rocker arm 592 and a suitable bracket which is secured to the frame 267. The spring urges the rocker arm to pivot counterclockwise, as viewed in the drawings. As the cam 594 rotates clockwise, as shown in Figs. 48 and 55, the follower 597 rides up on the high portion of the cam, raising the flap folding head 561 into engagement with the flap 374 of the container. When the flap has been folded, the follower 597 rides off the high portion of the cam and the cam continues its rotation to engage follower 593 to force the head to be returned by positive cam movement to its return position.

Following the motion of the folding head in detail and referring to Fig. 48, the rocker arm 592 begins to rotate clockwise, pushing the link 600 upwardly to slide the crosshead 571 upwardly on its ways. The rod 600, pushing upwardly, does not swing the locking link 579 upwardly and does not swing the head 561 upwardly on its supporting arms 573 and 574 because the spring 585 holds them down and is strong enough to support the weight of the crosshead 571 and its attached elements. As the crosshead 571 strikes the stop 581, however, as shown in Fig. 55, the tension of spring 585 is overcome and locking link 579 begins to swing upwardly, as shown in detail in Fig. 56. At this position, it will be noted that the heated folding head 561 has its flat face 576 opposite the lower portion of the container end. In its upward movement the head engages the cover flap 374 and carries it upwardly over the container ears as the shoes 532 and 533 ride upwardly off of the ears. Continued pushing movement of the rod 600 further overcomes the tension of the spring 585 to cause link 578 to swing the head 561 upwardly on its supporting arms 573 and 574 against the cover flap 374 to press it tightly against the end of the container. The head is relatively warm to thoroughly soften the thermoplastic during the time of its brief engagement with the flap.

This upward movement of the head has also swung the locking link 579 upwardly to the position shown in Fig. 59. This has permitted the sear 584 to pivot clockwise and the upper latching face 602 of the sear engages the face 582 of the locking link to lock it in its raised position. The spring 587 holds the sear in locked position.

As the cam 594 continues to rotate, a high portion strikes follower 593 of the rocker arm 592 to cause it to pivot counterclockwise, pulling downwardly on the arm 600 to lower the crosshead 571. Since the locking link 579 is locked in the up position, the head 561 must remain in the up position relative to the crosshead and it is carried in that position away from engagement with the container cover flap 374 until the crosshead reaches the lowermost point of its descent. At that point, a roller 603 carried on the lower end of the sear strikes a tripping cam 604, as shown in detail in Figs. 60 and 61, which pivots the sear counterclockwise to release the locking link. This permits the spring 585 to snap the head back to normal position where it will be ready for the succeeding folding operation.

STATION VI

When the folding members are returned to their normal position, the turret indexes the container on to station VI. The present description and drawings show no mechanism at station VI as the container end is completed. Additional devices, such as code daters, may be employed at this station.

The container has now been completely folded with one end tacked by heating the thermoplastic material between the container layers. The thermoplastic between the layers of the side wall of the container has not yet been activated and the seams of the side walls remain unattached. The tacking operation for the end flaps is not a finishing operation but merely one for temporarily attaching the layers to prevent the end flaps from springing to unfolded position. The container will now be indexed to Station VII where it will be removed from the body forming turret and transferred to the welding turret wherein the entire thermoplastic between the side wall and end wall layers will be softened while the layers are being pressed to thereby laminate the walls of the container to form a package having united side and end walls.

*Container transfer mechanism and container welding turret*

The mechanism for removing the containers from the body forming turret 100 and transferring them to the welding turret 102 is shown in Figs. 62 through 66, Figs. 62 and 63 together forming one figure illustrating the two turrets and their relationship to each other.

Figure 62:
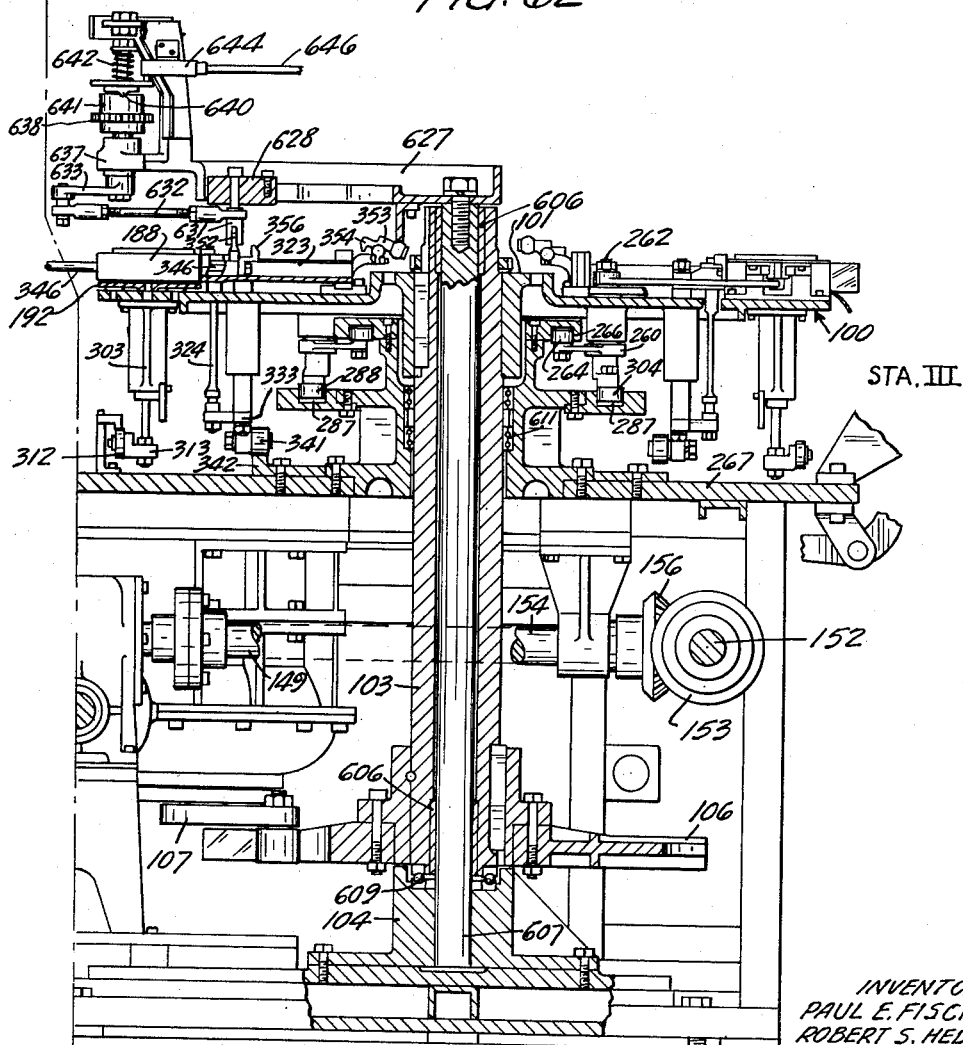
Fig. 62 is a vertical sectional view taken through the body forming turret and illustrating the mechanism for removing the container from the mandrel, placing it in the welding turret.

In Fig. 62 the details of construction of the turret are clearly shown. The turret has a main framework 267 which is bolted to the floor and which has a bearing support 104 at a central portion supporting a vertical shaft 607 about which the movable turret 100 rotates. The turret 101 is secured to a sleeve 103 which is shown schematically as a solid shaft in Fig. 1. The sleeve rides on bearings 609 in the bearing support 104 and rotates on the vertical shaft 607. Suitable bearings at 606 are positioned between the shaft 607 and the sleeve 102.

Secured to the lower end of the sleeve is the Geneva gear 106 driven by the pinion 107 to rotate the turret 101 and the supporting sleeve 103. The sleeve also finds lateral support by bearings 611 which are between the upper portion of the stationary frame 267 and the sleeve.

The welding turret, as shown in Fig. 63, is constructed similar to the body forming turret of Fig. 62. The turret 102 is suitably supported on the upper end of the sleeve 157, which is shown schematically as a solid shaft in Fig. 1. The sleeve rotates about a vertical shaft 613 stationarily supported in a supporting base 158 which is mounted on the main stationary framework 616. A bearing 617 is positioned between the sleeve and the frame 616. Bearings 618 permit the sleeve carrying the turret to rotate on its supporting base 158. Suitable bearings 619 are positioned between the sleeve 157 and the vertical shaft 613. The lower end of the sleeve is secured to the Geneva gear 159 for indexing the turret, driven by the Geneva pinion 161.

As the turret 100 indexes carrying the container into Station VII, the container is positioned directly opposite a container receiving box 621, on the welding turret 102, which will be labelled Station VIII, as shown in Figs. 1 and 66.

As the turret 100 carries the mandrel 188, which supports the container into Station VII, the clamping plate 189 (Fig. 66), which has held the seams of the container sidewall secure during its travels from Stations III through VII, slides off the top of the mandrel. The plate is operated by the action of the cam follower 288 in stationary cam track 287. Since the end of the container has been secured by thermoplastic, the seams will spring slightly apart but the container will be kept substantially in its correct shape.

The mandrel is then raised slightly to free the container from the lower clamping plate 192. The clamping plate 192 is, of course, held down so that it cannot stay with the mandrel as it moves slightly upward. To raise the mandrel, the follower 341, which is secured to the plate 333 at the bottom of the mandrel supporting posts, rides up on the raised portion of the cam track 342. This track raises the mandrel only sufficiently to clear it of the clamping plate 192 and not completely out of the turret well. To hold the clamping plate downward, the follower 312, secured on the lower end of the post 303, rides under an overhanging cam 622 secured to the stationary framework 267. The cam for raising the mandrel is shown in detail in Fig. 65.

To strip the container 451 from the mandrel, the rod 346 carrying the ejecting plate 348 moves outwardly through the mandrel interior, forcing the ejecting plate 348 against the container bottom and carrying the container into the receiving box 621 mounted on turret 102. It will be noticed that latch member 353, having hook 354 which latched over the mating hook 356 on the inner end of the ejector rod, is released. To accomplish this, latch member 353 has a follower roller 623 which is engaged by stationary cam 624 to pivot the latch to release position against the action of its spring 626 which normally holds it latched. The cam 624 is mounted on the overhanging stationary frame arm 627, which is secured to the top of the stationary shaft 607.

This arm also supports the crosshead 628 which rides back and forth in a radially extending slot 629 (shown in detail in Fig. 64) and carries the bifurcated shoe engaging member 631 which grips the shoe to slide the ejector rod outwardly. The shoe 352 is carried between the bifurcated ends of the wedge engaging member 631 as the turret indexes the container into the ejecting position.

To slide the ejecting rod back and forth, a connecting rod 632 is pivotally connected to the crosshead 628 and is reciprocated by a crank 633. The crank is carried on a vertical shaft 634 journaled in upper and lower brackets 636 and 637 on the frame arm 627. To rotate the shaft carrying the crank 633, a gear 638 is freely journaled on the shaft and has a clutch to attach it to a driving plate 639 which is keyed to the shaft.

The plate 639 has a projection 640 which extends into a mating notch 641 in the gear 638. A coil compression spring 642 urges the plate against the gear. The projection 640 will jump out of the notch and cause the plate to raise upwardly with respect to the gear if the shaft and plate are prevented from turning when the machine jams. A shear pin 643 extends between the plate and the gear into holes. This pin will shear when relative rotation occurs between the plate and gear. Positioned above the plate is a normally open contact switch 644 having a lower arm with a pin 645 which rides on the upper surface of the plate 639. Raising the plate will then close the switch.

If, when the container is being stripped from the mandrel the receiving box is not in line to receive the mandrel or if other obstacles are encountered to cause an abnormal amount of resistance to the sliding of the ejecting rod, the resistance to the rotation of the shaft 634 will cause shearing of the pin 643 and the projection 640 will jump out of the notch 641 to raise the plate 639. This will close the contact switch 644. The closing of the switch will make contact through the leads 646, to complete the circuit through solenoid 146, as shown in Fig. 1. This will release the clutch throw-out mechanism, as described earlier in the specification, to stop the machine.

The drive for the gear 638 is shown in detail in Fig. 64. The driving gear 647 is mounted on a vertical shaft 648, as shown in Fig. 1, driven through bevel gearing 649 by shaft 651 which is rotated by bevel gearing 652 driven by the main vertical shaft 108. Gear 647 continually rotates gear 653 which carries the Geneva pinion arms 654a and 654b which have the pins 655a and 655b. These pins catch in slots 670a and 670b of the plate 675, carried on the gear 638 to start and stop the gear. The gear is locked in non-rotative position by the cooperative action of the arcuate depression in the edge of plate 675 and the curved face of plate 680 carried on gear 653. The gear 638 has intermittent motion and, when driven through a complete cycle, it ejects the container from the mandrel, places it in the receiving box and returns the ejecting rod 646 to its normal position.

The Geneva gear 638 is locked at rest during the time the turret is indexing. As the turret indexes the next succeeding mandrel into Station VII, the shoe for ejecting that mandrel will be carried between the bifurcated end of the shoe engaging member 631. Gear 638 will then again be given another 360° rotation to eject the container from the mandrel.

The box 621 for receiving the container is shown in Figs. 63, 66 and 85. The box is mounted in a cradle 656 supported on the turret 102 and is pivotable about a horizontal axis. The box pivots between the horizontal receiving position, shown on the right in Fig. 63 and the vertical position shown on the left. To pivot the box, a pivoting arm 657 is rotatably secured to a connecting link 658 (Fig. 63) which is connected to the box at a point 659 which is at one side of the axis of rotation. A keeper 661 is secured to the side of the cradle to hold the box therein. To carry the box from its horizontal to vertical position or to carry it from the position shown in the right of Fig. 63 to that shown at the left, the pivoting arm 657 is drawn downwardly by its supporting post 662. The post is moved downwardly by a cam follower 663 secured to its bottom, the follower moving in the cam track 664, the cam being secured to the upper surface of the stationary frame 616.

It will be noted in Fig. 66 that, although the stationary frame for the turret 100 is numbered 267 and the stationary frame for the turret 102 is numbered 616, they may be continuous and be the same frame. For convenience of reference, the two numbers will be used.

After the container is received in the box at the first station of the welding turret, it is indexed to the second station. The box, between Stations IX and X is up-righted so that the open end of the container faces upwardly. It will be noted that the container is not completely inserted into the receiving box. A small space remains between the bottom of the container and the bottom of the box.

When the box is upright, the heated expanding welding mandrel 666 is inserted into the top of the container and pushed against the bottom of the container to insert it fully into the box. When the mandrel 666 strikes the bottom of the box, it expands to force the container walls and bottom tightly between the expanding member and the walls of the container supporting box. The container is permitted to remain within the box for some time while the turret is indexing, pressing the layers of the side end wall tightly together as heat is imparted thereto to soften the thermoplastic. When the thermoplastic adhesive is completely softened and forced by pressure to penetrate into the pores of the material, the heated mandrel is withdrawn. As the mandrel is withdrawn it again contracts to be easily removed from within the container walls. It will be noted that, whereas the body forming turret carried only eight mandrels and was rotated one-eighth of a turn with each index, the container body welding turret carries twelve mandrels. This permits the mandrel to remain within the container for a longer period of time to permit the heat to completely penetrate to all portions of the container and completely soften the thermoplastic. It also gives the mandrel adequate time within the container so that it does not have to be heated to a high degree of heat.

Figure 67:
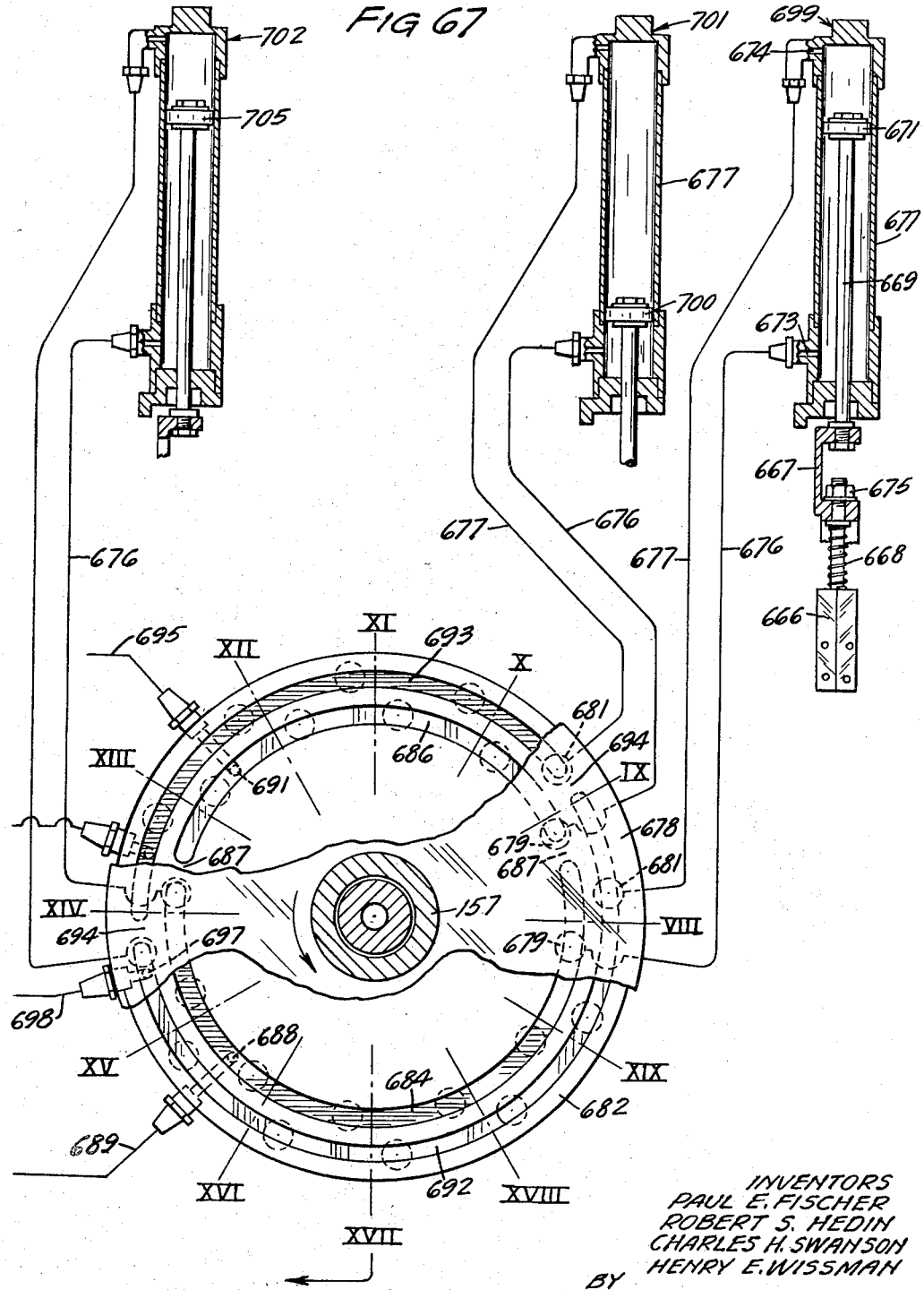
Fig. 67 is a schematic view showing the air control valve arrangement on the welding turret for operating the welding mandrels.
Figure 89:
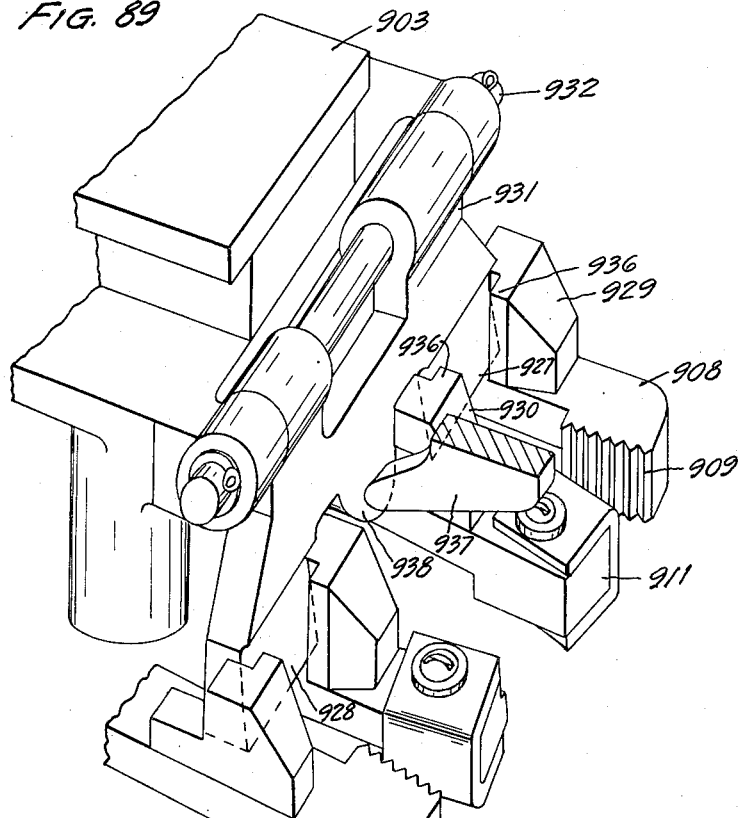
Fig. 89 is an enlarged perspective showing the mechanism for holding the grippers in spread position.

The mandrels are inserted into the container by a pneumatic piston and cylinder. Referring now to Figs. 63 and 67, the heated expanding mandrels are carried on a U-shaped bracket 667 in which is slidably mounted the central supporting post 668 to which the mandrel is attached. A spring 670 surrounding the post holds the post in downward position and a nut 675 prevents the post from being withdrawn due to the spring pressure.

The upper end of the bracket is secured to the rod 669 of a piston 671 which slides within the cylinder 672 mounted on the turret 102. Air inlet ports 673 at the lower end of the cylinder and 674 at the upper end of the cylinder admit air under pressure to operate the piston and give the mandrel vertical reciprocation. Air lines 676 and 677 connect to the ports 673 and 674, respectively and connect at their other ends to a valve plate 678 which is suitably secured to the turret 102. The air lines 676, which connect to the port 673 leading into the lower ends of the cylinders, connect to a series of passageways 679 which are annularly positioned around in the valve plate 678. Air lines 677, which lead to the ports 674 in the upper ends of the cylinders, connect to a second series of passageways 681, also annularly positioned around the valve plate 678, but positioned outward from the first group of ports 679. A cooperative mating valve ring 682 is positioned below the first valve ring and pressed thereagainst by springs 683 to prevent escapement of air from between the facing surfaces of the rings. This second valve ring 682 is stationarily mounted upon the framework 616 so that the upper valve ring 678 has rotation with respect to it. In the lower valve ring is a pair of arcuate grooves 684 and 686 so arranged as to be opposite the series of inner passageways 679. Each of the annular grooves extends substantially halfway around the lower valve plate, being separated by solid end wall portions 687 so as to have one arcuate groove connect with half the passageways and the other with the other half. The annular channel or groove 684 has a passageway 688 which connects through a fitting to a pressure line 689, thus keeping under pressure the entire area of the annular passageway, as shown shaded in the drawing. The annular groove or channel 686 has a similar passageway 691 which leads through a fitting to a line 695 which connects to the atmosphere to always keep the groove 686 at atmospheric pressure.

Also located in the lower valve ring 682 is a second pair of annular channels or grooves 692 and 693, each of which extends substantially halfway around the ring and is separated by end walls 694. These annular grooves are arranged so as to always be opposite the outer passageways 681 with one groove connecting with half the passageways and with the other connecting with the other half. Groove 693 is connected through an opening 694 to pressure line 696, always keeping shaded groove 693 under air pressure. Groove 692 is connected through an opening 697 to a line 698 which is vented to atmosphere, thus always keeping groove 692 at atmospheric pressure.

In the operation of the turret, it will be seen that in the cylinder 699 of Fig. 67, the line connecting to the upper end of the cylinder is opposite the annular groove 692, thus venting it to atmosphere. The line connecting to the lower end of the cylinder is opposite the annular groove 684, thus connecting the lower end of the cylinder to low pressure, and thereby causing piston 671 to remain in the upper end of the cylinder and hold the heated mandrel 666 in raised position.

As the turret 102 rotates and the upper valve plate 678 rotates with it into Station X, the piston 700 in the cylinder 701, moves to the bottom of the cylinder to force the mandrel 666 into the container. This is caused by the passageway, which connects to the line leading to the lower end of the cylinder, moving over the annular groove 686 and venting the lower end of the cylinder to atmosphere. The passageway connected to the line leading to the upper end of the cylinder moves over the pressurized annular groove 693, thus causing a pressure in the upper end of the cylinder to force the piston 671 downwardly to the lower end of the cylinder. The piston remains in the lower end of the cylinder while the turret and the valve plate 678 rotate carrying the expandable mandrel from Station X to Station XV. At the latter station the cylinder, represented by the number 702, raises its piston 705 and withdraws the mandrel from the container. This occurs because the air line connected to the upper end of the cylinder has its connecting passageway moved over the annular groove 692 and the passageway connected to the line 676 connected to the lower end of the cylinder moves over the annular groove 684 which is pressurized, thus leading air pressure to the lower end of the cylinder and raising the piston. The piston will remain thus raised, until the turret rotates sufficiently to bring it around to Station X.

Referring now to Figs. 63, 68 and 69, the means for heating the expanding mandrel will be described. The central portion of the mandrel 703 is wedge-shaped and has a heating element 704 extending through its center. Electrical leads 705 and 706 connect to the terminals 707 and 708 at the upper ends of the heating element. The leads also connect to terminals 709 and 801 which are connected to spring-mounted brushes 802 and 803 which bear on slip rings 804 and 805 insulated from each other and secured to a stationary central post 806. The leads and brushes are mounted in insulator rings 800. Electrical leads 807 lead down through the center of this stationary post and down through a passageway 808 in the shaft 613 to connect to a suitable source of electricity. A series of insulating rings 800 (Fig. 69), each supporting brushes, are mounted on top of each. An annular collar 809, resting on top of the turret, provides a support for the flexible conduit 811 which carries the wires 705 and 706 to a connector box 812 which moves up and down with the expanding mandrel. Each mandrel has a conduit and wires leading to brushes and in this manner, current is fed to each of the mandrels and they are continuously kept warm.

The structure of the mandrel which obtains the feature of its expansion as it is inserted into the container is shown in Figs. 70 through 74. The mandrel is constructed of a central wedge-shaped portion 703 having its four walls inclined upwardly and outwardly. This central wedge portion has the heating element 704 which keps it heated and it conducts heat to the outer shell portion. The four quadrants which form the shell portion are shown assembled in Fig. 72, with the central wedge removed. A single quadrant 813 is shown in Fig. 71, having flat outer walls 814 and 815 meeting at right angles and having the opposing inner surfaces 816 and 817 which are inclined downwardly so as to be thicker at the bottom than at the top. The inner surfaces 816 and 817 are parallel to the contacting outer surfaces 815 and 820 on the wedge of Fig. 68. The four quadrants are thus caused to expand outwardly as the wedge moves downwardly within them. At the upper end of the quadrants is an overhanging lip 818 which prevents the wedge from being squeezed out from its confined position within the quadrants. The quadrants each have horizontally extending bored holes 819 through which extend coil tension springs 821 which hold the quadrants tightly to the wedge, as shown in detail in Fig. 74. The outer ends of these holes are countersunk and the broadened head 822 of an anchoring member 823 rests in the countersunk portion of the holes. Tension springs 821 are brazed to the body portion 824 of the anchoring member. In assembling these devices, the quadrants are arranged around the spreading wedge 703 and the tension springs, each having an anchor on one end, are inserted into the holes. The free ends of the spring are then withdrawn through the holes at the other end and an anchoring member attached whereupon the anchoring member is released to seat in its countersunk hole. The tension springs then urge the quadrants together to force the wedge 703 upwardly.

When the assembly is inserted into a container and the lower face 826 of the quadrants engages the container pushing it against the bottom of the box, the wedge member, being pushed downwardly by its supporting post 665, continues its downward travel to spread the quadrants, forcing them into the corners of the container against the inner walls of the box. This forces the layers of container material tightly together.

The bracket 667, which is connected to the post 665, Fig. 63, is carried downward slightly past the point where the wedge 703 strikes the bottom of the quadrants. The post 665 is slidably mounted in the lower end of the bracket so that the bracket can continue movement and compress the compression spring 670 which surrounds the post. The U-shaped bracket permits room for the post to slide upwardly and the force of the spring 670 holds the wedge snugly against the bottom of the expanding mandrel quadrants.

It will be noticed, Fig. 73, that the lower face of the quadrants is relieved to partially compensate for the variation in thicknesses of the material at the container bottom. The thickest portion of the container bottom is that represented by the doubled ears of the inner container layer added to that of the doubled ears of the outer container layer. This triangularly shaped area on each side of the container is represented by the triangular shaped areas 827 and 828 cut so as to be slightly relieved from the higher portion 829 of the mandrel bottom. This permits an even pressure to be applied to all sections of the container bottom permitting the adhesive to be squeezed evenly between the layers.

The container receiving box 621 is constructed so that it will diminish in interior dimensions or size when the mandrel pushes the container against its bottom and expands to release the container assembly when the mandrel is removed. The box assembly consists of parts including two outer vertically positioned disks 831 (Figs. 63, 66 and 84) which ride in the cradle 656 and are connected to each other by four cross pins 832. Between these disks ride the box. The outer disks (Fig. 63) have openings 800 in their faces, the openings being trapezoidally shaped with parallel upper and lower sides, the lower side being the shortest. The side walls 833 provide bearing surfaces for the shoulders 834 of the box proper, as shown in Figs. 75 through 78. The box proper is comprised of two mating half sections 836 and 837, each providing half of the box. The lower edge of the bottom of section 837 is rabbetted at 838 and a tongue 839 on the box section 836 mates therewith to form a joint. The shoulders 834 are parallel to the inner surfaces 833 of the trapezoidal opening in the walls of the carrying disk. Raised portions 841 and 842 extend between the shoulders and have passageways 843 and 844 therein in which extend compression springs 846 and 847 which urge the sections of the box apart and which force the shoulders 834 against the surface 833 to hold the box in the upper portion of the trapezoidal opening. Springs 850 are connected between the two upper pins of the cross pins 832 and a U-shaped connector 855 secured around the bottom of the box (Fig. 84) to urge the box upwardly.

As the mandrel is inserted into the container, the mandrel pushes the container to the bottom of the box. Continued downward movement of the mandrel causes the box to be forced downwardly in its supporting plates, thereby forcing the sections of the box together tightly against the outside of the mandrel. The mandrel then expands within the box as its interior wedge continues its downward travel. Thus it will be seen that the container is squeezed between the outer walls of the extending mandrel and the inner walls of the box, both by the expansion of the mandrel and by the contraction of the box. By the design of the strength of the box springs 843 and 844 and also springs 850 so that they are relatively stronger than the mandrel springs 821, the box will contract before the mandrel expands when the mandrel pushes against the box bottom. Thus, when the expanding mandrel is withdrawn, the box will again expand to its original size, completely releasing the container, leaving it free for easy extraction from the box. If any of the thermoplastic adhesive should have oozed from between the seams and stuck to the inner walls of the box, their expansion will break them free from the container walls.

After the mandrel has been withdrawn from the container, the box is tilted at a 45° angle, as shown in Fig. 80, and a jet of air is blown into the container interior to solidify the adhesive to fix the container seams before the container is withdrawn from the supporting box. This jet of air also cools the metallic foil of the container, causing a slight contraction in size which aids in loosening the container from the supporting box, making it easier to extract the container.

The arrangement of the body forming turret and the container holding boxes is shown in Figs. 79 and 80. The details of the jets for blowing air into the containers are shown in Figs. 81 through 83. As the turret 102 indexes and the box 621 which supports the container is indexed into Station XVII, the box is tilted to the left, as shown in detail in Fig. 80, to hold the opening of the container 451 facing out at a 45° angle. At that position, the nozzle 851 of an air supply cylinder 852 is inserted into the open mouth of the container to blow a blast of cool air therein. The tilting of the box occurs as the cam 663 rides up in the track of the cam 664 on the frame. This raises the shaft 662, causing the link 658 to pull upwardly on the box assembly at 659, tilting the cradled box to the position of Fig. 80.

The air cylinder is supported adjacent the turret 102 on an arm 853 extending from a bracket 854 on a vertical post 855. The air cylinder nozzle is inserted into the container and a blast of air is blown into the container during its rest at Station XVI. The nozzle 851 is withdrawn from the container just before the turret advances it to the withdrawal station, Station XVII. After the container is withdrawn, the container supporting box is indexed to Station XVIII and an air cylinder 856 of the same construction as cylinder 852 blows a jet of air into the now empty box. The nozzle 857 is inserted into the empty box in the same manner as was the nozzle 851 into the container. This cool air insertion into the empty box at each cycle helps to remove the heat acquired by the box from heat transmission from the expanding mandrel. The box 621 is also tilted at an angle of 45° for reception of the air at Station XVIII. The air cylinder 856 is supported on an arm 858 which is fixed to a vertical post 859.

Referring now to Figs. 82 through 84, the details of the air cylinder and the controlling valves are shown. Air cylinders 852 and 856 are of the same construction. The air nozzle 851 is secured to a plunger 861 having an enlarged head 862 slidable within the cylindrical cavity 863. At the upper end of the cylinder 852 air pressure is fed from air line 864 into the upper end of the cavity to force the piston outwardly and to cause the nozzle to enter the container. Air line 865 leads in through the cylinder to an annular groove 866 extending peripherally around the inside of the cylinder wall 867. When the piston has slid outwardly from the cylinder to inject the nozzle 851 into the container, a passageway 868 leading through the piston into the air jet connects with the annular groove 866 to permit air to flow from the supply line 865 out through the tip of the nozzle 851 and into the container. Thus air will be fed through the nozzle only when it is fully extended toward the container. The air cylinder need not be designed so that the nozzle will extend toward the container when in operating position. But for improved performance, it is desirable to have the nozzle reciprocate to an operating position near the container opening.

A third air line 869 leads into the air cylinder through a passageway 871 which connects to the cavity 863 beneath the enlarged portion 862 of the piston. Air lines 864 and 865 are fed through a common line 872. It will readily be seen that, when pressurized air is fed to the line 872 and the line 869 is vented to atmosphere, the piston 861 will move outwardly from the cylinder 852 and when it is fully extended, air will be blown from the nozzle. When the air line 872 is vented to atmosphere and line 869 is connected to air pressure, the piston 861 will be retracted within the cylinder 852.

The lines 872 and 869 are alternately pressurized and vented to atmosphere for each index of the turret to force air into each container. The valve 870 for controlling the flow of air to the lines is shown in detail in Figs. 82 and 83. The same valve is used for the two cylinders, as shown in Fig. 79. The valve is of a well known type, having an intake fitting 873 connected to a pressurized air source and leading to a central chamber 874. Reciprocation of a plunger 875 alternately connects this chamber with the passageways 877 and 878 which lead to the air lines 869 and 872, respectively. Fig. 82 shows the pressurized chamber 874 connected to the passageway 877 to pressurize line 869. While the reduced portion 879 moves into the opening 881, which connects between the chamber 874 and the passageway 877, the inner reduced portion 882 of the valve plunger moves into the opening 883 which connects the passageway 878 to the atmosphere. The enlarged portion 890 of the valve plunger is positioned in the opening 893, thereby preventing the chamber 874 from being vented to atmosphere.

The end of the valve plunger 875 is connected to a rocker arm 884 which is pivoted by a cam 886 to cause reciprocation of the valve plunger. Cam 886 is mounted in shaft 149. A coil compression spring 887, extending between the body of the valve casing 888 and a flanged cap 889 on the valve stem, holds the follower 891 on the rocker arm in contact with the cam. The cam 886 is rotated one revolution for each index of the turret, thereby causing a complete cycle of the air injection cylinder for each container which is presented.

In Fig. 83, the valve stem is shown moved to the left with the reduced portion 882 of the valve stem moved into the opening 892 which connects between the chamber 874 and the passageway 878. This pressurizes the line 872. The enlarged portion 890 of the valve stem has moved into the opening 883, preventing the chamber 874 from being vented to the atmosphere. Line 869 is vented by virtue of the fact that the reduced portion 879 of the valve stem has moved into the opening 893 which vents the passageway 877 to atmosphere.

*Container transferring mechanism*

After air has been blown into the container at Station XVI, it is indexed to Station XVII where it is pivoted to a horizontal position, as shown in detail in Fig. 84. At that point the container 451 is pulled from the box 621 onto a conveyor, whereupon it is carried to the cooling tower where the thermo-plastic adhesives are given an opportunity to completely solidify.

The mechanism for withdrawing the container from the welding turret is shown in detail in Figs. 84 through 90. The container is removed by being gripped tightly by each side. The mechanism which grips the container then pulls outwardly to withdraw the container from the box and carries it onto the conveyor platform 884, indicated by the broken line arrow 886 of Fig. 84. The conveyor consists of a pair of chains 887 and 888 carried on sprockets 889 and 891 which are mounted on the shaft 892 which is driven by shaft 893 through gears 894, as shown in Fig. 1. Shaft 893 is driven through bevel gears 894 by vertical shaft 896 which, in turn, is rotated through bevel gears 897 by shaft 898, the shaft being driven by gears 899 by the cam shaft 149. Mounted at the top of vertical shaft 896 is a crank 901 which through a pitman 902 reciprocates the crosshead 903 which slides on ways 904 and which carries the mechanism for removing the container from the welding turret.

Carried on the lower side of the crosshead 903 are two pairs of tongs which, when carried forward, grip the container and draw it outwardly onto the conveyor platform. Each arm of the tongs is pivotally mounted on a stud bolt 906 threaded up into the crosshead 903. The tong arms are crossed to the rear of their supporting bolts 906 in scissors fashion and a pair of tension springs 907 extends across the rear ends of each pair to draw the rear ends together and to thus force the front ends together. One of the arms 908 has on its front end a corrugated jaw 909 and the mating arm 911 has an opposing jaw 912 formed of a resilient material which is looped over the face of the jaw and secured to the upper and lower sides of the arms by a fastener 913 such as a rivet or small bolt. When the jaws 909 and 912 are clamped together on the closure panel 914 of the container 451, in the manner shown in Fig. 86, the container is securely gripped with the teeth of the corrugated jaw 959 forcing the material tightly against the resilient opposing jaw 912 in a manner which secures the material but does not damage it. The resilient material of the jaw 921 may be of rubber or other suitable material.

When the crosshead 903 slides outwardly from the turret on its ways 904, the rear ends of the arms 908 and 911 strike a vertical spreading cam 916. The cam shown in plain view in Fig. 85 has a narrow front edge 917 from which cam surfaces 918 and 919 lead rearwardly and outwardly. These surfaces engage the beveled rear corners 921 and 922 of the arms and force the ends of the arms apart against the action of the tension springs 907, thereby forcing the jaws 909 and 912 away from each other to release the container. The cam 916 is positioned so that the jaws are spread just as the container 451 is positioned on the platform 884 and against the stop 923 at the edge of the platform. The container will rest on the platform until the continually moving container chains 887 and 888 carry container engaging lugs 924 and 926 up against the side of the container to carry it along with the conveying chain.

As the jaws of the arms 908 and 911 are forced apart, locking fingers 927 and 928 drop between lugs 929 and 930, which project vertically from the arms, to lock the jaws in spread position. The fingers 927 and 928 are carried on a latch member 931 which depends from the crosshead 993, being pivotally carried on a pin 932. A coil compression spring 934 mounted in a recess on the crosshead urges the latch to swing outwardly, forcing the locking fingers between the lugs 929 and 930. A small boss 935 projects rearwardly from the latch 931 into the spring to hold it in position. Each of the lugs has a projecting lip 936 which prevents the locking fingers from swinging past the lug.

To release the jaws to clamp the container, the fingers must be swung rearwardly out from between the lugs. To this end a stationary tripping finger 937 projects downwardly and strikes a projection 938 on the latch 931, swinging it rearwardly as the carriage is moved forward. This tripping finger 937 is supported on the inner end of the ways 904. When the locking fingers 927 and 928 move out from between the lugs 929 and 930, the jaws snap together, clamping the top walls of the container between each pair. The carriage immediately begins to move rearwardly, withdrawing the container from the turret to carry it onto the conveyor.

Figure 90:
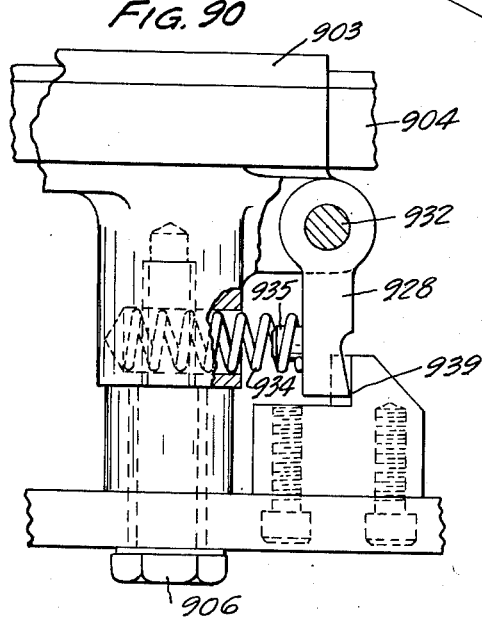
Fig. 90 is a sectional view along line 90—90 of Fig. 85.

It will be noted in Fig. 90 that the releasing finger is cut so as to come to a point 939 at its lower end, thereby increasing the ability to obtain a well defined, quick release of the clamping jaws.

Container cooling mechanism

Referring now to Figs. 91 through 96, the cooling tower is shown. The containers are carried thereto on the conveyor chains 887 and 888 which run over the idler sprockets 941 and 942, carried on the connecting framework 943 which rides between the frame 616 of the body welding turret and the cooling tower 944. As the containers reach the end of the conveyor chain, they are pushed against the stop 946 and on the platform 947, whereupon they are inserted into the cooling tower through the opening 948.

To insert the containers into the tower a pusher head 949 (Fig. 79) is carried on the end of a reciprocating pusher arm 951 which is carried on the end of a pair of parallel arms 952 and 953, being supported at their inner ends on vertical pivotal shafts 954 and 956 mounted in the framepiece 957. The pusher is timed to operate each time a set of conveyor lugs moves so as to position a container in front of opening 948.

Referring now to Fig. 84, the lower ends of the vertical shafts 954 and 956, for pushing the container into the tower, are shown. Shaft 954 has a crank arm 958 secured at its lower end, the crank being connected by a rod 959 to one end of a rocker arm 961 pivotally mounted on a base 962 on the frame 616. The other end of the arm 961 carries a cam follower 963 which engages a cam 964 secured on the vertical shaft 896. A tension spring 966 (shown in Fig. 1) is connected between an arm 967 on the frame and the rocker arm 961 to hold the follower in engagement with the cam.

Cam 964 makes one rotation for each container and is carried to the cooling tower. As the container is positioned before the opening on the tower, the head 949 engages the bottom of the container to push it in the tower, moving from the solid line position of Fig. 79 to the dotted line position to slide the open end of the container over the blade 968 which supports the container while it is carried through the tower. The blade is tapered at its outer end 969 for ease of receiving the container. An arm 971, fastened between a pair of chains 972 and 973, supports the blade. The chains are carried on sprockets 974 and 975 secured on a shaft 976 which is driven through a gear box 977 and several universal joints by shaft 149, shown also in Fig. 1.

The containers 451, Fig. 93, are often placed on the carrying blades 968 at an angle to the blade because of the light weight of the containers and because of the speed at which the mechanism operates. An example of how the container may be positioned on the blade is shown by the lower blade of Fig. 93. This position is highly undesirable as the container may become misshapen while it is cooling and because the container must be properly oriented when it is removed from the cooling tower and sent on to the filling machine. It will be noticed that a guide bar 978 is positioned opposite the closed ends of the containers above the opening 948 in the cooling tower wall to prevent the containers from slipping outwardly off the supporting blades. As the chains 972 and 973 carry the blades upwardly, the containers pass between a pair of flexible tongues 979 and 981 which serve to straighten the container on its blade. These tongues are very flexible and yieldable and curve slightly into the path of the container, as it is carried upwardly, to engage the side walls 982 and 983 of the container, pulling it flat against the carrying blade. After the container has been carried upwardly beyond the flexible tongues, it will have been straightened and will lie flat on the blade, as indicated in the upper position of the container, Fig. 93.

The flexible tongues are supported by being secured to vertical projections 984 on brackets 986 extending from a cross-piece 987 on a vertical guide member 978. This support for the tongues is shown in detail in Fig. 94. Although the tongues are very light in weight and engage the containers with a minimum of pressure, a tensioning adjustment is provided to equalize the position and adjust the pressure of the two opposing tongues. This adjustment is shown in form of a stud 985 threaded into the vertical support 984 and engaging the tongue with its inner tip. A locking nut 990 is provided to secure the stud in adjusted position. The tongue is secured at its lower end to the vertical support 984 by a pair of small bolts 999.

The container thus straightened is carried upwardly through the cooling tower. Referring to Fig. 92, the chains 972 and 973 first pass upwardly over the idler sprockets 988 and 989 and then downwardly over sprockets 991 and 992 to again be carried upwardly toward the idler sprockets 993 and 994. The cooling tower 944 is comprised of an outer enclosing shell 995 having a screened opening 996 at its lower end through which a blower 997, suitably driven by an electric motor 1000, blows cooling air. The air passes upwardly, circulating around the containers which are to be carried through the tower and passes out at the upper screened end 998. The reversals in direction of the chains which carry the containers are to give the containers adequate time within the tower to permit the thermoplastic adhesive to become solidified.

As the containers are carried upwardly and approach the upper sprockets 993 and 994, as shown in Fig. 95, an air nozzle 1001 directs the jet of air into the interior of the container, blowing it out of the cooling tower through the passageway 1002 between the conducting bars 1003 which permit the escapement of the air. The container then drops downwardly by gravity through the tube 1004 where it is carried to filling mechanism which is not shown as it forms no part of the present invention.

The jet of air from the nozzle 1001 is not continuous but it is applied only when the container moves into the position in front of the passageway 1002. The flow of air is controlled by a valve, shown in detail in Fig. 96, fed through an air line 1005 which is connected to the nozzle through a connecting block 1006 and a line 1007 leading to the nozzle. Air line 1011 is connected to a source of air pressure and leads into the valve 1012 which is mounted on a bracket 1013 secured on the frame 1010 of the cooling tower. The valve stem 1014 is connected to one end of a pivotal rocker arm 1015, the other end carrying a cam follower 1016. The follower 1016 engages a cam 1017 which is mounted to rotate on the shaft 1018 which carries the sprockets 993 and 994. A tension spring 1019 connected between the frame 1017 and rocker 1015 holds the follower 1016 in engagement with the cam. As the cam rotates each time a raised portion 1021 of the cam strikes the follower, the valve stem 1014 is depressed to permit passage of air through the valve, thereby causing air to be directed into the container. The raises 1021 on the cam are arranged to occur each time a container moves into position opposite the passageway 1002 so that the container will be dislodged from its carrying belt and shoved out of the cooling tower at the proper time.

Thus it will be seen that we have provided a machine capable of high-speed operations which will completely form a container from a flat unfolded blank. The machine is designed to form a container from a blank formed of a plurality of thin layers including light weight pliable metallic foil material and yet accomplish the complete folding of the container in a rapid manner without doing damage to the material. The mechanism also completely folds the container into shape without the aid of adhesive for securing the various layers together and for securing the side seams. Finally, after the folded container blank is formed into a container, the layers of material forming its walls are completely laminated by the application of heat to soften the thermoplastic and by subsequent cooling to re-solidify the adhesive. This is accomplished without permitting the container to lose its shape.

We have, in the drawings and specification, presented a detailed disclosure of the preferred embodiment of our invention, but it is to be understood that as the invention is susceptible of modifications, structural changes and various applications of use within the spirit and scope of the invention, we do not intend to limit the invention to the specific form disclosed but intend to cover all modifications, changes and alternative constructions and methods falling within the scope of the principles taught by our invention.

We claim as our invention:

1. A mechanism for forming containers comprising a device for holding a container blank while it is formed into a container and for carrying the blank, folding means for forming the container from the blank, means for delivering a container blank to said holding device positioned adjacent the device, a platform spanning the gap between said delivery means and said device for supporting the blank as it is moved onto the holding device, and means for moving said platform into said gap when the holding device is immobile and for moving the platform out of the gap to prevent interference with the holding device when it is moving.

2. A mechanism for forming containers comprising a pair of plates positioned in a common plane and movable in said plane to fold a container blank, means for placing a container blank on said plates, a first positioning bar secured to one of said plates, a second positioning bar secured to the second plate, and means giving lateral movement to said second positioning plate to move it toward said first plate to cause the blank to be positioned accurately on said plate against said first bar.

3. A mechanism for forming containers comprising a stationary support, a movable carrier on the support, a mandrel on the carrier about which a container blank is folded to tubular form, means for folding a blank about three sides of the mandrel, means for folding the side edges of the blank over the fourth side of the mandrel, including a plate which is mounted on the carrier and slidable over the mandrel side to fold the final edge of the blank and to thereby form a seam by said final edge overlapping the opposing edge, means for folding the portion of the blank extending beyond the mandrel end to form the end of the container, and means to move said slidable plate over the mandrel, said last mentioned means including means on the support holding said plate against the mandrel side during the folding of the container end to hold the blank around the mandrel in folded position during movement of the carrier to a plurality of positions on the support.

4. A mechanism for forming containers comprising a conveyor for carrying a container blank while it is being formed into a container, means for indexing the conveyor to carry it from a blank receiving station, a mandrel on the conveyor about which the blank is folded, a plate carried on the conveyor and positioned beneath the mandrel for clamping the blank to the bottom of the mandrel during container forming operations, means for positioning the plate away from the mandrel while a container blank is delivered between the plate and mandrel, retractable means for engaging and positioning the blank, and means for moving the plate against the mandrel before the positioning means is retracted and before the conveyor is moved from blank receiving position to hold the blank firmly therebetween and prevent it from being moved out of position by the retraction of the positioning means or the movement of the conveyor.

5. A mechanism for forming containers comprising a rectangular mandrel, means for folding a container blank around three sides of the mandrel with the edges of the blank protruding above the fourth side, a creasing blade for engaging one of said protruding flaps and forcing it over the mandrel side against the mandrel in folded position, a pair of fingers extending at right angles to each other and carried with said blade to be positioned parallel to the container walls when the blade is in creasing position, the apex of the fingers at folding position being at the corner of the container and projecting beyond the end of the mandrel to continue the creased ege of the container beyond said end of the mandrel, and a folding plate for laterally sliding over said flap after it has been creased by the creasing blade.

6. A mechanism for forming containers comprising a mandrel about which a container blank is to be folded, means for positioning a multi-layer blank having flaps cut in the edge of one layer of the blank material, means for folding the blank about the mandrel with the edge having the flaps extending beyond the mandrel end, and a flap separating blade movable toward the mandrel between the flap and a layer of blank material, a second blade movable toward the flap separating blade from the opposing side of the flap so as to pinch the flap between the first blade and the face of the second blade, and means for continuing the movement of the first blade to stretch the flap over the second blade drawing it tightly away from the container.

7. A mechanism for forming containers comprising a mandrel, means for wrapping a container around the mandrel in tubular fashion, a folding shoe movable against the portion of the container blank projecting beyond the mandrel end to fold said portion against the end of the mandrel, the shoe having side arcuate faces curved toward each other outwardly from the container end, and cooperating ear flattening members having curved faces with a curvature complementary to the shoe and being movable against the curved surfaces of the shoe to flatten the side ears of the container therebetween.

8. A mechanism for forming containers comprising in combination a mandrel, means for wrapping a container blank about the mandrel to form a container tube with a portion of the blank extending beyond the mandrel, a folding shoe engaging the blank beyond the mandrel, and movable thereagainst to fold a portion of the blank into the plane of the container end, the shoe having convex curved faces on either side extending from the container end, a pair of cooperating ear folding members having curved surfaces complementary to the curved surfaces of the shoe, and means to move the ear folding members against the sides of the shoe so that the edges of the members will first engage the shoe adjacent to the end of the mandrel and have progressive engagement away from the mandrel to finally have surface engagement and progressively flatten the container ears away from the end of the mandrel.

9. A mechanism for forming containers comprising in combination a mandrel, means for wrapping a container blank about the mandrel to form a container tube with a portion of the blank extending beyond the mandrel, a folding shoe engaging the blank beyond the end of the mandrel and movable thereagainst to fold a portion of the blank into the plane of the container end, the shoe having convex curved faces on either side extending from the container end, a pair of cooperating ear folding members having curved surfaces complementary to the curved surfaces of the shoe, and means to move the ear folding members in engagement with the curved surfaces of the shoe and to slide the members outwardly away from the mandrel along the curved surface to stretch the container ears away from container.

10. A mechanism for forming containers comprising in combination a horizontal mandrel, means for wrapping a container blank about the mandrel to form a tube with the ends of the tube projecting beyond the mandrel end, a folding shoe engaging a portion of the tube projecting beyond the mandrel end to fold into the plane of the end, said shoe having laterally opposed sides convexly curved away from the mandrel end, the surfaces of curvature generated by a vertical straight line, a pair of cooperative folding members having concavely curved surfaces for engaging the curved shoe surfaces, first mounting means for the folding members enabling the folding members to pivot about an axis parallel to a line lying in the plane of curvature, a second mounting means for the folding member enabling pivotal movement of the folding member and said first mounting means about an axis parallel to the container axis, means for pivoting folding members against the curved surface of the shoe so as to cause the members to engage the shoe folding the container ears therebetween and to slide along the curved surface of the shoe to stretch the ears away from the mandrel.

11. A mechanism for forming containers comprising means for supporting a tubular container having a flap extending beyond the supporting means, a flap folding block, means for moving the block in an arcuate path to swing past the end of the container engaging the flap and folding it over the container end and to swing away from the container end, means to lock the block at the end of its swing, means to return the block to starting position, and release means to unlock the block to permit it to swing back through a similar arcuate path to prepare it for a succeeding folding operation.

12. A mechanism for forming a container comprising a rotatable turret for carrying container blanks from a blank receiving station to a container ejecting station, a container forming mandrel radially supported on the turret, an ejecting plate mounted flush with the outer end of the mandrel, means for folding a container blank about the sides and end of the mandrel, locking means mounted on the turret for holding the plate flush with the mandrel preventing centrifugal force from moving the plate outwardly, tripping means at the ejecting station for releasing said locking means, and means at the ejecting station for moving the plate outwardly to strip the container from the mandrel.

13. A mechanism for forming a container comprising means for folding a container having a plurality of separate layers of material having thermoplastic adhesive on the surfaces between them, means for externally supporting the folded container to maintain its shape, a heated mandrel insertable into the container to soften the thermoplastic adhesive to cause the layers to adhere, means to remove the mandrel from the container, means to blow a jet of air into the container to partially solidify the thermoplastic material while the container is still supported, and means to remove the container from said supporting means to permit the thermoplastic to further cool and solidify the container.

14. A mechanism for forming a container comprising means for folding a container from a blank having a plurality of separate layers with thermoplastic adhesive between, a box for supporting the formed container to hold it in shape, a heated mandrel insertable into the container to soften the thermoplastic adhesive and cause the layers to adhere, means for removing the container from the box to permit the adhesive to solidify, and means for blowing a jet of air into the box to cool it in preparation for reception of a new container.

15. A mechanism for forming a container comprising means for folding a container from a blank, means for inserting the container into a supporting box to hold the container in folded shape, means for inserting a mandrel into the container to force it against the inner walls of the box, means causing the box to contract in size as the mandrel is inserted therein, and means to cause the box to expand as the mandrel is withdrawn in order to free the formed container to permit easy withdrawal from the box.

16. A mechanism for forming containers comprising means for folding the container from a container blank, means for inserting the folded container into a molding box to hold it in shape with the top and flaps of the container protruding from the box, and gripping means for withdrawing the container from the box engaging the protruding flaps and gripping them to pull the container from the box.

17. A mechanism for forming a container comprising means for folding a container blank having a plurality of separate layers with thermoplastic adhesive therebetween, a molding box supporting the container therein and holding it in shape, a heated mandrel for insertion into the container to press it against the walls of the molding box for softening the thermoplastic adhesive to cause the layers to adhere, means to withdraw the container from the molding box, a horizontally positioned blade for supporting the container thereon while the thermoplastic adhesive is solidified, means for carrying the container from the withdrawal means to place it over the blade, and a pair of resilient springleaf members extending equi-distant into the path of the container as it is carried on the blade to engage and straighten the container and insure that its upper wall will lie flat on the blade.

18. A mechanism for forming a container comprising means for folding a container blank having a plurality of separate layers with thermoplastic adhesive therebetween, a molding box supporting the container and holding it in shape, a heated mandrel for insertion into the container to press it against the walls of the molding box for softening the thermoplastic adhesive to cause the layers to adhere, means to withdraw the container from the molding box, and a cooling tower for carrying the molded containers through cooling air to permit the thermoplastic adhesive to solidify and form a self-sustaining package.

19. A mechanism for forming a container comprising a body forming turret having a plurality of body forming mandrels, means for accurately positioning multi-layered blanks thereon having intermediate layers of thermoplastic, mechanism for folding the container blanks about the mandrels as they are carried on the turret, a welding turret positioned adjacent the body forming turret, container molding boxes carried on the welding turret, means to remove the containers from the mandrels and insert them into said molding boxes, heated mandrels insertable into the containers to soften the thermoplastic adhesive and cause the container layers to adhere, and means for withdrawing containers from the molding boxes to permit the thermoplastic adhesive to solidify and form a completed container.

20. A mechanism for forming containers comprising a movable support carrying a mandrel, means for moving the support to bring the mandrel to a blank delivery station, means for delivering a container blank to said mandrel at said station, means for clamping the blank against one face of the mandrel, means operatively associated with said mandrel for folding the blank, said delivery means including first locating means adapted to engage and position the blank in one direction along said face of the mandrel, and said folding means including second locating means adapted to engage and position the blank transversely of said one direction and along said face of the mandrel, and means operating said first and second locating means and thereby positioning the blank in timed sequence before said clamping means clamps the blank against said mandrel.

21. A machine for forming containers comprising means for supporting a container blank while it is being folded into a container, means for folding a container from the blank while on said supporting means, means for delivering the blank to the supporting means, and cooperating positioning members on said delivery means and said supporting means for accurately positioning the blank on the support, said positioning members including a stop on the supporting means toward which the delivery means moves one edge of the blank, a blank engaging finger having one end adapted to engage the opposite edge of the blank and urge it toward said stop, a slide to which the other end of said finger is pivoted, means supporting said slide for reciprocating movement toward and away from the stop along a path parallel to but spaced from the blank, and means cooperating with said finger and swinging said one end of the finger into blank engaging position in response to movement of the slide toward said stop and swinging said one end of the finger away from the stop and out of the plane of the blank in response to movement of the slide away from the stop.

22. A carton forming machine comprising a mandrel, a pair of spaced vertical walls forming a pocket adapted to receive the mandrel, and means supporting the mandrel and walls for relative vertical movement between a first position in which the mandrel is spaced vertically from the ends of the walls for insertion of a container blank between the mandrel and walls and a second position in which the mandrel is moved between the walls to fold the blank around opposite sides of the mandrel by engagement with the walls, a transversely movable folding member located between the mandrel and wall ends when the parts are in said first position, said folding member having a surface adapted to receive and support the container blank prior to movement of the parts to said second position, a positioning portion on said folding member adapted to engage an edge of the blank, means operatively connected to move said folding member and positioning portion from a first blank receiving position to a second position locating the blank accurately between the mandrel and wall ends, means then causing relative vertical movement of the mandrel and walls to their second position, and means thereafter moving said folding member to a folding position in which it engages and folds a portion of the blank.

23. A carton forming machine according to claim 22 having carton blank delivery means adapted to feed a blank onto said folding member surface, said delivery means including a locating finger movable against an edge of the blank adjacent the edge engaged by said positioning portion and thereby positioning the blank in a direction transversely of that in which the positioning portion locates the blank, and means for clamping the blank against the mandrel while said finger and positioning portion engage and hold the blank in desired position, said clamping means then holding the blank accurately against the mandrel during said relative vertical movement.

References Cited in the file of this patent

UNITED STATES PATENTS

| Number | Name | Date |
| --- | --- | --- |
| 546,318 | Gay | Sept. 17, 1895 |
| 813,608 | Wright | Feb. 27, 1906 |
| 966,618 | Taylor | Aug. 9, 1910 |
| 1,020,821 | Hesser | Mar. 19, 1912 |
| 1,646,572 | Burgdorf | Oct. 25, 1927 |
| 2,245,675 | Hultin | June 17, 1941 |
| 2,299,474 | Evans | Oct. 20, 1942 |
| 2,344,666 | Arelt | Mar. 21, 1944 |
| 2,444,762 | Waters | July 6, 1948 |
| 2,466,341 | Vergobbi | Apr. 5, 1949 |
| 2,479,456 | Arthur | Aug. 16, 1949 |
| 2,608,916 | Hickin | Sept. 2, 1952 |